United States Patent [19]

Ward et al.

[11] Patent Number: 4,802,116
[45] Date of Patent: Jan. 31, 1989

[54] PROGRAMMED CONTROLLER

[75] Inventors: Derek Ward; David B. Steward, both of Auckland, New Zealand

[73] Assignee: Fisher & Paykel Limited, Auckland, New Zealand

[21] Appl. No.: 57,786

[22] Filed: Jun. 3, 1987

[30] Foreign Application Priority Data

Jun. 3, 1986 [NZ] New Zealand .................. 216384
Dec. 22, 1986 [NZ] New Zealand .................. 218742

[51] Int. Cl.⁴ .................................................. G06F 1/00
[52] U.S. Cl. ................................................... 364/900
[58] Field of Search ....................................... 364/900

[56] References Cited

U.S. PATENT DOCUMENTS

| | | | |
|---|---|---|---|
| 3,744,029 | 7/1973 | Nyman | 364/900 |
| 3,793,625 | 2/1974 | Pomella et al. | 364/900 |
| 3,937,938 | 2/1976 | Matthews | 371/19 |
| 4,071,911 | 1/1978 | Mazur | 364/900 |
| 4,227,247 | 10/1980 | Kintner | 364/900 |
| 4,314,329 | 2/1982 | Crewe et al. | 364/141 |
| 4,363,090 | 12/1982 | Garcia | 364/139 |
| 4,370,705 | 1/1983 | Imazeki et al. | 364/184 |
| 4,562,529 | 12/1985 | Drummond | 364/140 |
| 4,593,380 | 6/1986 | Kocher et al. | 364/900 |
| 4,628,434 | 12/1986 | Tashiro et al. | 364/130 |
| 4,628,435 | 12/1986 | Tashiro et al. | 364/130 |

OTHER PUBLICATIONS

"Grafcet as a Description and Simulation Tool at the Functional Level in CAD System*," Diane Boucher, et al., 1984, pp. 324–327.
"An Easy Way to Design Complex Program Controllers," by Charles L. Richards, *Electronics*, Feb. 1, 1973, pp. 107–113.
"The Foolproof Way to Sequencer Design," by James H. Bentley, *Electronic Design* 10, May 10, 1973, pp. 76–81.
"Graphical Function Chart Programming for Programmable Controllers," by Mike Lloyd, *Control Engineering*, Oct. 1985, pp. 73–76.
"Break Offset Mapping and Tracing with Break Offset Map Tables," by R. L. Bains, et al., *IBM Technical Disclosure Bulletin*, vol. 16, No. 12, May 1974, pp. 4013–4015.
"Binary Dump," by Tim Damon, *Tips 'n Techniques, Nibble*/vol. 4/No. 8/1983, pp. 39–40.

*Primary Examiner*—Raulfe B. Zache
*Attorney, Agent, or Firm*—Christie, Parker & Hale

[57] ABSTRACT

A programmed controller controls a machine or process by emulating state diagrams and executing an applications program having a number of blocks of statements, each block corresponding to a step in the operation of the machine or process, and each state diagram being represented by a program loop. Each loop has only one state active at any one time and has variables such as pointers in each of which is stored the address of an active block. When transition conditions of a state in a block are satisfied, a decision point is reached, that state is deactivated and another state activated in a desired sequence with consequent required operation of the machine or process.

The transitions that occur with regard to which states are active and the order in which they occur are recorded and later retrieved and presented, for example, for debugging uses to a user.

122 Claims, 16 Drawing Sheets

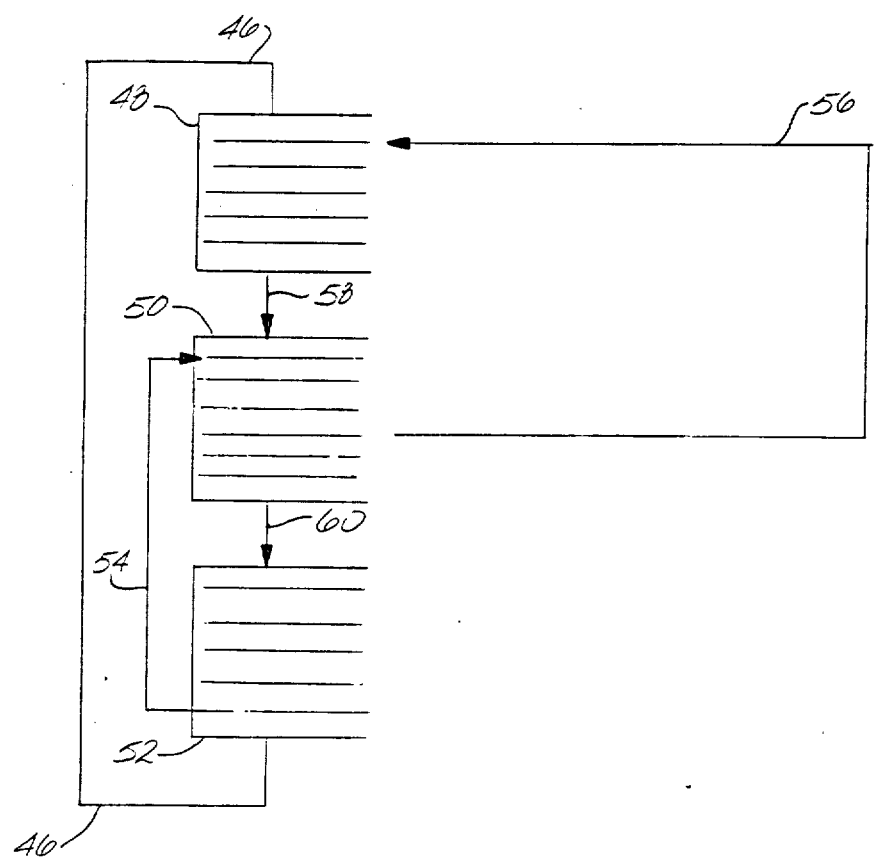

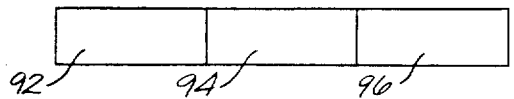
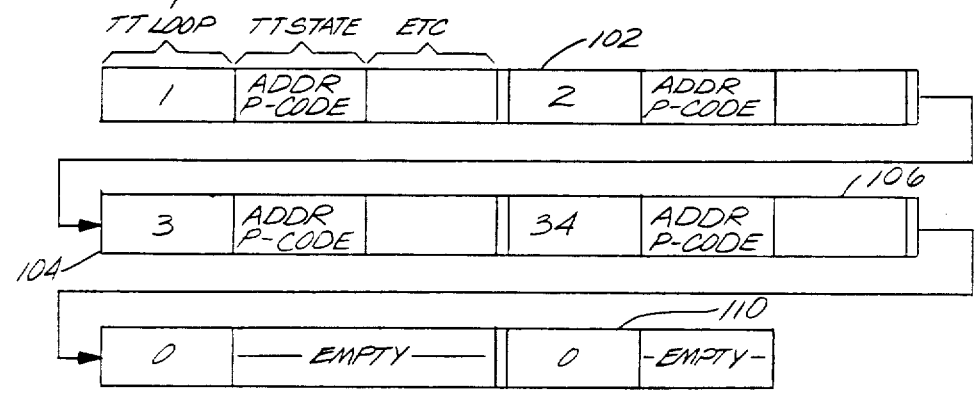
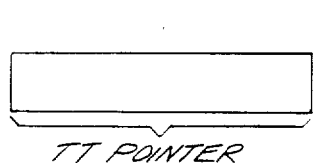
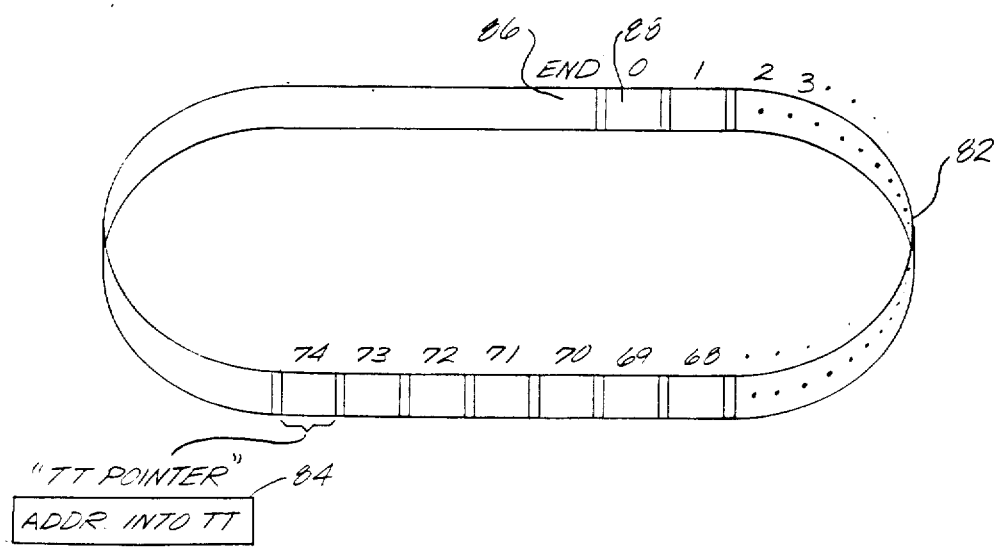

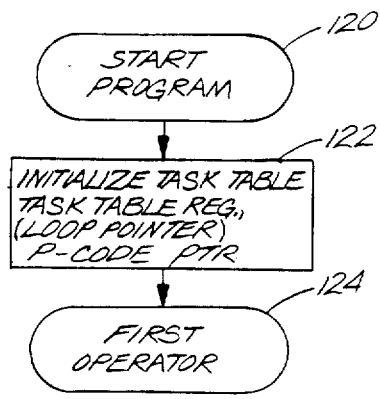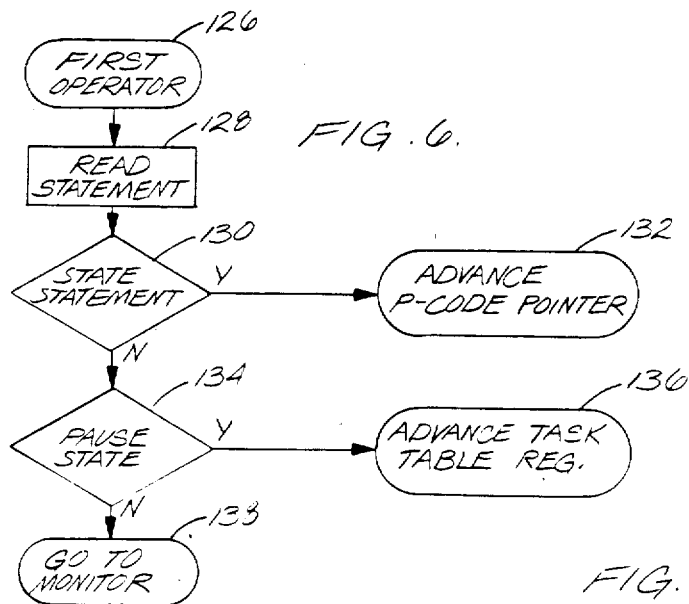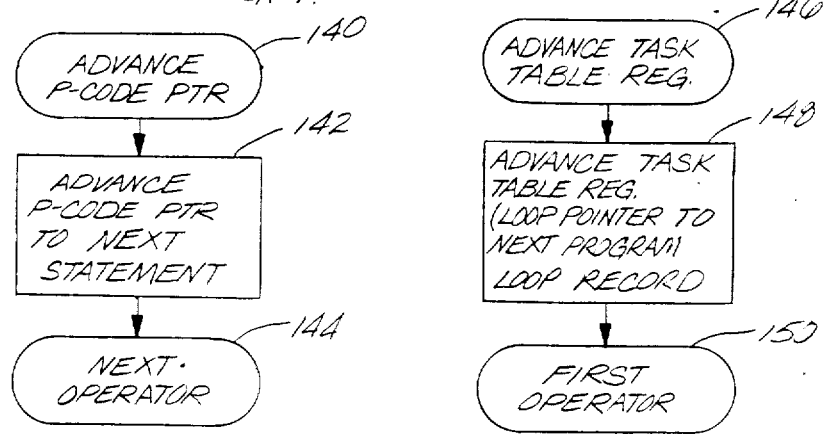

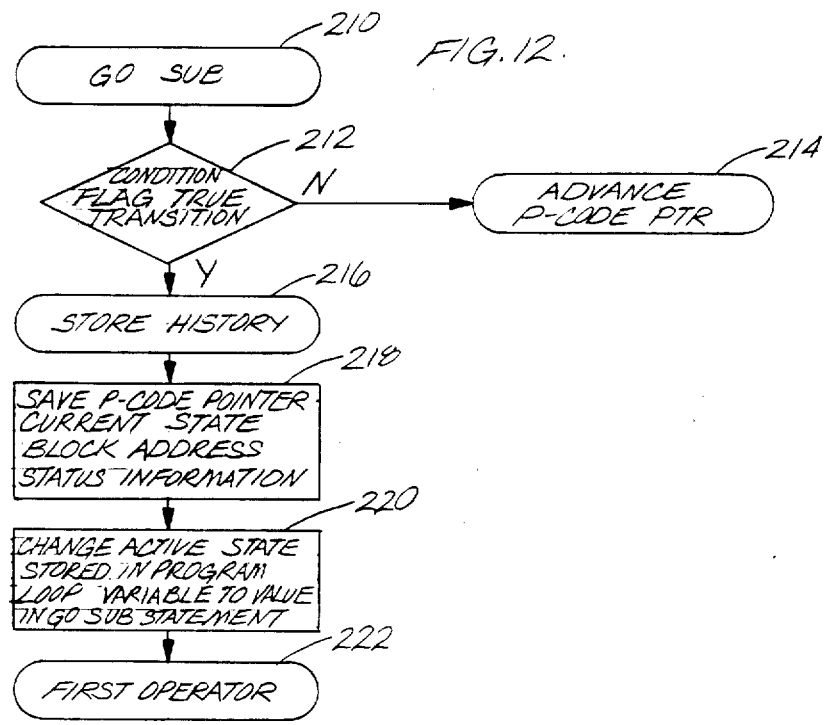
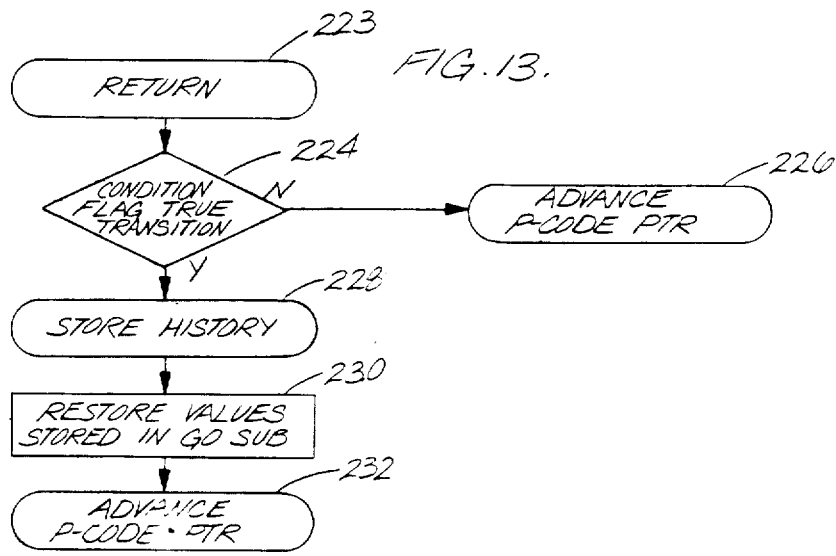

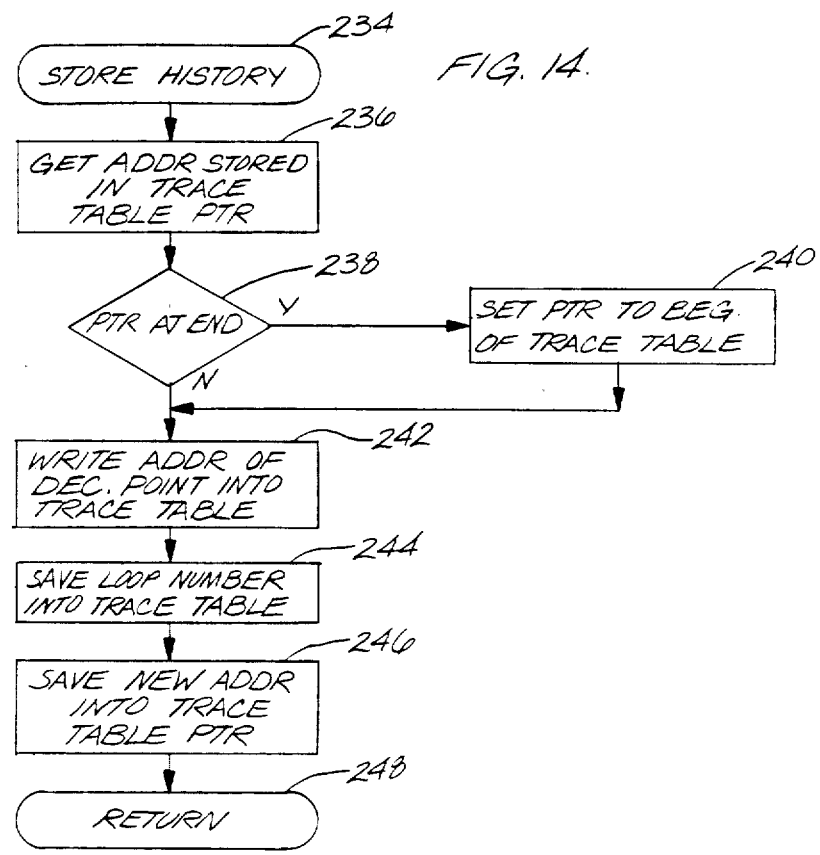

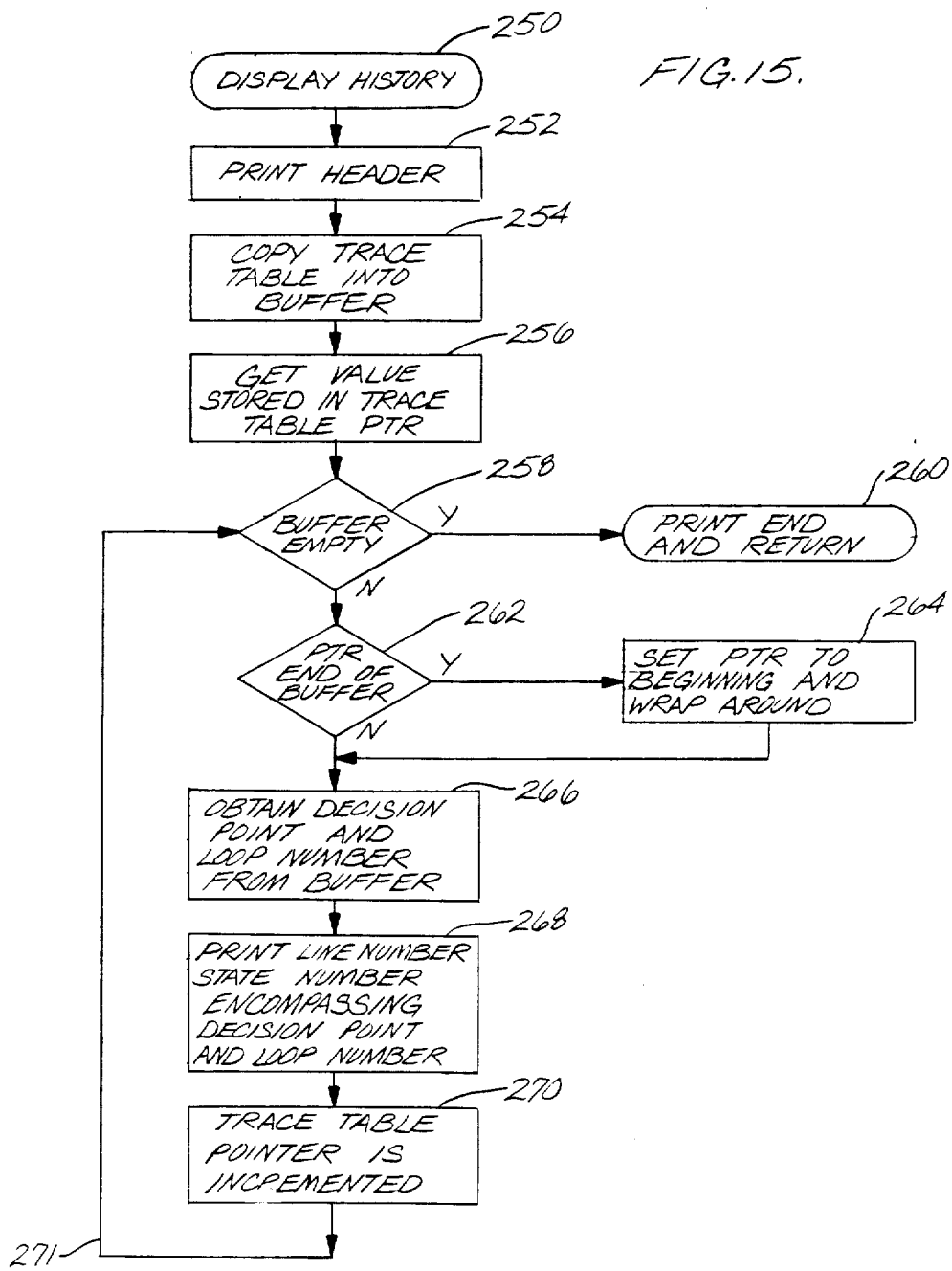

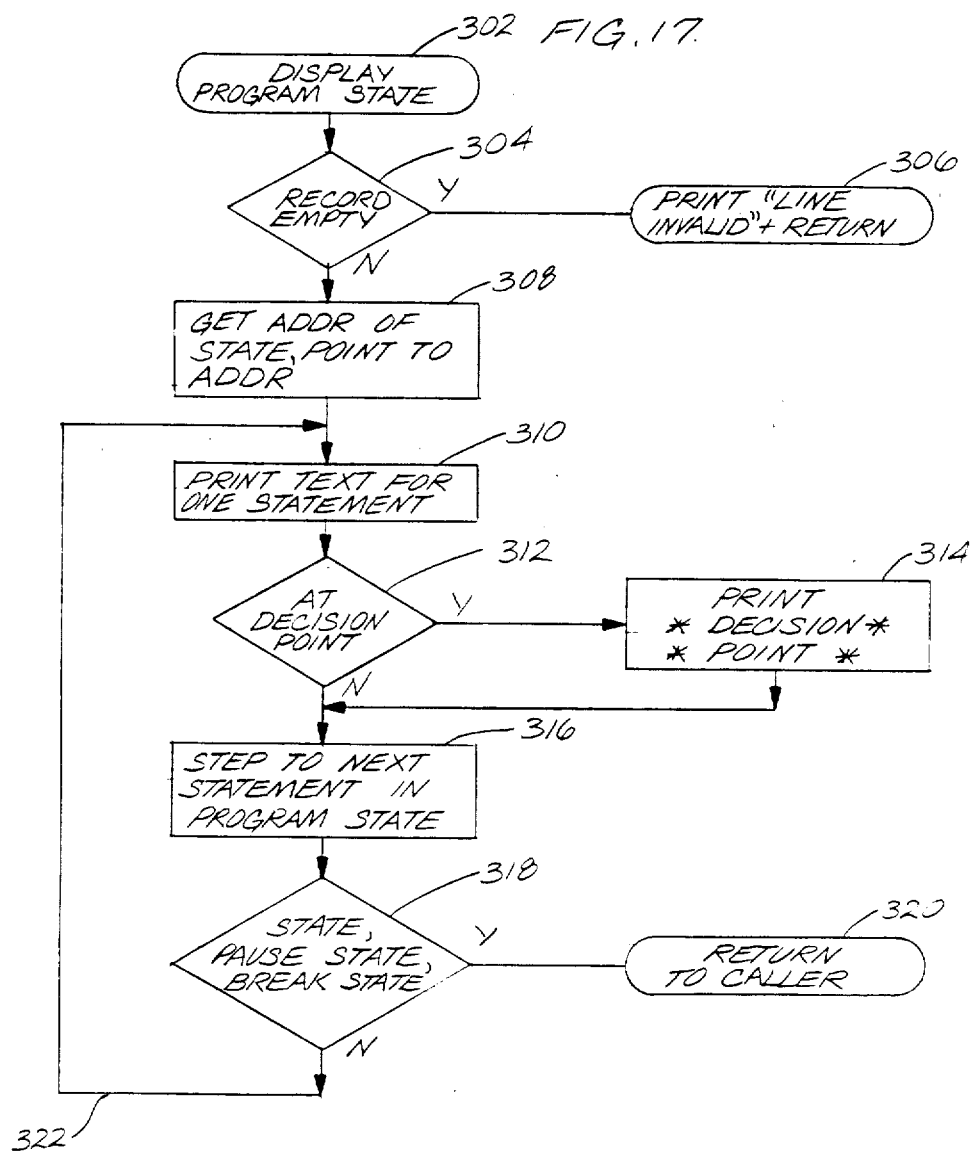

PROGRAMMED CONTROLLER

BACKGROUND OF THE INVENTION

1. Field of the Invention

This invention relates to a programmable controller for processing finite state applications programs which control the states of operation of machines and/or processes. The invention also relates to debugging a machine and/or process which allows for easy diagnostics of the finite state applications program.

2. The Prior Art

In the 1960's, programmable controllers were developed to replace relay control systems which used electromagnetic relays to control the operation of industrial machines or processes. These programmable controllers were designed to work as if they contained relay circuits, even though the circuits were actually programs in a computer. The relay circuit designs, emulated by these programmable controllers, were called ladder diagrams because of their general appearance. Ladder diagrams are excellent for designing combination logic control problems, where outputs or actions are directly dependent on the states of inputs or conditions. However, for sequential control problems, where the control actions are time-dependent, the ladder diagram approach becomes cumbersome, difficult to design and fault-find. Lloyd, "Graphical Function Charts Programming for Programmable Controllers," *Control Engineering* (October 1985).

In order to emulate ladder diagrams, a programmer strings together long lists of Boolean equations in the form of software commands either in text form or graphically. Each command controls an internal or external signal. Debugging or fault-finding in such a system usually involves observing an unexpected condition, and then intuitively searching back through some or all possible combinations of factors that could have caused the unexpected condition. Because all of the ladder diagram is scanned each scan cycle, it is not possible to eliminate any part as definitely not containing the problem.

Another drawback of the ladder diagram controllers is that in order to determine the causes of the unexpected condition it is desirable to record information related to the cause of the problem. However the ladder diagram system does not have any mechanism to differentiate between relevant and irrelevant changes in system variables and conditions, and this leads to the need to store an impractically large amount of data which would be very difficult to analyze and sort.

Furthermore, ladder diagram controllers are cumbersome to program. By their very nature, ladder diagrams are difficult to understand. Additionally ladder diagrams do not clearly show the broader, macro functionality they are designed to provide, particularly sequential functions. What they show is in effect a circuit that provides that functionality. For many years, machine design and manufacturing engineers, who were unfamiliar with ladder diagrams, could not easily develop control systems for their machines or processes. Instead, they relied on specialized control engineers to program their control systems.

In an effort to simplify programmable controllers, systems were developed which enable engineers to use high level languages to emulate "state diagrams." A state diagram is a graphical representation of the states of operation and the conditions which change the status of the states of operation in a machine or process. In graphical form, a state diagram is a series of nodes with interconnecting arcs. Each node represents a particular state of operation and each connecting arc represents a transition function which causes the status of the state to change. State diagrams are easy to understand and easy to design by all types of engineers. The current systems which emulate state diagrams, however, are difficult to program, and difficult to debug.

An example of one such system is disclosed in U.S. Pat. No. 4,562,529 to Drummond. Drummond discusses a method and apparatus for controlling the states of operation of a machine or process by using "state logic variables." A "state logical variable" uniquely represents each operating state of the machine or process. The "state logical variable" can only be one of two values—either TRUE or FALSE, TRUE meaning that the state is active and FALSE meaning that the state is inactive. By using the methods as disclosed, the Drummond system operates very similarly to the ladder diagram controllers. Several problems are present in the Drummond method and apparatus.

First, the entire finite state applications program must be cyclically scanned in order for the Drummond system to properly process the "state logical variables". To make assignments to state variables, which is necessary to make changes of state, or to carry out state dependent actions, Drummond must evaluate many expressions containing state variables. The Drummond patent discusses simplified ways for doing this, however, the process is still inefficient and can be eliminated altogether.

Second, programming the Drummond controller to emulate state diagrams is a cumbersome process. The language disclosed in Drummond does not lend itself to easily converting the state diagrams into program code. This occurs because the condition statements which affect the status of the "state logic variables" cannot be lumped into specific areas of program code and require explicit inclusion of state variable terms on the left hand sides. Additionally, virtually every statement in the code requires a "state logical variable" to be assessed in order to determine whether an state assignment should be made or whether an action should be carried out. As a result, much extra code must be drafted in order to perform simple functions.

Lastly, because every statement in the finite state applications program must be scanned in order to evaluate the status of the state logical variables, the system operates very inefficiently. This drawback severely limits through put and limits the recording of system activity information for debug purposes. Also, Drummond does not disclose an adequate strategy or structure for keeping track of the multiple operating tasks to be controlled simultaneously.

Note should also be taken of the commercially available GRAFCET systems based on French standard NF C 03-190. GRAFCET does not restrict a state diagram to only having one active state at one time and so knowing the identity of one active state in a GRAFCET state diagram does not totally define the conditions and operations associated with that state diagram at that time. This has significant disadvantages during program debugging.

Thus PLC's have been programmed by a means known as ladder diagrams, or an equivalent means, from the early days. As more and more functionality has been added to the language (in the form of available ladder diagram symbols and structure), it has become apparent that there are limitations to the ladder diagram that can only be addressed by a change to the basic approach to programming. This is particularly apparent when PLC's are used for the control of machinery in flexible automation schemes. The functioning of such schemes relies significantly on the ability of the controller to sequence the machinery in a complex and flexible way with regard to both the activities carried out and the functions that step the sequence on and with regard to the ability of the PLC to control many essentially independent sequential processes at the same time. Such things can and are done with ladder diagram PLC's. However such programs require a translation process to generate a ladder diagram from the definition of the sequencing which may be in the form of a written specification or a flow chart. When the ladder diagram is inspected, the functions carried out are not obvious and the program and the process of debugging the program are cumbersome. Much of the information inherent in the spec or flow chart is lost or obscured in the translation process which converts the functional requirements into a relay circuit that fulfills those requirements.

Over the last few years there has been much interest in improving this situation. Sequencing methods have been developed which aim at improving the generation, debugging, and comprehension of such programs. The French GRAFCET effort has been notable and this has been accepted internationally as a useful technique. Related French and West German standards exist. Several PLC's using variations of the GRAFCET methods of describing sequences using standarized flow charts are on the market. However, there are further issues to address to reach an optimum form of control systems programming and these are not addressed by any currently known system.

The problems that need addressing call for improvements in
program structure and form
   focuses on relevant
   simplifies understanding of complex systems
   suited to high levels of functionality
minimization of transformations
avoidance of side effects
cost of hardware
self-explanatory to widest range of people and user friendly
minimized training
maximum assistance with debugging

SUMMARY OF THE INVENTION

The present invention seeks to provide a control method and apparatus that reduces or eliminates the disadvantages referred to above, and is more readily and freely used by control, manufacturing and design engineers.

The following is a preliminary explanation of terms which will assist the reader to more fully comprehend the nature of the invention that is described in this specification.

1. "State(s) of operation" means a particular combination of conditions and operations which exist for a finite time interval in a machine or process; only a subset of the machine's or process' signals or values are at particular defined values. The "state of operation" of a machine or process can be thought of as being a particular task or subset of tasks presently performed by the machine or process.

2. "Controller" means a device for exercising control over a process or machine or activity, which includes means for discerning the "state of operation." For this purpose, the controller must be kept informed of variations in the values and the status of the machine or process.

3. "Program state" means a particular block of one or more statements of program code used for evaluating, maintaining and controlling a "state of operation."

4. The terms "machine" or "process" are systems which proceed in real time from one specific operating state to a next operating state. The controller reads signals from the machine or process, monitors the operation of the machine or process, tracks the necessary operating states by way of its own informal states, and provides necessary output signals to put the machine into the necessary operating states based on the algorithms embedded in the applications program.

5. The term "multi-tasking" means a method of asynchronously running separate programs or separate tasks contained in the same program by only one controller such that all appear to be running simultaneously with relation to one another.

It is the concept of a "state" that allows one to say that a machine, or a section of a machine, is in a particular state, and that allows the structuring of a program so that a state is defined in one contiguous block only within the program with some form of state delimiting statement or means. From this follows the ability to say that while a particular state exists, the only possible relevant part of the program related to that loop is the block defining the state. A class of outputs is provided as part of the language where no outputs of this type exist from a system, other than those defined in the states active in each loop. This type of output is typically used for activating motors or valves. A state can therefore also be said to exist in the sense that it produces real world outputs while it exists, and these outputs are functions of the state only, i.e., they are activated conditional on nothing other than the existence of the state.

It may be advantageous to allow qualification of those outputs based on other conditions present in the system, but this would be an optional extension of the system.

It should be noted that it may be advantageous to also provide a class of output that can be activated in one state and deactivated in another, used for instance for driving displays or registers.

It is also the existence of explicit state type statements that allow subclasses such as "break state" and "pause state" to be provided for the purpose of controlling the flow of the program.

Debugging and comprehension of the control activity can therefore be based on a "state structure" as follows an identification of the states that exist and what major control function they provide. E.g., while a state may activate several outputs, do some timing, interrogate inputs, print, and eventually take the decision to change to another state, it can also be said to carry out some macro function; e.g. the controller for an elevator might have a state that performs the macro function "go up one floor," which consists of activities like those noted above. The state could therefore be called GoUpOneFloor as a single word symbolic name in our system, and this provides structure to the program and broad understanding without the need to consider the lower level operations necessary to carry out the macro function.

examination of the flow of control through the various states that existed previously, that ultimately led to the overall existing state of the machine (i.e., tracing).

enabling the flow of control until a particular state is reached, i.e., trapping with a break state, with subsequent diagnosis of the activity to that stage, or pausing a particular loop with a pause state.

It can therefore be seen that it is most advantageous for a loop, program, group program or whatever it is called to be able to be said to be in some state, and for that state to be defined unambiguously, and to be a function that can be said to exist or not, that can be detected and/or recorded.

For tracing to be effective, the concepts of states and loops must both exist.

Briefly, a preferred embodiment of the invention includes a programmed controller for emulating one or more state diagrams and for controlling the states of operation of at least one machine or process. The controller performs an application-type program which comprises a plurality of blocks of statements. Each of these blocks of statements when executed is a program state defining an internal control or state which corresponds to one of the machine or process states of operation. Each block of statements defines the next blocks of statements one of which may replace the existing block as the active block if the defined transition conditions are satisfied and actions to be taken during the corresponding state of operation by the machine or process.

Program states are organized into one or more program loops which represent independent sequential control schemes for an entire machine or process or for a sub-section of the machine or process. Each program loop essentially emulates a state diagram.

The controller can activate one or more program loops simultaneously, however, each program loop can only allow one of the program states within the program loop to become active. To keep track of the active program loops and the associated active program states, a variable is associated with each active program loop. The variable stores an identifier of the active program state or the address of the start of the active program state. The variable also has an identifier which indicates within which active program loop the particular program state resides. The controller also has a task table which stores the variables for the active program loops. The task table enables the controller to perform several active program loops asynchronously and it determines the sequence of execution of the active program loops. Essentially, the task table keeps track over which program loops and which program states are active and of the order and sequence in which each program state will be processed.

A method and apparatus are also provided for facilitating "debugging" of the finite state applications program. Means are provided for recording information about the activity of each of the active program states. Specifically, the controller traces a history of the order and occurrence of each program state and the conditions responsible for each occurrence of the program state. Display means are also provided for enabling the programmer to evaluate the recorded information.

Significantly, the present invention allows a control, manufacturing or machine design engineer to more freely understand and even design high-level applications programs representative of state diagrams. The specific design advantage of the present invention is that the programmer is able to organize all program statements related to a particular state of operation into a contiguous segment of program code or block of statements and none of the statements are related to any other state of operation. In this way, the programmer is able to compartmentalize all of the various conditions dependent on each state of operation without having to worry about any of the other states of operation. This procedure does away with "state logical variables" and it facilitates techniques for programming in an organized and structured format. Furthermore, program loops representative of overall state diagram structures are easily designed into code by simply connecting the compartmentalized code together with the "conditional GOTO statements" or the like contained within program state blocks.

The present invention is more efficient than the prior art because all of the statements in the applications program do not have to be scanned each time a particular state of operation needs to be controlled. Instead, only those statements in the particular program state associated with the particular state of operation which is active are scanned. This technique enables the controller to process very quickly and it allows the present invention to more efficiently process a multitude of tasks at the same time. The preferred embodiment of the invention also has a task table for keeping track of the various sequences of tasks to be performed simultaneously and/or determining the order in which each sequence of task will be performed.

Lastly, because the applications program is designed with program states, pinpointing the causes of unexpected events is greatly facilitated. Means are provided for recording the sequential order of occurrence of each active program state as they occur and one or more conditions responsible for transitions occurring for each program state to the next or responsible for initial activations of program states. By analyzing a display of the occurrences of each of the program states and by analyzing the conditional statements causing the transitions to occur, the analyst can quickly determine the location and the cause of the unexpected event in the program.

BRIEF DESCRIPTION OF THE DRAWINGS

FIG. 2b is a diagram of blocks of statements corresponding to the states of operation of the state diagram in FIG. 2a;

FIG. 2c is a diagram emphasizing the structure of the program code;

FIG. 3a is a diagram of a program loop pointer;

FIG. 3b is a diagram of the task table;

FIG. 3c is a diagram of a task table pointer;

FIG. 4 is a logical representation of a trace table shown in the form of an endless loop;

FIG. 5 is a schematic block diagram of the subroutine called START PROGRAM;

FIG. 6 is a schematic block diagram of the subroutine ADVANCE P-CODE POINTER;

FIG. 8 is a schematic block diagram of the subroutine ADVANCE TASK TABLE REGISTER;

FIG. 10 is a schematic block diagram of the subroutine GO TO;

FIG. 12 is a schematic block diagram of the subroutine GO SUBROUTINE;

FIG. 13 is a schematic block diagram of the subroutine RETURN;

FIG. 14 is a schematic block diagram of the subroutine called STORE HISTORY;

FIG. 15 is a schematic block diagram of the debugging routine called DISPLAY HISTORY;

FIG. 17 is a schematic block diagram of the debugging routine called DISPLAY PROGRAM STATE;

FIG. 18 is a schematic block diagram of the debugging routine DISPLAY LOOP; and

FIG. 19 is a schematic block diagram of the debugging routine FOUND LOOP.

DETAILED DESCRIPTION

Before considering the description and implementation of the languge interpreter software, we will describe the principles on which the language is based and give examples of how programs according to the invention are constructed.

The Loop-State structure is the single most important feature of the language system which enables simple management of the complex and changing requirements for control in complex systems.

The simple concepts are as follows. Consider an elevator such as may be used to raise/lower a platform on a building site. It has an Up button and a Down button at the top and on the ground. It can be said to be in the states of "stopped," "going up," or "going down," but only in one of those at any one point in time. Its operation can be described with the help of the state diagram in FIG. 1a.

The following should be noted:

the states with their numbers and names included in circles.

the transition conditions define in words (shown beside the arcs) which detail the conditions that cause the state to change.

the way in which a state diagram description minimises and defines what is relevant. E.g., in "Going up," what is happening to the "Down buttons," 1 or 2, is quite irrelevant.

Similarly the way all relevant activities are shown associated with the state they relate to, e.g., "Energize motordown" in "Goingdown."

The ease with which the operation of the elevator can be understood, e.g., if it is stopped and up button 1 is pushed, it goes up, but if it is going down and up button 1 is pushed, it ignores it.

The program using our language which is functionally equivalent to the above state diagram is:

Stopped

Brake on
if Upbutton1 on or UpButton2 on goto GoingUp
if DownButton1 on or DownButton2 on goto GoingDown GoingUp
UpMotor on
if UpButton1 off and UpButton2 off goto Stopped GoingDown
DownMotor on
if DownButton1 off and DownButton2 off goto Stopped The only parts omitted from this program are defining statements that allocate particular names to particular variables, i.e., that define UpButton1 is connected to input terminal 21.

Figure 1:
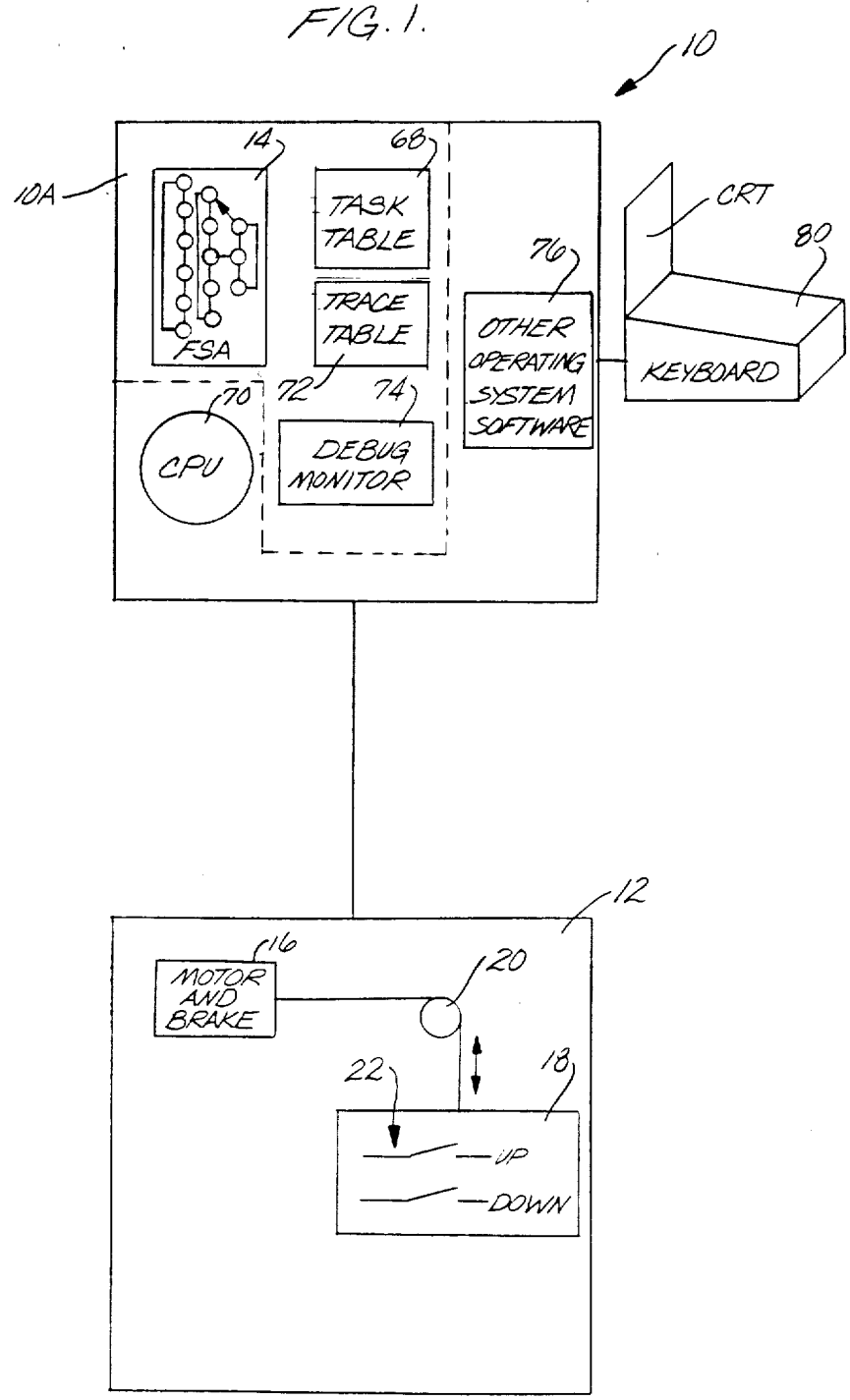
FIG. 1 shows a programmable controller for controlling the operations of a machine or process in accordance wih the present invention.
Figure 1A:
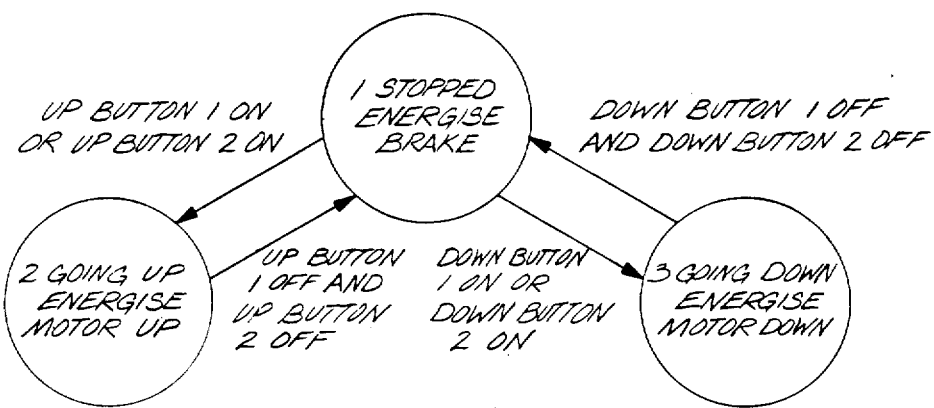
FIG. 1a is a diagram of the simple apparatus and controls which the invention is applicable.
Figure 1B:
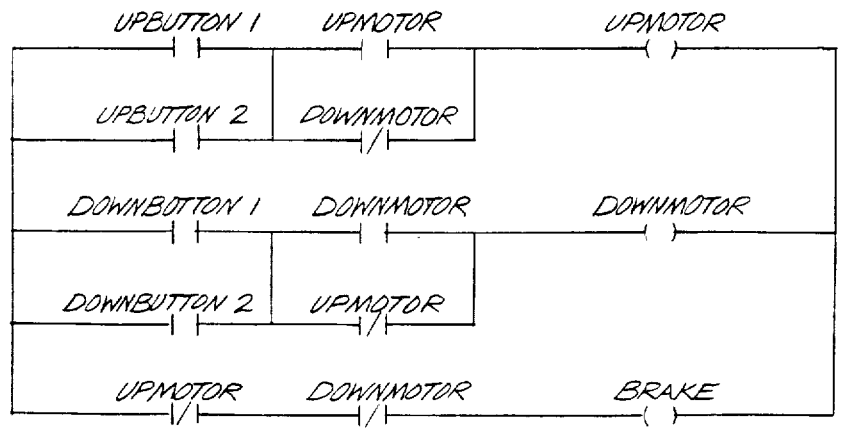
FIG. 1b is a ladder diagram for a state of the art controller for the apparatus and controls of FIG. 1b.

The ladder diagram equivalent is as shown in FIG. 1b In the ladder diagram:

] [ is a normally open contact
]/[ is a normally closed contact
( ) is a relay coil Note how the circuit operation is relatively easy to follow. What it actually does functionally is far harder to deduce. There is no structure to show that it is relevant at any one point in time.

A state diagram with 100 states instead of 3 still has states as simple as the 3, and each may be understood in turn. A ladder diagram with 100 rungs is a nightmare.

The principles of our loop-state structure are:

Programs are organized into (one or) more than one separate loops that represent independent sequential control schemes for sections of the machine. A loop can be processed independently of the rest of the program, or can handshake and synchronize with other loops via flags, etc.

Loops are formed of sequences of states. I.e., they are in effect state diagrams representing state machines having outputs which may be conditional/unconditional on the inputs, etc.

Each state machine, i.e., loop, has one and only one state active at any point in time that the loop is active. If the loop is not active, then there is no state active in that loop. Active loops can therefore be said to possess a state variable, the value of which is the number/name of the state active at that point in time. This can be accessed and used for handshaking, diagnostics, etc. This is also the mechanism that focuses the observer onto a particular part of the program as being relevant for a particular purpose, and EXCLUDES the possibility that any other part is relevant. This exclusion is most important because it says "look here, and DON'T LOOK ANYWHERE ELSE."

A class of outputs is provided as part of the language where no outputs of this type exist from a system, other than those defined in the states active in each loop. This type of output is typically used for activating motors or valves. A state can therefore also be said to exist in the sense that it produces real world outputs while it exists, and these outputs are functions of the state only, i.e., they are activated conditional on nothing other than the existence of the state. The output setting statement in the language effectively says "While in this state this output is on and it will go off when this state becomes inactive. It does not say "set this output on," and does not need any additional statement to turn the output off again.

Transition conditions are a function of the state they cause to be deactivated. They say "change the active state from this to another," where the other is given as a parameter of a "go to" statement. They therefore appear in the state block of which they are apart.

State blocks are contiguous segments of program, starting with a state statement and ending at the next state statement. They contain all the code related to that state, and none related to any other.

We see therefore that:
for one section of a machine, only one loop is relevant,
for that section of the machine at a particular point in time in the sequencing of the section, only one state in that loop is relevant.

We have therefore focused down in the program to a segment representing one state, probably, e.g., 10 lines out of 2000, and we can be sure that that is the only part that is relevant.

To do this we need only determine the section of the machine associated with the problem or other event of interest—which is physical association only, and the point in the sequence that the problem occurs. Trapping and tracing provide the means for determining the point in time in the sequence, if this is not obvious from the program. The specifics of trapping and tracing are described in our other patent brief.

Documentation is made easy by the textual form of the program, as opposed to a graphical form.

FIG. 1 depicts a programmable controller and a computer program which form programmed controller 10, for emulating state diagrams. A finite state applications program is stored at 14 in the memory portion 10A of the programmed controller 10. A central processing unit ("CPU") 70 performs mathematical and logical functions for the finite state applications program ("applications program"). A task table or set of pointers 68 keeps track of active program loops. A trace table 72 contains a temporary history of the activity of the applications program. The programmable controller is equipped with a debugging monitor 74 for enabling a user to easily pinpoint errors in the applications program. The trace table 72, the task table 68, and debug monitor 74 are all stored in memory 10A. Other operating system software for controlling miscellaneous features of the programmable controller are stored at 76. Terminal 80 is provided to enable a user of the controller to program the applications program and debug the system on terminal 80.

FIG. 1 shows a programmed controller 10 connected to machine or process such as elevator 12. The programmed controller 10 emulates the applications program at 14, for controlling the operation of the elevator 12. Finite state applications programs are high-level programs representative of state diagrams (See FIG. 2a). State diagrams are pictorial representations of the states of operation of the particular machine or process to be controlled. A programmer controls the machine or process represented by the state diagram by first designing a finite state applications program and, second, processing it on the control to emulate the state diagrams and control the order and sequence of occurrence of each task or operation to be performed by the machine or process.

A simplified application of the programmed controller 10 is monitoring, evaluating and controlling the operations of elevator 12. Elevator 12 consists of a reversible motor and brake 16, pulley 20, and an elevator compartment 18. A fundamental principal of the elevator is that only one state of operation of the elevator can be activated at any one point in time. The elevator's states of operation are "Stopped", "Going Up", or "Going Down".

Figure 2A:
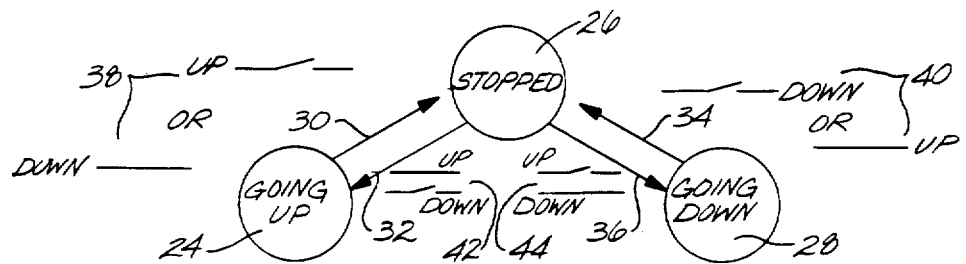
FIG. 2a is a state diagram of the various states of operation of an elevator and the conditions which cause transitions to occur between states.

Buttons 22 in elevator compartment 18, cause the elevator to change from one state of operation to another state of operation. For example, when the "Up" button is closed and the "Down" button is open, the elevator compartment 18 goes up. When the "Down" button is closed and the "Up" button is open, the elevator compartment 18 goes down. When the "Up" button is pressed while "Going Down" or when the "Down" button is pressed while "Going Up" the elevator compartment 18 is stopped. FIG. 2a is a state diagram or graphical representation of these states of operation and the conditions which effect changes to occur from one state to another. More particularly, a state diagram is a series of nodes 24, 26 and 28 with interconnecting arcs 30, 32, 34 and 36. Each node represents a particular state of operation and each connecting arc represents a condition or transition function which causes the status of a particular state to change.

Specifically, the state diagrams in FIG. 2a have nodes 24, 26 and 28 which respectively represent the states of operation "Going Up", "Stopped", and "Going Down". The conditions which affect the status of the states are the arc connectors 30, 32, 34 and 36 between the nodes. Each arc defines its own set of transition conditions, origin and destination state. Arc 32 has switch condition and action 42:

If "Up" button is on and "Down" button is off then state of elevator 18 goes to "Going Up."

Arc 30 has switch condition and action 38:

If the "Up" button is off or "Down" button is on, then state of elevator compartment 18 goes to "Stopped."

The rest of the conditions and actions can be discerned from FIG. 2a.

An applications program representative of the state diagram in FIG. 2a is:

"Going Up"
"Up" Motor On
If "Up" button off or "Down" button on, go to "Stopped"
"Stopped"
Brake On
If ""Up" button on and "Down" button off go to "Going Up"
If "Up" button off and if "Down" button on, go to "Going Down"
"Going Down"
"Down" Motor On
If "Down" button off, or "Up" button on go to "Stopped"

The three blocks of statements above are called program states and each block corresponds to both a particular state of operation of the elevator 12 and to a particular node in the state diagram (FIG. 2a). Each of the program states consists of a state delimiting statement, "Going Up", "Stopped", or "Going Down", which signifies to the controller the end of one program state and the beginning of a new program state. The state delimiting statement is followed by a series of statements consisting of none, one or more compound statements which can cause actions or cause transitions to occur from a currently processing or active program state to another program state. A compound statement consists of a condition part and an action part. If the condition part is satisfied, then the action part is executed. If the action part contains a GOYTO, GOSUB or RETURN statement, a transition to a new program state occurs. If the action part contains a START statement, then a new program loop is initiated with an additional newly active state. Stated differently, the compound statements determine what the program state changes or initiations will be and the type of actions to be taken by the machine or process during the currently active state of operation. All three program states 24, 26 and 28 above have compound statements which include "GoTo" which cause the program states to shift processing to another program state in the same state diagram.

By gathering all statements which are associated with a particular state of operation into only one contiguous segment of code, the system can scan only these statements to initiate actions required by the state of operation of the machine or process and to determine if a particular set of conditions has been satisfied in order to initiate a new state of operation. Whereas, the Drummond system evaluates every statement in the applications program to determine whether to change state activity or carry out an action, and in the course of this has to evaluate many state variables. The structural difference in the program enables the present invention to operate much more efficiently by eliminating the need to evaluate state variables.

Figure 2B:
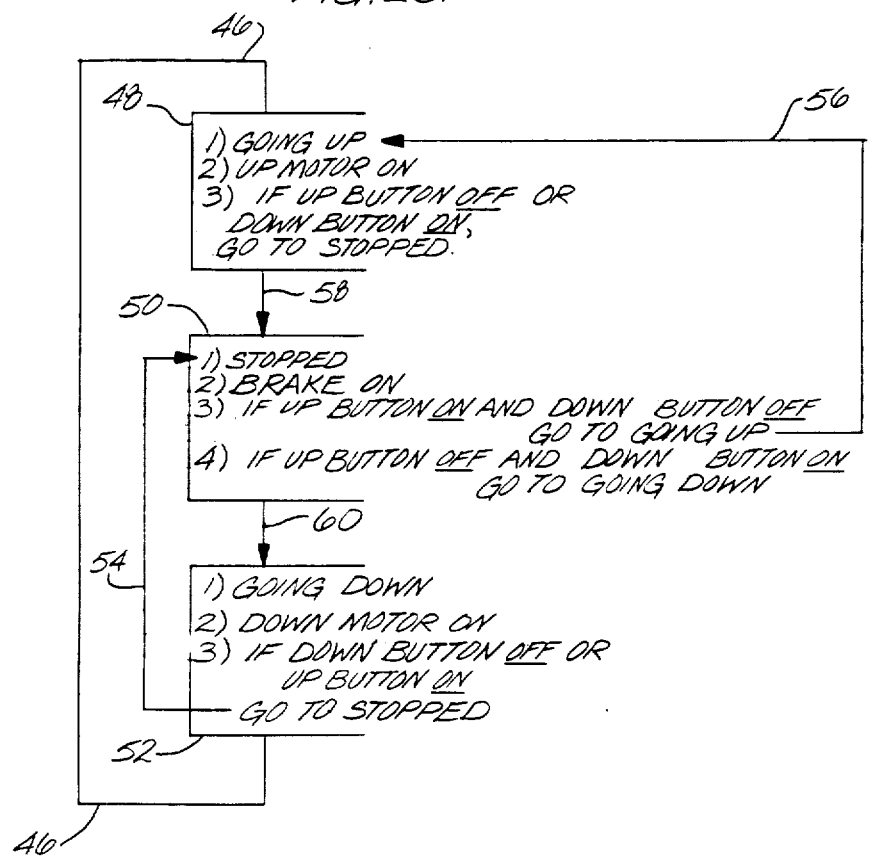

FIGS. 2b and 2c are pictorials of the program states. Block 48 in both figures refers to the sequence of code for the program state "Going Up"; block 50 represents the sequence of code for the program state "Stopped", and block 52 represents the sequence of code for the program state "Going Down". Arcs 54, 56, 58 and 60 (FIGS. 2b and 2c) correspond to the arcs 30, 32, 34 and 36 of the state diagram (FIG. 2a). Arcs 54, 56, 58 and 60 show how the flow of activity in the applications program can be affected by the compound statements.

Arc 58 of FIG. 2b demonstrates that when the condition part of compound statement:

If "Up" button off or "Down" button on, go to "Stopped" is true, then a transition from the "Going Up" program state to the "Stopped" program state occurs. Likewise, arc 60 demonstrates that when the condition part of compound statement:

If "Up" button off and if "Down" button on, go to "Going Down", is true, then a transition from the "Stopped" program state to the "Going Down" program state occurs.

The connections between the program states "Going Up" "Stopped" and "Going Down" logically create a program loop 46. The program loop 46 controls the sequence of operations to be performed by the elevator 12. In the preferred embodiment, a program loop can only have one active program state at any one time. In this way, the controller can keep track of the sequential processing of an individual scheme of tasks. The program loop 46 in FIG. 2b exhibits the characteristic of having only one program state active at any one time in order to make the algorithms involved in program execution and debugging more efficient and to reduce ambiguity in the system.

In more complex machines, a single program loop will only represent the control of a particular independent sub-part of the machine or process. Usually, multiple program loops are required to independently control several sub-parts of a complex machine or process.

Figure 2D:
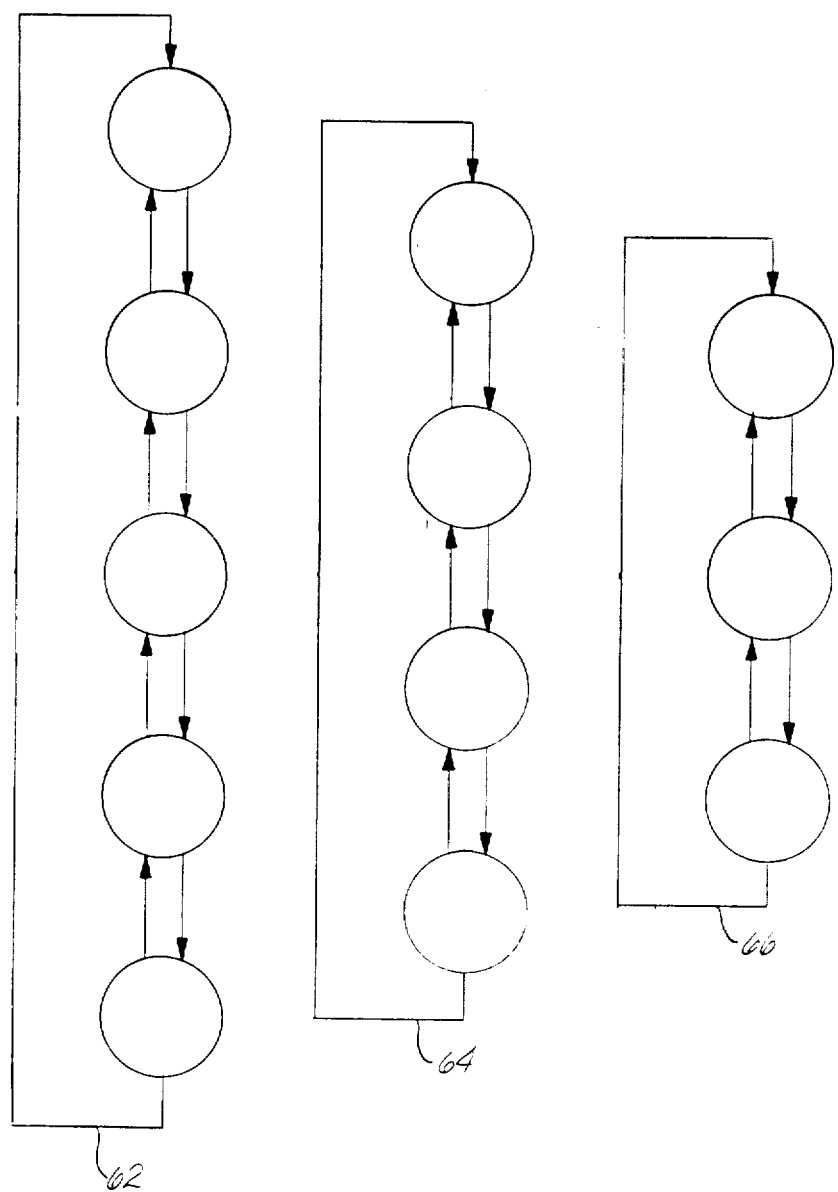
FIG. 2d is a more complicated state diagram.

FIG. 2d, shows a more complex machine represented by a plurality of state diagrams 62, 64 and 66. Each state diagram represents a program loop which depicts the sequential control scheme for a section of the machine or process. The present invention emulates these diagrams by processing program loops which control three hypothetical sub-parts of a machine asynchronously (also called multi-tasking). A particular program loop can be processed independently of the rest of the program loops or it can "hand shake" and synchronize with the other program loops using some convenient mechanism such as flags or a statement of the type "if loop N at State M," which tests the value of the active state in a different loop. This multi-tasking capability of the controller is largely transparent to the programmer and the operating system and language provide simple means to implement it.

To facilitate the execution of program states within a program loop, the preferred embodiment provides a program loop-record for each of the active program loops. Referring to FIG. 3a, the program loop-record 90 has fields 92 and 94 which hold simple variables. The first simple variable 92 is an identifier of the program loop. The second simple variable 94 is an identifier of the active program state or an address in the memory of the start of the active program state. Both the address or the identifier of the program state can be easily converted to the other. The remaining portion at 96 of the pointer 90 contains other less important status information about the program loop. The real purpose for the program loop record 90 is to keep track of which program state within a particular program loop is active at any one point in time.

When a particular program loop becomes active, a program loop record 90 is associated with the loop. As various program states became active within the program loop, simple variable 94 is overwritten with the new program state addresses or identifier. The program loop record 90 enables one program loop to "hand shake" by interrogating a second program loop to determine which state is active in the second program loop. Furthermore, the program loop record 90 can be accessed by terminal 80 to allow programmers to display or modify the active program states. In the preferred embodiment, the program loop records are all stored in a task table FIG. 3b which is stored in memory 10A (FIG. 1). The task table functions primarily to enable processing of several program loops all at the same time. The program loop records are packed in the task table so that all non-empty records are at the start of the table and they are arranged in the numerical order of their respective program loop identifiers (FIG. 3a at 92). Referring to FIG. 3b, the first program loop record 100 in the task table has the lowest loop identifier (e.g., 1) and therefore is first to be scanned during a program scan because scanning occurs in numerical order of the program loops, scanning and processing the active state only in each program loop, scanning and processing each statement in each active state in the order it appears in the state block. Loop record 102 has the second lowest loop identifier in the table and it will be processed second. Loop record 104 has the third lowest loop identifier (e.g., 3) associated with it and it will be processed third. Loop record 106 has the next lowest identifier (e.g., 34) and it will be processed fourth.

Also associated with the task table is a task table register 112 (FIG. 3c) which points to the program loop record which is currently controlling the execution of an active program loop. To scan and process the program loops in the task table, the controller writes the address of the active program loop record 90 into the task table register 112.

When the controller executes the program loop associated with record 100, only one block of statements in the program state associated with program loop 100 is executed or activated. Then, the controller will process the next program loop (e.g., 2) and only one program state associated with it will be processed. The controller repeats this procedure for every active program loop. When the task table register points to program loop record 108 (FIG. 3b) which has a zero associated with the loop identifier, the controller is alerted that it has reached an empty program loop record. When this happens, the operating system of the controller points the task table register back to the top of the task table and executes the next program state of the first program loop in the table. This procedure is an endless process unless a terminal interrupt or the like occurs.

Because only a few lines of program code are processed for each program state, the controller can jump very quickly from one program loop to the next. In this way, the controller appears as if it is processing multiple program loops or tasks all at the same time.

In order to show that a program loop has been activated, the controller will assign a program loop record to the activated program loop and insert the new program loop record (FIG. 3a at 90) into the task table. The system evaluates the numerical value of the new program loop identifier (FIG. 3a at 92) and fits the program loop pointer into position in numerical order within the task table corresponding to the numerical value. For example, if the numerical value is greater than 34, the new pointer will replace record 108 in the task table (FIG. 3b). However, if the new program loop identifier is between 3 and 34, then the program loop pointer 108 will be swapped with the pointer at 106 and the new program loop pointer will be inserted at 106. Because the present embodiment of the task table can have a maximum of 31 program loop pointers in the task table, the contents of the task table must be evaluated to ensure that there is space available for the new pointer. The controller will alert the programmer when the task table has reached capacity or when an overflow condition in the task table has occurred.

Referring to FIG. 4, a logical representation of a trace table 82 is shown. The trace table 82 is stored in the memory portion 10A of the controller (FIG. 1). The trace table is a linear table in memory which is made to function as a wrap around "endless tape" storage buffer. The trace table 82 works quite similarly to an aircraft flight recorder. An aircraft flight recorder provides a "playback" of what happened to the airplane just prior to when the airplane "crashes". Likewise, the trace table records what happens to the states of a machine or process just prior to an event requiring investigation. Stated differently, the playback can be used to find out exactly what decisions were made by the controller just prior to the time an error occurs.

A trace table register 84 stores the addrress of the last recorded location in the trace table 84. FIG. 4 shows register 84 pointing to record 74 as the last location to be filled in the trace table 82. When the trace table has been filled at 86, the system will continue to store new data and overwrite old data at 0.

The following is a detailed description of the preferred embodiment for processing finite state applications programs and for facilitating diagnostics of unexpected conditions in the finite state applications program.

Figure 9:
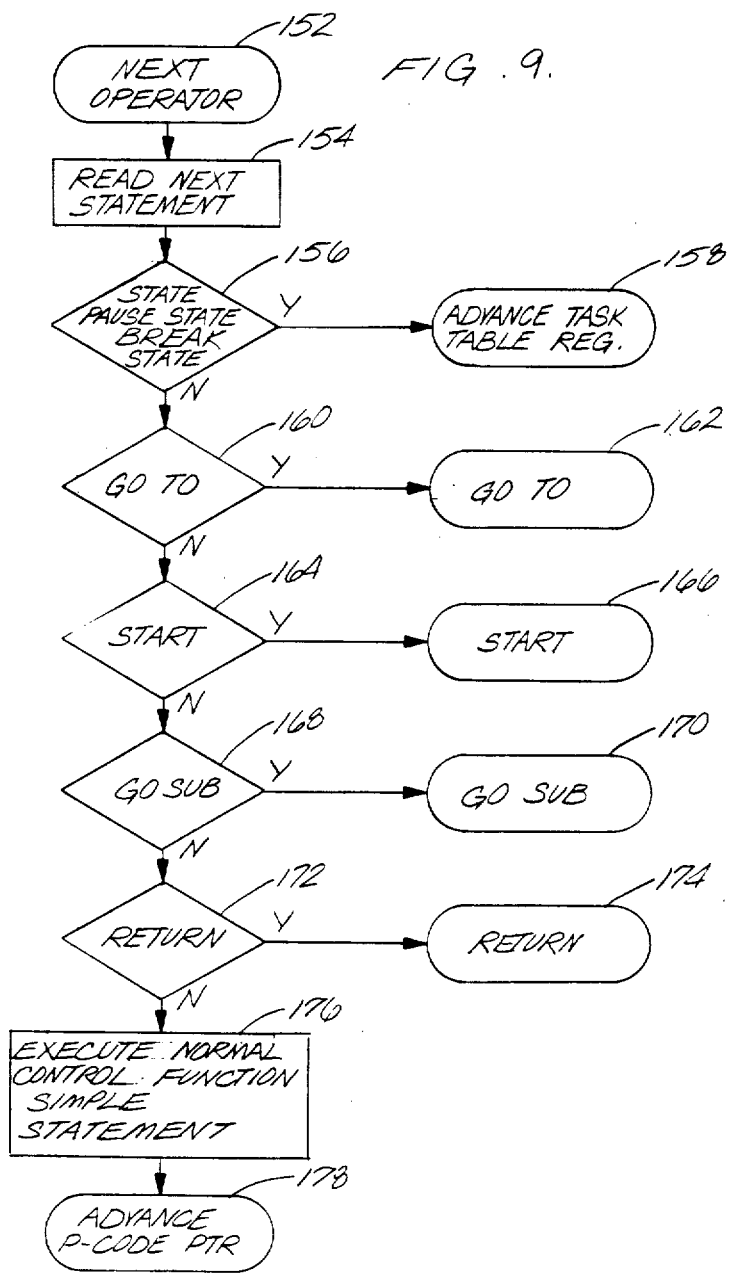
FIG. 9 is a schematic block diagram of the subroutine NEXT OPERATOR.

FIGS. 5, 6, 7, 8, 9, 10, 11, 12 and 13 are flow diagrams that represent routines which together with the programmable controller control the processing of an applications program. Particularly, in FIG. 5, routine START PROGRAM initializes the various pointers and tables of the programmable controller. In FIG. 6, routine FIRST OPERATOR evaluates the first statement in a program state. In FIG. 7 ADVANCE P-CODE POINTER controls a standard applications program pointer (p-code pointer). This pointer points to the address in memory of the current statement being executed by the controller. ADVANCE TASK TABLE REGISTER in FIG. 8 effects which record the task table register points to. In FIG. 9 routine NEXT OPERATOR evaluates all statements other than the first statement of the program state.

Figure 10:
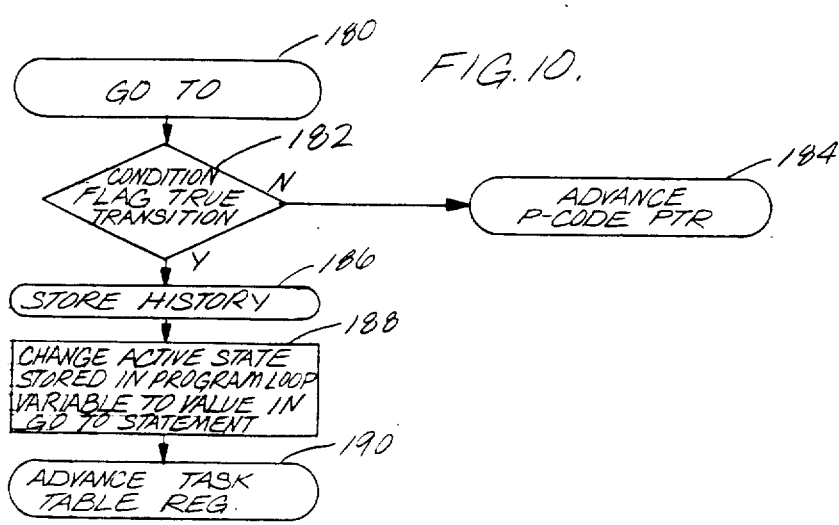

GOTO in FIG. 10 controls which states are active in the program loop. START initiates a change of state, or establishes an active state in the loop specified in the start statement. GOSUB in FIG. 12 and RETURN in FIG. 13 provide a subroutine call and return facility which operate at the state level.

Referring to FIG. 5, a flow block diagram for START PROGRAM is shown. This routine initializes the program controller. Specifically, at block 122, the controller initializes the task table (FIG. 3b), the task table register (loop pointer) (FIG. 3c), and the p-code pointer. The task table is initialized with a program loop record that points in memory to the first active program loop. Also, the program loop record is initialized to the first program state in that program loop. The p-code pointer is initialized with the start address of the first active program state i.e., the first statement. The system is now ready to process the first active loop. In block 124, the system calls subroutine FIRST OPERATOR to evaluate the first statement pointed to by the p-code pointer.

The block diagram in FIG. 6 depicts routine FIRST OPERATOR. At block 128, the controller analyzes the type of statement pointed to by the p-code pointer. The first statement encountered can only be a state type statement either: a "State" statement, a "Pause" statement, or a "Break State" statement. A state type statement is a program state delimiter which symbolizes the beginning of a program state. A Pause statement also causes its own program loop to pause but allows processing of other active program loops. A Break State statement also causes the entire system to stop running and return to the monitor in order to alert the programmer that the controller has discontinued processing. If a state statement is encountered at 130, the controller advances the p-code pointer to the next statement address in the program state by entering routine ADVANCE P-CODE POINTER at 132. If the statement encountered in the program state is a pause state statement at 134, the system with enter ROUTINE ADVANCE TASK TABLE REGISTER at 136 to advance processing to the next active program loop. If the statement encountered is a Break State type, routine GO TO MONITOR at 138 is entered.

GO TO MONITOR places a message on the terminal to alert the user of the programmable controller that a break statement has been reached and that execution of the program has been halted.

Referring to FIG. 7, a detailed block diagram of the routine ADVANCE P-CODE POINTER is shown. At block 142 the p-code pointer is incremented to the next statement in the active program state. The controller processes the next statement by entering routine NEXT OPERATOR at 144.

When the Pause State statement is encountered by FIRST OPERATOR (FIG. 6), routine ADVANCE TASK TABLE REGISTER is entered. The purpose of this routine is to ignore the current loop and switch to the processing of the next program loop. FIG. 8 shows a detailed block diagram of this routine. At block 148, the task table register is advanced to the address of the next program loop pointer in that task table. Routine FIRST OPERATOR is entered at block 150 to process the active program state of the next program loop in the task table.

When a State type statement is encountered at 128 (FIG. 6) the controller proceeds to routine ADVANCE P-CODE POINTER 142 (FIG. 7). As mentioned above, this routine advances the p-code pointer to the next statement in the program state and then enters routine NEXT OPERATOR at 144. The first statement of a program state is always evaluated by routine FIRST OPERATOR.

FIG. 9 is a schematic block diagram of the routine NEXT OPERATOR. The purpose of this routine is to evaluate any type of simple statement in a program state, other than the first statement. At block 154, the controller reads the next command pointed to by the p-code pointer. If the next statement encountered is either a State statement, a Pause State statement, or a Break State statement, the controller will enter routine ADVANCE TASK TABLE REGISTER at 158 (FIG. 9) because the end of the state block has been reached. If the statement encountered is not one of the three above, then the controller will evaluate whether the statement is a GoTo statement at 160. If the statement is a GoTo statement, then the routine GOTO is entered at 162. This routine will be discussed in more detail below.

If the statement is not a GoTo statement, then the controller will advance to block 164 and determine whether the statement is a Start statement. If the statement is a Start statement, the controller will enter routine START at 166. We will discuss this routine shortly.

If the statement is not a Start statement, the controller will advance to block 168 and determine whether the statement is a GoSub statement. If it is a GoSub statement, the controller will enter routine GOSUB at 170. Assuming that the statement is not a GoSub statement, the controller will determine whether the statement is a Return statement at 172. If it is a Return statement, the controller will enter routine RETURN at 174.

If the statement is not a GoTo, Start, GoSub or Return type, then the controller will advance to block 174 and evaluate the statement as a normal control statement. Normal control statements do not affect the status of the program states, or stated differently, the program state continues to process without changing which state is active in the current or a different program loop. Whereas, the statement types: Go To, Start, Go Subroutine, and Return, all potentially affect the status of the program state and/or the corresponding active program loop. As discussed earlier, these types of statements affect the status of a particular program state if a set of conditions is satisfied. Once the controller has evaluated the normal control statement at 176 (FIG. 9), it will enter routine ADVANCE P-CODE POINTER to evaluate the next statement in the active program state.

FIG. 10 is a block diagram of the routine called GOTO. The GOTO routine determines if a particular set of conditions are satisfied, and if so changes the action state in the loop currently being processed to the new value designated in the GOTO statement and then advances processing to the next program loop in the task table. GOTO provides the basic state changing function whereby transition conditions for active states which are true cause a new specified state to become active in place of the currently active state. Once a GOTO statement is actioned in a state, then no further statements are processed in that state.

At block 182 of FIG. 10, the controller evaluates the condition flag status resulting from the evaluation of the condition part of the compound GOTO statement. If the set of conditions in the compound GoTo statement are not satisfied, the controller will enter routine ADVANCE P-CODE POINTER at 184. If the condition is satisfied, the controller will call subroutine STORE HISTORY at 186. STORE HISTORY saves a "decision point" address and the program loop identifier into the trace table of the current loop being processed (FIG. 4). The decision point is the address of the simple statement in the program at which the controller found the conditional part of the compound statement containing the GOTO to be true. At block 188, the current program loop record in the task table is updated so that simple variable 94 (FIG. 3a) points to a new program state address. ADVANCE TASK TABLE REGISTER at block 190 is then called to update the task table register so that it points to the next program loop pointer in the task table.

Figure 11:
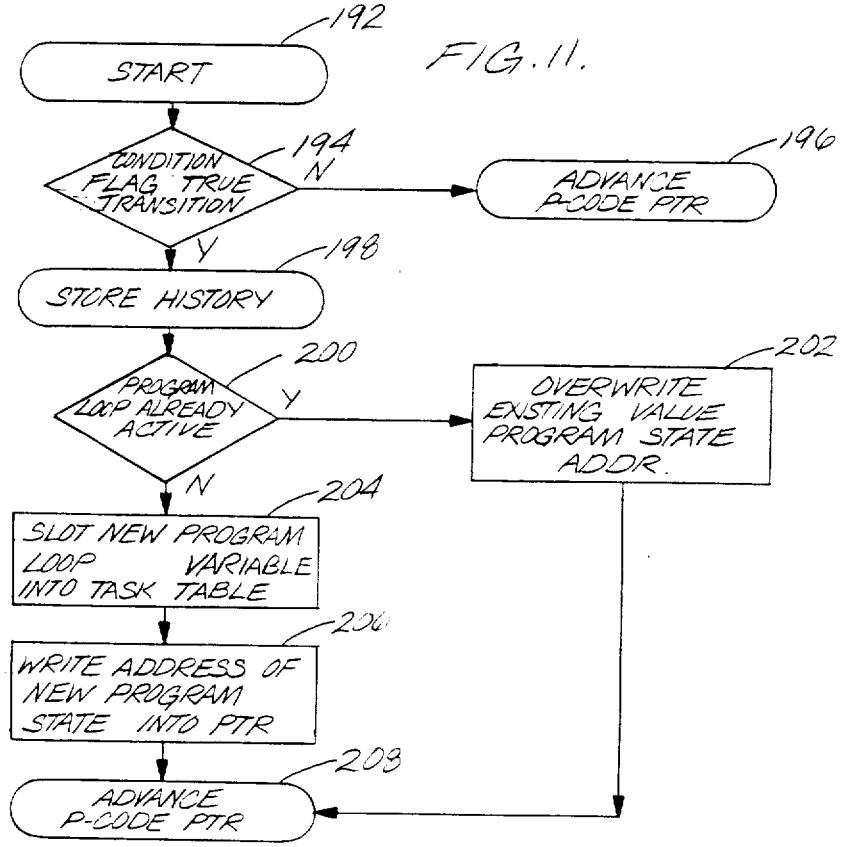
FIG. 11 is a schematic block diagram of the subroutine START.

FIG. 11 is a block diagrm of the subroutine called START. The purpose of START is to initiate processing of any other program loop at a state specified in the START STATEMENT. By comparison, the GOTO subroutine can only advance processing to the next state stored in the current program loop.

At block 194 of FIG. 11 the condition flag status resulting from the evaluation of the condition part of the compound Start statement is evaluated. If the condition flag is false the controller enters routine ADVANCE P-CODE POINTER at 196. If the condition is true, then the controller advances to block 198 and processes subroutine STORE HISTORY. STORE HISTORY saves the address of the decision point and the program loop identifier for the current loop. At block 200 the controller determines whether the specified program loop is presently active and stored in the task table. If the program loop is already active, then at block 202, the controller overwrites the address currently stored in simple variable 94 of the program loop pointer (FIG. 3a) with the address of a new program state to be activated. However, if the program loop is not presently active, then the system will slot a new program loop record into the task table at 204. The new program loop record will be placed in numerical order in the task table via the numerical value of its program loop identifier 92 (FIG. 3a). At block 206, the address of the new program state will be written into the program loop record. At block 202, the controller will enter routine ADVANCE P-CODE POINTER and go to the next statement.

FIG. 12 is a block diagram for GOSUB. GOSUB affects the processing of the active program loop. This routine enables a new state to be activated in the current program loop and status information to be saved so that a corresponding RETURN statement can return control to the state containing the GOSUB statement at the next statement following the GOSUB statement. This provides a subroutine call and return function at state level.

Referring to block 210 of FIG. 10 (the condition flag status resulting from the evaluation of) the condition part of the compound GoSub statement is evaluated. If the condition has not been satisfied, then the controller will enter routine ADVANCE P-CODE POINTER at 214. However, if the condition statement is satisfied, then the controller will call subroutine STORE HISTORY at 216. This subroutine will save both the decision point and the program loop identifier in the trace table. At block 218, the controller will temporarily save in memory the present address stored in the p-code pointer, the address of the currently active program state, and other necessary status information for use by a corresponding RETURN statement. At block 220, the address of the new program state is written into simple variable 94 of the program loop record 90 (FIG. 3a), and this address will also be stored in the p-code pointer. The controller will initiate activity in the new program state by entering routine FIRST OPERATOR at 222.

FIG. 13 is a detailed schematic block diagram of routine RETURN. The purpose of the Return statement is to get the controller to return to the program state which contained the GOSUB statement. In other words, once the specified program state or state diagram called by GOSUBROUTINE (FIG. 12) is completely executed, the controller will return control to the old program state which was active when GOSUB was executed. This requires that the status values stored by GO SUBROUTINE be restored.

Referring to FIG. 13 at block 224, the controller evaluates the condition flag status resulting from the evaluation of the condition part of the compound Return statement. If the condition has not been satisfied, then the controller will enter routine ADVANCE P-CODE POINTER at block 226. However, if the condition is satisfied, then the controller will call STORE HISTORY at block 228. This routine saves the address of the decision point and the loop identifier in which it occurred. At block 230, the controller will restore the values saved at block 218 of GOSUB (see FIG. 12). ADVANCE P-CODE POINTER at block 232 is then entered to continue processing in the old program state.

Figure 16:
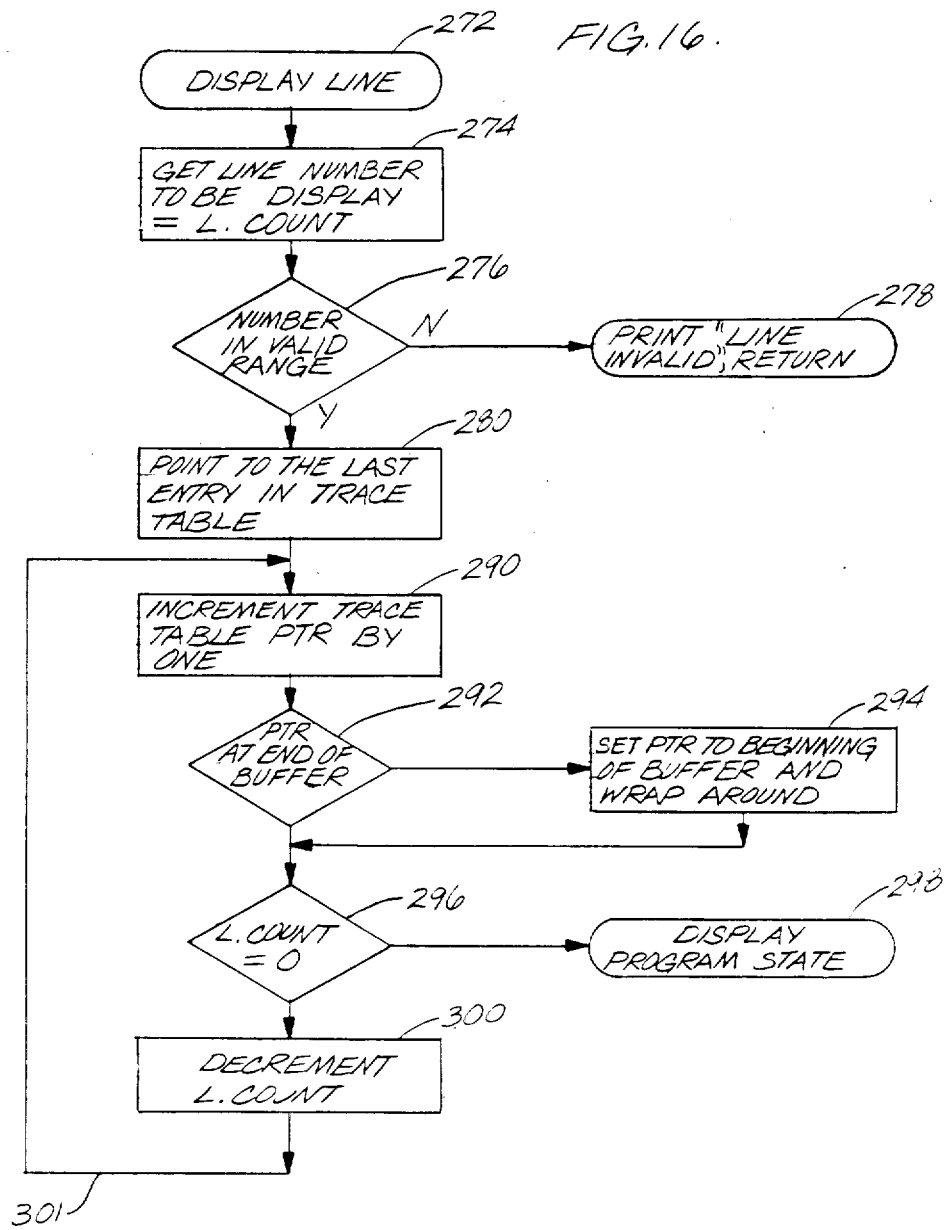
FIG. 16 is a schematic block diagram of the debugging routine called DISPLAY LINE.

FIGS. 14, 15, 16, 17 and 18 are block diagrams of programs which facilitate debugging of application programs. Specifically, FIG. 14 is a block diagram of STORE HISTORY which is a subroutine for updating the trace table (FIG. 4) with information and is called by the routines, GOTO, START, GOSUB and RETURN. The remaining figures are essentially diagrams of subroutine utility which enable a programmer on his own command to view information stored in the trace table, the task table or in the program state itself. Specifically, FIG. 15 is a block diagram of a subroutine called DISPLAY HISTORY which displays the information stored in the trace table on terminal 80. FIGS. 16 and 17, respectively are subroutines DISPLAY LINE and DISPLAY PROGRAM STATE. These routines are responsible for displaying the statements of a particular program state and illustrate, e.g., where within the program state was the decision point at which the controller decided to execute the GOTO, GOSUB, START or RETURN statement that caused the change of state. FIGS. 18 and 19, respectively, are DISPLAY LOOP and FOUND LOOP which display the active program states and associated active program loops which are stored in the task table.

STORE HISTORY (FIG. 14) is called whenever the status of a program state changes. STORE HISTORY is called in subroutines GOTO (FIG. 10 at 186), GOSUB (FIG. 12 at 216), START (FIG. 11 at 198), and RETURN (FIG. 13 at 228). As discussed above, STORE HISTORY essentially saves into the trace table the address of the decision point in the active program state and the loop identifier of the program loop being processed.

At block 236 in FIG. 14, the address stored in the trace table pointer 84 (FIG. 3) is evaluated. If the address pointed to by the trace table pointer is at the end of the trace table, the trace table pointer will be automatically set to the begining of the trace table at block 240. This step makes the trace table appear as if it is an endless loop (see FIG. 4). Whether the pointer is at the end of the trace table or not, the address of the decision point will be written into the record pointed to by the trace table pointer at block 242. Additionally, at block 244, the controller will also save the program loop identifier of the loop being processed into the record and at block 246 the new address will be saved into the trace table pointer. At block 248, the controller will return to the calling routine.

Subroutine DISPLAY HISTORY enables a programmer to evaluate the history of program states which occurred during the processing of an applications program. The programmer initiates this program when he wants to see a display of what was stored by the trace table. This sub-routine displays the contents of the trace table in a two-axis table. The horizontal axis presents the program loop identifier and the program state corresponding to the GOTO, GOSUB, RETURN or START statement that made the entry in the trace table. The vertical axis represents the sequential order of the program states and program loops with the newest states at the top. DISPLAY HISTORY is a subroutine that is initiated directly by a user at terminal 80 (FIG. 1). A typical printout of the DISPLAY HISTORY might be:

| | DISPLAY HISTORY | |
|---|---|---|
| ACTIVE PROGRAM STATES | ACTIVE PROGRAM LOOPS 1 5 10 15 20 | |
| 0 | 2 | 2 | ; display the history table ; program states and loop identifiers ; line 0 shows state 2 exited (loop 2) |
| 1 | 3 | 1 | ; line 1 shows state 3 exited (loop 1) |
| 2 | 2 | 1 | ; line 2 shows state 2 exited |
| 3 | 3 | 1 | ; line 3 shows state 3 exited |
| 4 | 2 | 1 | ; line 4 shows state 2 exited |
| 5 | 200 | 2 | ; line 5 shows state 200 exited (loop 2) |
| 6 | 1 | 1 | ; line 6 shows state 1 |

-continued

| | DISPLAY HISTORY | | |
|---|---|---|---|
| ACTIVE PROGRAM STATES | ACTIVE PROGRAM LOOPS 1 5 10 15 20 | | |
| 7 | 1 | 1 | exited ; line 7 shows loop 2 started (oldest) |
| 8 | END | | ; no more entries in the trace table |

Note that the command DISPLAY HISTORY is shown first on the screen. Second, across the top are the words "active program states" and "active program loops". The two columns beneath these statements refer respectively to the active program states and the active program loops. A short comment is provided in this specification on the right-hand side to explain each line. The program state which caused a state change last is shown in line 0. Program state 2 in program loop 2 was the last to make a change. The first program state to cause a change and the program loop in which it resided is shown on line 7. Line 8 shows the end of the trace table.

If an unexpected condition occurred altering the expected flow of active states in the applications program, a programmer could easily narrow down which program state the unexpected condition occurred in by viewing the sequence of program states that occurred during processing. For example, assume the program state 3 should not have occurred in loop 1 (line 3 in the table) in the applications program. The unexpected condition must have occurred in program state 2, the previous state in loop 1 which caused the status of program state 2 to change to program state 3. The programmer can more closely analyze program state 2 and the conditions which caused program state 2 to change to program state 3 by calling DISPLAY LINE (FIG. 16). This program will be discussed shortly.

Referring to DISPLAY HISTORY in FIG. 15 and at block 252, the controller prints the header which appears at the top of the screen as shown above. Next, at block 254, a copy of the trace table and a copy of the trace table pointer are stored into a buffer. By placing the trace table and trace table pointer in a buffer, a snap shot of what was stored in the trace table when the request for DISPLAY HISTORY was made is acquired and remains unchanged for as long as needed while allowing continued updating of the main trace table. The reason for this step is that the trace table is a dynamically changing table and it is constantly being updated. Only the status of the table at the time the request is made is required for purposes of analysis. At block 256, the system will get the address stored in the trace table pointer of the last record stored. At block 258, the controller will evaluate this address to determine whether the buffer is empty. If the buffer is empty, an end statement is printed and the controller returns to its original processing at block 260. If the buffer is not empty, the trace table is evaluated to determine if it points to the end of the buffer at block 262. If the pointer is at the end of the buffer, then the trace table pointer is set to the beginning of the buffer at block 264. In this way, the controller processes the contents of the trace table as if the trace table were an endless loop. Regardless of whether or not the trace table pointer is at the end of the buffer, the loop identifier and the state address are obtained from the buffer at block 266. The decision point address will be used as a starting point in locating the program state number which has been previously stored in the state delimiting statement of the program state. At block 268, the program state numbers and the program loop identifiers will be printed in their respective columns as shown above. At block 270, the trace table pointer is incremented to the next record in the buffer and the routine will continue processing at block 258. The program will iterate loop 271 until all of the program states, and the corresponding program loops, which were stored in the trace table, are printed.

In our example above, the programmer knew that program state 3 should not have occurred. He also knows that an unexpected condition must have occurred during program state 2 on line 4 of DISPLAY HISTORY. The programmer can analyze more closely what occurred in program state 2 and determine exactly what caused the program state to change to program state 3, by calling the sub-routine DISPLAY LINE. DISPLAY LINE generates a listing of the statements of the program state and indicates at which state within the program state a decision was taken which caused the status of the program state to change.

Referring to FIG. 16, a detailed block diagram for the subroutine DISPLAY LINE is shown. This program is initiated directly by the programmer via a call from the terminal 80 (FIG. 1). At block 274, the programmer will designate which line of the printout for DISPLAY HISTORY he wants to have expanded. For example, because he is interested in what occurred from line 4 to line 3, the programmer will expand line 4 via the DISPLAY LINE. At block 274, the desired line number of DISPLAY HISTORY is set equal to the variable "Line Count". At block 276, the controller will determine if the line number chosen fails within the valid range of numbers. If it does not, then the controller will print "line invalid" and return to its normal processing at block 278. Assuming that the line number is within a valid range, the last data entry in the trace table which contains data for line 7 will be pointed to by the trace table pointer at block 280. Next, the trace table pointer is incremented by one at block 290. At block 292, the controller will determine whether the trace table pointer points to the end of the trace table buffer. If it does, the trace table pointer will be set to the beginning of the trace table at block 292. Regardless of whether or not the trace table pointer points to the end of the buffer, the controller will evaluate the "line count" to determine if it is zero at block 294. If "line count" is equal to zero, then the desired program state has been uncovered, and DISPLAY PROGRAM STATE will be entered at block 296. If "line count" is not equal to zero, "line count" is decremented by one and the trace table pointer is incremented by one at block 290. Loop 301 iterates until "line count" is equal to zero at block 296, and the designated line is found.

FIG. 17 shows a detailed block diagram of the routine DISPLAY PROGRAM STATE. At block 304, the controller will determine if the record pointed to by the trace table pointer is empty. If the record is empty, then the system will print a statement on terminal 80 that the line requested is invalid and return to its normal processing at 306. Assuming that the record is not empty, the controller will extract the address of the decision point from the trace table and determine the starting address for the program state which encompasses the decision point at 308. In block 310, the controller will print the text for one simple statement of the program state. In block 312 the controller will check to see if it has encountered the decision point in the program by comparing the address of the statement printed to the decision point address stored in the trace table. If the decision point is reached, then the statement "DECISION POINT" will be printed at block 314. The controller will then step to the next statement in the program state at block 316. At block 318, the controller will then determine whether the next statement is a state delimiting statement, state statement, pause state statement or break state statement. If any one of these three statements are encountered, the controller will return to its normal processing at block 320 because the end of the state block has been reached. If none of the three statements are encountered, processing will continue via loop 322 until all the statements of the program state are printed.

FIG. 18 is a block diagram for DISPLAY LOOP. DISPLAY LOOP is a subroutine for displaying the contents of the task table. Referring to a typical screen display below, loop identifiers are presented in a horizontal axis and the active program state within each of the program loops is designated vertically beneath each of the program loop identifiers. The following is a typical screen display of an output for DISPLAY LOOP.

| Program Loop Identifiers | 1 | 2 | 3 | 4 | 5 | ... | 30 | 31 |
|---|---|---|---|---|---|---|---|---|
| Program State Identifiers | 201 | 19 | 1 | 0 | 0 | | 0 | 0 |

At block 324 of FIG. 18, the controller is commanded to print the loop identifiers as shown in the first line of the screen display, as shown above. Block 326 sets the task table register to the first program loop pointer in the task table. A variable called "loop count" is set equal to zero at block 328. "Loop count" is incremented by one at block 330. The controller then determines whether "loop count" is equal to the maximum number of program loops that can be stored in the task table. If this condition is true, then the controller will return to its original processing at block 334. If loop count is not equal to the maximum number of program loops, then the controller will get the loop identifier from the relevant task table record. At block 338, the loop identifier is checked to determine if it is equal to zero. If the program loop identifier is equal to zero, then the system will return to its normal processing at block 342, however, if the loop identifier is equal to the "loop count", then subroutine LOOP FOUND is called at block 344. If the program loop identifier is not equal to "loop count", then the controller will tab across the screen to the next loop position at 348. "Loop count" is incremented by one at block 350, and the blocks after block 328 will be iterated until no more active program loops are in the task table.

FIG. 19 is a detailed block diagram of subroutine FOUND LOOP. At block 354, the start address of the active program state stored in the program pointer will be accessed. The program state number is extracted from a pre-stored value in the state delimiting statement in the program state. At block 356, the task table pointer is incremented to the next program loop pointer and the controller returns to the routine DISPLAY LOOP at 364 of FIG. 18.

The invention has been described in an exemplary and preferred embodiment, but it is not limited thereto. Those skilled in the art will recognize that a number of additional modifications and improvements can be made to the invention without departure from the essential spirit and scope. For example, a number of different software techniques and any number of different software languages would be suitable for implementing the disclosed invention.

APPENDIX

However, by way of explanation, practical applications of the invention may be useful to put the invention into effect, an interpreter now to be described is used to execute an intermediate or "pseudo code" (P code). The interpreter enables an applications program to be written essentially in the form of one or more state diagrams, each of which defines operations of a part of a machine or process whereby any individual state defines the output signals and other data transmitted to the machine or process for a finite period of time.

The following interpreter used an RCA 1802 microprocessor and is assembled using a cross assembler form 250 A.D. Inc.

The interpreter is used to execute the applications program in which there are:
(1) a task table, i.e., a table indicating the states active in each loop, and containing the loop variables
(2) a trace table which when displayed enables the state changes in the program run to be traced.

Details of the interpreter are as follows:

```
REGISTER ASSIGNMENTS FOR COSINT.
;R0         not used
;R1         interrupt
;R2         D stack ptr
;R3         Program Counter
;R4         Call instruction ptr
;R5         Return instruction ptr
;R6         link for call
;R7         POP instruction ptr
;R8         Macr call ptr
;R9         Return address stack ptr
;RF         Points to P code
;RE         Points to the task table
;RD         Points to the data page
;RC         Decision point address
;RB         Points to the trace table
;RA         Can point to the data page
;X          is normally set to RF
;DF         is used as the condition flag
;X,DF       must be protected to preserve normal values
;           if affected by other actions than specified above
```

-continued

```
RAMSIZE         EQU       2000H
NOTRACEMSK      EQU       80H
OPMAPSZ         EQU       32
IPMAPSZ         EQU       32
NUMOFL          EQU       21; the number of loops
;The order of the data in the task table for each loop is:
TTLOOP          EQU       0
TTSTATE         EQU       TTLOOP+1
TTONCE          EQU       TTSTATE+2
TTACCUM         EQU       TTONCE+1
TTEXTEN         EQU       TTACCUM+1
TTSTATESTR      EQU       TTEXTEN+1
TTONCESTR       EQU       TTSTATESTR+2
TTRTNAD         EQU       TTONCESTR+1
TTLENGTH        EQU       TTRTNAD+2
                ;macros
CALL            MACRO ADDRESS
                MACLIST ON
                    SEP R4
                    DW ADDRESS
                    MACLIST OFF
                ENDM
RTN             MACRO
                MACLIST ON
                    SEP R5
                    MACLIST OFF
                ENDM
LXI             MACRO REG, ADDRESS
                MACLIST ON
                    LDI >ADDRESS
                    PHI REG
                    LDI <ADDRESS
                    PLO REG
                    MACLIST OFF
                ENDM
PAGE.           MACRO NUMFROMEND
                  IFMA 1
                DS <(100H-<NUMFROMEND-<$)
                ELSE
                DS <(100H-<$)
                ENDIF
                ENDM
;ROUTINES NOT LISTED
;CALL                     is the RCA standard call routine modified
                          to preserve registers
;RTN                      is the RCA standard return routine modified
                          as CALL
;CALL           PRINT     hardware dependant.- prints on the terminal
;                         the text string pointed to by the following
;                         2 bytes
;CALL           TYPE2D    hardware dependant.- prints the decimal
;                         value of the accumulator D
;CALL           TYPE4I    hardware dependant.- prints the decimal
;                         value of the 2 bytes pointed to by register
;                         RF
;CALL           COMPRT    hardware dependant.- prints out the
;                         instruction pointed to by RD
;                         RD returns pointing to the next P-code
;                         instruction
;                         RB is corrupted
;The following are routines that are called by the macro MACR
;MACR           BMINA     does the 16 bit subtraction RB=RB-RA
;MACR           IFBISO    returns DF set if register RB=0
;MACR           STEPON    is entered with RD pointing to a P-code
;                         instruction (A) and returns the following:
;                         RD pointing at the next P-code instruction
;                         (B)
;                         RB pointing to the p-code token of (A)
;                         DF set if the P-code instruction (A)
;                         requires compiling
;                         D containing the instruction (A) length
;                         RC points to 2 bytes containing flags that
;                         describe the instruction type
;MACR           SDIR      is a store direct routine
;POSH,POPR push a register to the stack and
;Pop it off
;INCT PROCESSES STATE
;multi-loop overhead
;INCT:
                GLO       RE
                ADI       TTLENGTH-TTONCE+TTSTATE
                PLO       RE
```

-continued

| | | | |
|---|---|---|---|
| GETSTP: | | | |
| | LDA | RE | |
| | BNZ | MORE | ;Loop number greater than 0 |
| GETSPT1: | | | |
| | ;finished all active loops so check if running | | |
| | ;under monitor control | | |
| | LXI | RA,MONFLAG | |
| | LDN | RA | |
| | LBNZ | MONITOR1 | ;go to the monitor |
| STARTINTER: | | | ;interpreter only running |
| | CALL | IOSCAN | ;update all IO |
| | BDF | OFFLINEX1 | |
| | ;PUT FIXED VALUES BACK IN RD | | |
| | LDI | >OPMAP | |
| | PHI | RD | |
| | LXI | RC,INPOUT | ;check for a terminal interrupt |
| | LDA | RC | |
| | STR | R2 | |
| | LDN | RC | ;get input buffer pointers |
| | XOR | | ;and compare them (=means ;empty) |
| | BZ | CSRENT | |
| OFFLINEX: | | | |
| | LDI | 3 | ;terminal interrupt |
| OFFLINEX 1: | | | |
| | MACR | SDIR | |
| | DW | MONFLAG | |
| | LBR | MONITOR1 | |
| CSRENT: | | | |
| | ;set up RB | | |
| | LXI | RB,TRCTAB | |
| | ;point to first loop | | |
| | LXI | RE,(TT+TTSTATE) | |
| | SEX | RF | |
| | LDA | RE | |
| ;SET UP P CODE POINTER FROM TASK TABLE | | | |
| MORE: | | | |
| | PHI | RF | |
| | PHI | RC | |
| | LDA | RE | |
| | PLO | RF | |
| | PLO | RC | |
| | INC | RC | ;set up trace initial decision ;point |
| ;THE FIRST OPERATOR MUST BE STATE, PAUSE STATE | | | |
| ;OR BREAK STATE AND THESE REQUIRE SPECIAL TREATMENT. | | | |
| | SMI | 00 | ;set DF for first time |
| | LXI | RA,ONCEMASK | |
| | LDI | 1 | |
| | STR | RA | ;initialize the once mask |
| | LDA | RF | |
| | ;ONLY 3 OPERATORS ARE LEGAL HERE. | | |
| | PLO | RA | |
| | XRI | <STATE | |
| | LBZ | STATEII | |
| | GLO | RA | |
| | XRI | <PSST | |
| | LBZ | INCT | ;PAUSE STATE JUST OMITS ;PROCESSING THIS LOOP. |
| ;PROCESS A BREAKSTATE INSTRUCTION | | | |
| TRPST: | | | |
| | LXI | RA,STATESTORE | |
| | LDA | RF | ;PUT STATE NUMBER IN |
| STATESTORE | | | |
| | STR | RA | |
| | INC | RA | |
| | LDN | RF | |
| | STR | RA | |
| | DEC | RF | |
| | DEC | RF | ;DECR TO BREAK STATE OPERATOR |
| | LXI | RA,MONFLAG | |
| | LDI | 2 | |
| | STR | RA | ;MONFLAG |
| | LBR | MONITOR1 | ;GO TO MONITOR |
| | ;Exit routines from each function | | |
| I3: | INC | RF | |
| STATEII: | | | |
| I2: | INC | RF | |
| I1: | INC | RF | |
| NXTOPR: | LDA | RF | ;get next TOKEN from the P Code |
| | LBR | VBR1 | |

```
            PAGE.
VBR1:       PLO     R3              ;jump to the interpreter
                                    ;service routine
            ;INTERPRETER TABLE
ITEPTTBL:
AIFO:       LBR     AIFOI           ;AND IP/FLAG ON,
OIFO:       LBR     OIFOI           ;OR IP/FLAG ON
IIFO:       LBR     IIFOI           ;IF IP/FLAG ON (1)
SOF:        LBR     SOFI            ;SET OP/FLAG
GOTO:       LBR     GOTOI           ;GO TO
STATE:      LBR     STATEI          ;STATE
PSST:       LBR     PSSTI           ;PAUSE STATE
BRST:       LBR     BRSTI           ;BREAK STATE
REM:        LBR     REMI            ;REMARK
HALT:       LBR     HALTI           ;HALT INSTRUCTION
START:      LBR     STARTI          ;START INSTRUCTION
            PAGE.
            ;SKIP TABLE
            ;(this must be in the same order as the
            ;interpretor table)
SKIP:       DB      0
            BR      SKIP2           ;AND IP/FLAG ON (3 byte
                                    ;instruction)
                                    ;(skip over the next 2 bytes)
            NOP
            BR      SKIP2           ;OR IP/FLAG ON
            NOP
            LBR     VBR1            ;IF IP/FLAG ON
            LBR     VBR1            ;SET OP/FLAG
            LBR     VBR1            ;GO TO
            LBR     VBR1            ;STATE
            LBR     VBR1            ;PAUSE STATE
            LBR     VBR1            ;BREAK STATE
            LBR     VBR1            ;REMARK
            LBR     VBR1            ;HALT
            LBR     VBR1            ;START
SKIP2:   -  INC     RF
SKIP1:      INC     RF
SKIP0:      LDA     RF
            PLO     R3
;-SET OUTPUT,FLAG--
SOFI:       BNF     I2
            LDA     RF
            PLO     RD
            LDN     RD
            OR
            STR     RD
            BR      I1
;AND, OR, IF --IP--,--FLAG--"ON"
AIFOI:      BDF     IIFOC           ;'AND' ENTRY:
            BR      I2              ;else exit
OIFOI:      LBDF    SKIP2           ;'OR' ENTRY:
IIFOI:      SMI     00              ;'IF' ENTRY: set condition
                                    flag
IIFOC:      GHI     RF              ;store decision point
            PHI     RC
            GLO     RF
            PLO     RC
            LDA     RF              ;set up input address
            PLO     RD              ;
            LDN     RD
            AND                     ;do the test
            BNZ     I1              ;exit if input etc = on
                                    ;(flag=1)
            ADI     00              ;else set flag - 0
            BR      I1              ;then exit
HALTI:
            LBNF    NXTOPR          ;ignore the following code if
                                    ;the condition is true
THIS IS THE END OF THE STATE, DO THE NEXT LOOP
---STATE---
STATEI:
---PAUSE STATE---
PSSTI:
---BREAK STATE---
BRSTI:
            LBR     INCT
;-GO TO COMMAND--
TCI:        LBNF    I2
            CALL    STOREHIST
            DEC     RE
            DEC     RE              ;point to P CODE address
```

-continued

```
                LDA     RF
                STR     RE              ;change to new state
                INC     RE
                LDA     RF
                STR     RE
                INC     RE
                LDI     0
                STR     RE              ;clear ONCE flag
                LBR     INCT
STOREHIST:
                DEC     RE
                DEC     RE
                DEC     RE
                LDA     RE              ;Loop number
                INC     RE
                INC     RE
                STR     R2              ;save loop number
                ANI     NOTRACEMSK      ;enabled?
                BNZ     STOREHISTX      ;no
                SEX     RB
                LDN     RB              ;trace table pointer
                BNZ     RSTTPT6         ;reset at the end of table
                LDI     <(TRCTAB+OFFH)  ;wrap around in trace table
RSTTPT6:
                PLO     RB
;FIRST SAVE PCODE POINTER
;THEN LOOP NUMBER INFO into historical trace table
                GLO     RC              ;decision point
                STXD
                GHI     RC
                STXD
                LDN     R2
                STXD
                GL0     RB
                STR     R2
                LDI     <TRCTAB
              — PLO     RB
                LDN     R2
                STR     RB              ;save current trace table
                                        ;pointer
STOREHISTX:
                SEX     RF
                RTN
;-----REMARK COMMAND-----
REMI:           LDA     RF
                STR     R2
                LDA     RF
                PLO     RF
                LDN     R2
                PHI     RF
                LBR     NXTOPR          ;JUMP OVER PRINT DATA BY
                                        ;READING ADDRESS OF NEXT OPR
                                        ;STORED IN P CODE
;START COMMAND IS:-
;START, LOOP NUMBER, NEW STATE ADDR, NEXTOPR
STARTI:
STTS:
                CALL    ONCETEST
                LBZ     I3
                CALL    STOREHIST
                ;fix up RE if necessary
                DEC     RE
                DEC     RE
                DEC     RE
                LDA     RE              ;get loop number
                INC     RE
                INC     RE
                ANI     .NOT. NOTRACEMSK
                SD
                                        ;compare with loop being
                                        ;started
                BDF     STARTOK
                GLO     RE              ;fix up RE
                ADI     <TTLENGTH
                PLO     RE
STARTOK:
                CALL    SEARCHTT
                LDI     >OPMAP
                PHI     RD
                SMI     0
                SEX     RF
                LBR     NXTOPR          ;FINISH THIS STEP
SEARCHTT:                               ;search through task table for loop number
```

-continued

```
                                ;and set up a new loop
                                ;use RA,RB,,RD, and RF, sex RF
                SEX     RF
                LDI     NUMOFL+1
                PLO     RB
                LDI     >TT
                PHI     RA
                PHI     RD
                LDI     <TT
                PLO     RA
                LDI     <TTEND
                PL0     RD
LPFD:           DEC     RB
                GLO     RB
                LBZ     NOVAD
                LDN     RA
                BZ      LEQZ
                ANI     .NOT.N0TRACEMSK
                SD                              ;compare this loop number with
                                                ;[RF]
                BZ      LEQZ
                BNF     SHLP
                GLO     RA
                ADI     <TTLENGTH
                PLO     RA
                BR      LPFD
SHLP:           SEX     RD
                GLO     RD
                SMI     <(TTLENGTH-1)
                PLO     RA
                GLO     RB
                STR     R2                      ;Store count
SLPA:           LDN     R2
                SMI     1
                BZ      LEQZ
                STR     R2
                LDI     TTLENGTH
                PLO     RB
SLPA2:
                DEC     RA
                LDN     RA
                STXD
                DEC     RB
                GLO     RB
                BNZ     SLPA2
                BR      SLPA
LEQZ:           LDA     RF
                STR     RA
                INC     RA
                LDA     RF
                STR     RA
                INC     RA
                LDA     RF
                STR     RA
                GL0     RA
                ADI     <(TTLENGTH-
                        TTONCE)
                PLO     RA
                LDI     0
                SEX     RA
                STXD
                STXD
                STXD
                STXD
                STXD
                STXD
NOVAD:
                LDI     0
                PLO     RB
                RTN
ONCETEST:
                ;this routine called by the routines
                ;that are only to occur ONCE after
                ;the oondition is true
                ;EXIT with nonzero if routine is to be run.
;a ONCE MASK points to the current bit in the loops
;ONCE FLAG for the particular routine that called this routine.
;this mask is shifted left one bit each time this routine
;is called : therefore for practical reasons in the herein
;described form a maximum of only 8 routines that use this
;function are allowed in any STATE.
;logic:
```

-continued

```
;SET ZERO := 0
;ONCEBIT :=ONCEMASK .AND. ONCEFLAG
;IF (ONCEBIT = 0 AND DF = 1)
;           THEN
;               ONCEBIT:=1
;               ZERO :=1
;IF (ONCEBIT = 1 AND DF = 0)
;           THEN
;               ONCEBIT:=0
;ONCEMASK :=ONCEMASK . SHIFTED LEFT.
            LXI     RA,ONCEMASK     ;point to once mask
            SEX     RA
            LDN     RE              ;get once flag
            AND                     ;test
            BNZ     ONCE1
            BNF     0NCE2
            ;only time to do it
            LDN     RE              ;once = 1
            OR
            STR     RE              ;replace once byte
            LDI     1
            BR      ONCE3           ;clear zero flag
ONCE1:
            BDF     ONCE2
            ;reset onceflag to zero
            LDN     RE
            XOR                     ;once = 0
            STR     RE
ONCE2:
            LDI     0
ONCE3:
            SHLC                    ;save zero and DF
            PLO     RD
            LDN     RA
            SHL                     ;shift mask for next time
            STR     RA
          — GLO     RD
            SHR                     ;restore zero and DF
            SEX     RF
            RTN
ISOCAN:     ;This routine is dependant on the hardware
            ;configuration of the microprocessor and is
            ;therefore left to the reader to implement
            ;the routine transfers the OPMAP contents to the
            ;real world outputs and transfers the real world
            ;inputs to the IPMAP
            ;The OPMAP and IPMAP are two contiguous blocks of
            ;32 bytes within one 256 byte page structured as
            ;follows:
            ;Input bit 0 is the least significant bit
            ;(representing 1 Hex) in the least significant
            ;byte of the IPMAP.
            ;Input bit 1 is the next least significant bit
            ;(representing 2 Hex) in the least significant
            ;byte of the IPMAP, and so on up to
            ;Input bit 255 is the most significant bit
            ;(representing 80 Hex) in the 32nd byte of the
            ;IPMAP.
            ;Similarly for the output bits
            RTN
MONITOR1:
;a system monitor program that can either run the interpreter or
;CALL any of the following routines:
DISPHIST        ;Display a table of the state changes in each loop
                ;in the order that they occured.
;DISPLINE       ;Display one line from the above table expanded by
                ;printing the relevant program state and
                ;indicating the position that the transfer
                ;equation became true
;DISPLOOP       ;Display the ourrent states in each loop
DISPHISI:
;PRINT THE CHANGES THAT HAVE BEEN STORED IN THE TRCTAB
CALL PRNTHEAD; NOW PRINT HEADINGS
;NEXT THE CHANGES AS STORED IN THE TRACE TABLE.
            LXI     RD,TRCTAB
            LDN     RD
            PLO     RD
            LDI     0
            PLO     RC              ;line number counter
DISPHIST1:
            CALL    BREAK           ;check interruption from
                                    ;terminal
```

-continued

|  | BNZ | DISPHISTR | ;exit |
|---|---|---|---|
|  | GLO | RC |  |
|  | SMI | (256/3) | ;number of steps in trace table |
|  | BDF | DISPHISTX | ;PRINT LINE NUMBER |
|  | GLO | RC |  |
|  | CALL | TYPE2D |  |
|  | CALL | PRINT |  |
|  | DW | SPACEMSG |  |
|  | INC | RD |  |
|  | GLO | RD |  |
|  | BNZ | DISPHIST2 |  |
|  | DEC | RD | ;reset the pointer after wraf ;around |
|  | LDI | 1 |  |
|  | PLO | RD |  |
| DISPHIST2: |  |  |  |
|  | LDN | RD |  |
|  | XRI | 0FFH | ;empty ? |
|  | BZ | DISPHISTX |  |
|  | LDA | RD | ;GET LOOP NUMBER FR0M TRACE ;TABLE |
|  | PSH |  | ;save |
| ;TYPE STATE NUMBER. |  |  |  |
| DISPHIST4: |  |  |  |
|  | GLO | RC |  |
|  | PSH |  |  |
|  | CALL | STPADR |  |
|  | POP |  |  |
|  | PLO | RC |  |
|  | CALL | TYPE41 | ;type STATE number |
|  | ;print a dot every 5 columns across the page |  |  |
|  | ;for the same number of columns as the loop |  |  |
|  | ;number |  |  |
|  | POP |  | ;get loop number |
|  | PSH |  |  |
|  | ADI | 1 | ;extra space |
|  | PL0 | RA | ;loop counter |
|  | LDI | 6 |  |
| DISPHIST5: |  |  |  |
|  | PL0 | RB | ;dot counter |
| DISPHIST6: |  |  |  |
|  | DEC | RA |  |
|  | GL0 | RA |  |
|  | BZ | DISPHIST8 | ;found the right loop |
|  | DEC | RB |  |
|  | GLO | RB |  |
|  | BZ | DISPHIST7 |  |
|  | CALL | PRINT |  |
|  | DW | SPACEMSG |  |
|  | BR | DISPHIST6 |  |
| DISPHIST7: |  |  |  |
|  | CALL | PRINT |  |
|  | DW | DOTMSG |  |
|  | LDI | 5 |  |
|  | BR | DISPHIST5 |  |
| DISPHIST8 |  |  |  |
|  | POP |  |  |
|  | CALL | TYPE2D | ;now print the loop number |
|  | CALL | PRINT |  |
|  | DW | CRMSG |  |
|  | INC | RC |  |
|  | BR | DISPHIST1 |  |
| DISPHISTX: |  |  |  |
|  | CALL | PRINT |  |
|  | DW | ENDMSG |  |
| DISPHISTR: |  | ;EXIT FROM THE PRINT TRACE ROUTINE |  |
|  | RTN |  |  |
| PRNTHEAD: |  |  |  |
|  | CALL | PRINT | ;print the string whose ;pointer is following |
|  | DW | CRMSG | ;points to CR , 0 |
|  | CALL | PRINT |  |
|  | DW | SPACE7MSG | ;7 spaces |
|  | CALL | PRINT |  |
|  | DW | ONEMSG | ;1 |
|  | LDI | 5 | :LOAD FIRST LOOP NUMBER FOR ;HEADING |
|  | PLO | RD |  |
| PRNTHEAD1: |  |  |  |
|  | GLO | RD |  |
|  | CALL | TYPE2D | ;CONVERT TO DECIMAL AND TYPE |

-continued

```
                CALL    PRINT           ;OUT
                DW      SPACE2MSG       ;2 spaces
                GLO     RD
                ADI     5
                PLO     RD
                SMI     NUMOFL          ;maximum number of loops
                BNF     PRNTHEAD1
PRNTHEADX:
                CALL    PRINT
                DW      CRMSG
                RTN
```
;STPADR IS A CALLABLE ROUTINE TO EXTRACT THE NUMBER OF THE STATE
;WHICH APPLIES TO ANY BUFFER POINT VALUE.
;ENTRY WHERE THE SEARCH ADDR IS OBTAINED FROM
; (RD).
;EXIT IS WITH RF POINTING TO THE STATE NUMBER
```
STPADR:
                LDA     RD
                PHI     RA
                LDN     RD
                PLO     RA
                DEC     RA
                PUSH    RD
                LXI     RD,PGMSTT
STPADR3:
                MACR    STEPON          ;TEST FOR STATE, BREAKSTATE OR
                                        ;PAUSESTATE
                BNF     STPADR4         ;not compiled type
                INC     RC
                LDN     RC
                ANI     <STATEMASK
                BZ      STPADR4         ;not a state type
;NEXT SAVE THE ADDR OF ANY STATE FOUND
                GLO     RB
                PLO     RF
                GHI     RB
                PHI     RF
STPADR4:
                MACR    BMINA           ;compare the addresses
                                        ;RB=RB-RA
                BNF     STPADR3         ;not past the target address
                INC     RF
                POPR    RD
                RTN
```
;PRINT THE REASON WHY A CHANGE OF STATE OCCURED
```
DISPLINE:
                CALL    GETPARM1        ;get required line number in
                                        ;RA
                GLO     RA
                SMI     84
                LBDF    DISPLINER       ;IF MORE THAN LINE 84 ASKED
                                        ;FOR PRINT QUERY
                LXI     RD,TRCTAB
                LDN     RD
                PLO     RD
                ;RD IS NOW POINTER TO TRACE TABLE
DISPLINE1:
                INC     RD
                GLO     RD
                BNZ     DISPLINE2       ;@ END 0F TRACE TABLE?
                DEC     RD
                LDI     1
                PLO     RD
DISPLINE2:
                GLO     RA
                BZ      DISPLINE3
                DEC     RA
                INC     RD
                INC     RD
                BR      DISPLINE1
```
;HAVE GOT TO THE LINE REQUESTED IN THE TRACE TABLE
;NEXT CHECK IF IT CONTAINS AN FFH EMFTY INDICATOR.
;IF IT DOES PRINT QUERY
;IF NOT THEN CAN PRINT STATE CONTENTS.
```
DISPLINE3:
                LDA     RD              ;table entry empty?
                XRI     0FFH
                LBZ     DISPLINER
                CALL    STPADR          ;TRACED VALUE OF P CODE IS IN
                                        ;RA, STATE NUMBER IS POINTED
                                        ;TO BY RF
```

-continued

```
            GLO     RF
            PLO     RD
            PLO     RB
            GHI     RF
            PHI     RD
            PHI     RB
            DEC     RB
            DEC     RD
DISPLINE4:
            CALL    BREAK
            LBNZ    DISPLINEX
            PUSH    RA
            PUSH    RB
            CALL    COMPRT          print out the instruction
            POPR    RB
            POPR    RA
            MACR    BMINA           ;have we passed the decision
                                    ;point?
            MACR    IFBIS0          ;test RB=0
            BDF     DISPLINE5       ;no
            CALL    PRINT           ;yes so print so
            DW      DECISMSG
DISPLINE5:
            PUSH    RD
            MACR    STEPON
            POPR    RD
            INC     RC              ;are we at the end of a state?
            LDN     RC
            ANI     <STATEMASK
            BNZ     DISPLINEX       ;yes so finished
DISPLINE6:
            LBR     DISPLINE4
DISPLINER:                          ;PRINT QUERY
            CALL    PRINT
            DW      NVALIDMSG
DISPLINEX:                          ;EXIT FROM TRACE LINE ROUTINE
            RTN
DISPLENX1;
            CALL    PRINT
            DW      HISTMSG
            RTN
DISPLOOP:                           ;DISPLAY LOOP ROUTINE.
            ;PRINT EXISTING STATE NUMBERS
            CALL    PRINT
            DW      SPACE3MSG
            LXI     RD, TT
            LDI     0
            PLO     RB
GETNT:      INC     RB
            GLO     RB
            SMI     NUMOFL+1
            BZ      PRSEX
            LDN     RD              ;get loop number from task
                                    ;table
            SZ      PRSEX
NEXE:
            SEX     RD
            GLO     RB
            XOR                     ;compare current loop with
                                    ;desired
            BZ      FDOK
            CALL    PRINT
            DW      SPACE4MSG
            INC     RB
            BR      NEXE            ;TRY NEXT ONE
FDOK:       INC     RD              ;found so print loop number
            LDA     RD
            PHI     RF
            LDA     RD
            PLO     RF
            INC     RF
            get first 2 digits
            CALL    TYPE4I
            GLO     RD
            ADI     <(TTLENGTH-3)   ;already incremented 3 times
            PLO     RD              ;move on to next task in table
            BR      GETNT           ;go look for next
PRSEX:      SEX     R2
            CALL    PRINT
            DW
;text
DOTMSG      DB      "",0
```

-continued

| | | | |
|---|---|---|---|
| SPACE9MSG | DB | ' ' | |
| SPACE8MSG | DB | ' ' | |
| SPACE7MSG | DB | ' ' | |
| SPACE6MSG | DB | ' ' | |
| SPACE5MSG | DB | ' ' | |
| SPACE4MSG | DB | ' ' | |
| SPACE3MSG | DB | ' ' | |
| SPACE2MSG | DB | ' ' | |
| SPACEMSG | DB | ' ',0 | |
| NTRACEMSG | DB | 'NO TRACE', 0DH | |
| DECISMSG | DB | 'DECISION POINT',8DH,0DH | |
| ENDMSG | DB | 'END' | |
| CRMSG | DB | 0DH | |
| | DATA | | |
| ;The Task Table | | | |
| TT: | DS | TTLENGTH* NUMOFL-1 | ;THE FIRST PART OF THE TASK |
| TTEND: | DS | 1 | ;THE LAST TASK TABLE ENTRY |
| ;THE ORDER OF THE DATA IN THE TASK TABLE FOR EACH LOOP IS | | | |
| ;TTLOOP | DS | 0 | |
| ;TTSTATE | DB | 0,0 | |
| ;TTONCE | DB | 0 | |
| ;TTACCUM | DB | 0,0 | |
| ;TTSTATESTR | DB | 0 | |
| ;TTONCESTR | DB | 0 | |
| ;TTRINAD | DB | 0,0 | |
| ONCEMASK | DB | 0 | ;used for the ONCE operation |
| | PAGE. | | |

;THE TRACE TABLE
TRCTAB;    ;The first byte is the low byte of the
           ;pointer to the current position in the
           ;table where the storing of the the
           ;historical date is taking place
;The format of the table is:
;each entry is 3 bytes long
;the table is filled from the top (TRCTABF) down towards the
;bottom (TRCTAB+1). When it reaches the bottom, it is wrapped
;around again to the top
;the three bytes are stored in the following order:
;the low byte of the decision point
;the high byte of the decision point
;the loop number
;NOTE THAT THE TRACE TABLE IS 255 BYTES LONG PLUS IT'3 S POINTER
PAGE. 1
TRCTABF:
PAGE.
;THE FOLLOWING AREA IS USED BY THE MONITOR.

| | | | |
|---|---|---|---|
| MONFLAG: | DS | 1 | ;0= running interpreter |
| | | | ;1= running in monitor or from |
| | | | ;a pwr up |
| | | | ;2= from break state |
| | | | ;3= from a terminal halt |
| STATESTORE: | DS | 2 | ;state number from a |
| | | | ;BREAKSTATE | the input buffer and pointers from the terminal

| | | | |
|---|---|---|---|
| INPOUT | DB | 0 | |
| INPIN | DB | 0 | |
| ECHOOUT | DB | 0 | |
| INPBUF | DS | INPBUFSZ | |
| INPBUFND | DB | 0 | |
| RATOP: | DS | 0AFH-<S | |
| RASTK: | DS | 1 | ;RETURN ADDRESS STACK - SUBS |
| | | | ;CAN BE 40 DEEP |
| S2TOP: | DS | 1 | ;-80 BYTES |
| | PAGE. | 1 | |
| STK2: | DS | 1 | ;THE NORMAL STACK WITH REG 2 |
| | | | ;AS POINTER |
| | PAGE. | | |

;THE OUTPUT MAP STARTS ON A PAGE BOUNDARY
;OUTPUT MAP

| | | | |
|---|---|---|---|
| OPMAP: | DS | OPMAPSZ-1 | ;Output 0 is bit 0 here |
| OPMAPN: | DS | 1 | ;Output 255 is bit 7 here |
| | ;INPUT MAP | | |
| IPMAP: | DS | IPMAPSZ-1 | |
| IPMAPN: | DS | 1 | |
| FGMAP: | DS | IPMAPSZ-1 | |
| FGMAPN: | DS | 1 | |

;THE P CODE AREA, THE INTERPRETER PROGRAM
MEMORYSTT:

| | | | |
|---|---|---|---|
| PROGEND: | DS | 2 | ;stores the end of the program |
| | | | ;(size info) |

| | | | |
|---|---|---|---|
| CHKSM: | DS | 2 | ;stores the checksum of the ;program |
| PROCNUM: | DS | 1 | ;PROCESSOR/PROGRAM NUMBER. |
| COMFLAG: | DS | 1 | ;FLAGS PCODE IS IN THE ;COMPILED OR UNCOMPILED STATE ;0= compiled run ;1= uncompiled |
| PGMSTT: | | | ;the P CODE starts here |
| BUFTOP: | | | |
| INTPGM: | DS | RAMSIZE-S-1 | |
| BUFBOT: | DS | 1 | |
| END | | | |

Using the above interpreter code, an applications program code is executed.

The invention enables the following to be effected:

1. Being able to set "traps" or "breakpoints" or "pauses" or "halts" within the program, and being able to run, pause or stop the program from the monitor:

The control program written in a finite state type language can be run or stopped from the Monitor program. The control program, or part(s) of it, can also be paused, halted or stopped by instructions within the control program itself. The instructions that do these functions in the following examples are:

PAUSESTATE causes that particular loop to pause or halt when control is passed to that particular state BREAKSTATE causes the whole program to stop running and return to the monitor in either the "online" or the "offline" modes when control is passed to a particular state HALT is a conditional instruction that causes all instructions after it is in its state to be ignored 2. Being able to selectively or otherwise record the history of state changes of the program and being able to display these:

The program is such that in the step of storing of the history:

During the execution of each instruction that could influence the decision to change states (any part of the transition function), a temporary record is kept of its location in the program. At such time that the transition function becomes true and control is passed to another state, the temporary information and information identifying the particular loop is transferred to the historical changes table (TT the Trace Table). An example of this is shown in the interpreter code at MORE, IIFOC and STOREHIST.

3. Displaying the historical changes and the action that caused the change:

This simply requires the contents of the Trace Table or Task Table ro be printed out or displayed in a convenient form. The examples below show three such methods.

The first method displays the identifier of the currently active state in all of the active loops by deriving the required information from the task table.

The second method displays the contents of the trace table as a two-axis table. The horizontal axis represents the loop that the change took place in, while the vertical axis represents the time order of the changes.

The third method displays the change that occurred in any selected line of the table from the second method, and the event or events that caused the change, by listing out the relevant part of the program and indicating the point within the listing where the decision to change states was finalized.

EXAMPLE I

It is to be expressly understood, however, that the following listings are for illustration only and are not to be construed as defining the limits of the invention.

| | | |
|---|---|---|
| STATE | 1 | Program start |
| | SAMPLE PROGRAM TO ILLUSTRATE DEBUGGING USING HISTORICAL RECORDING | |
| | START LOOP 2 with 200 start the second loop at STATE 200 | |
| | GO TO 2 | unconditional state change |
| STATE | 2 | Program structure |
| | SET OP 2 | Control outputs (Op means output) |
| | IF IP 3 ON | Transition equation (IP means input) |
| | OR IP 7 ON | |
| | GO TO 3 | Destination |
| STATE | 3 | Next finite state |
| | SET OP 3 | |
| | IF IP 5 ON | 2nd Transition equation |
| | GO TO 2 | |
| | IF IP 4 ON | 3rd Transition equation |
| | GO TO 2 | 3rd Destination |
| STATE | 200 | Loop 2 |
| | GO TO 201 | Unconditonal transition |
| STATE | 201 | |
| | IF IP 6ON | |
| | GO TO 202 | |
| BREAKSTATE | 202 | Break point or trap in the program |
| END | | |

DISPLAY OF THE HISTORICAL TRACE FOR THE ABOVE PROGRAM
(   is the prompt from the monitor program)
GO                                    ;start running the program
Psc Monitor - BREAK AT STATE 202
                                      ;program has been stopped at a
                                      ;breakpoint
DI LOOP                               ;monitor command requesting
                                      ;the display of the current
                                      ;states in each loop
2 202                                 ;this is the response showing
                                      ;loop 1 currently at state 2
                                      ;and loop 2 at state 202
DI HI                                 ;display the history table
LI STATE          1 5 10 15 20        ;loop number (newest at the
                                      ;top)
0       201    2                      ;line 0 shows state 201 exited
                                      ;(loop 2)
1       3      1                      ;line 1 shows state 3 exited
2       2      1                      ;line 2 shows state 2 exited
3       3      1                      ;line 3 shows state 3 exited
4       2      1                      ;line 4 shows state 2 exited
5       200    2                      ;line 5 shows state 200 exited
                                      ;(loop 2)
6       1      1                      ;line 6 shows state 1 exited
7       1      1                      ;line 7 shows loop 2 started
                                      ;(oldest)
8       END                           ;no more entries in the table
STATE 1
DECISION POINT                    ;unconditional decision
; "SAMPLE PROGRAM TO ILLUSTRATE"

```
; "DEBUGGING USING"
; "HISTORICAL RECORDING"
    START LOOP 2 WITH 200
    GO TO 2
DI LI 6                         ; display line 6 expanded
STATE 1
** DECISION POINT **            ; unconditional decision
; "SAMPLE PROGRAM TO ILLUSTRATE"
; "DEBUGGING USING"
; "HISTORICAL RECORDING"
    START LOOP 2 WITH 200
    GO TO 2
DI LI 5                         ; display line 5 expanded
STATE 200
** DECISION POINT **            ; unconditional decision
    GO TO 201                   ; unconditional transition
DI LI 4                         ; display line 4 expanded
STATE 2
    IF IP 3 ON
    OR IP 7 ON
** DECISION POINT **            ; input 7 coming on caused the
                                  program
    GO TO 3                     ; to change to state 3
DI LI 3                         ; display line 3 expanded
STATE 3
    IF IP 5 ON
** DECISION POINT **            ; input 5 coming on caused the
                                  program
    GO TO 2                     ; to change to state 2
    IF IP 4 ON                  ; This Transition equation is
                                  ignored
    GO TO 2
DI LI 2                         ; display history table line 2
                                  expanded
STATE 2
    SET OP 2
    IF IP 3 ON
** DECISION POINT **            ; input 3 coming on caused the
                                  program
    OR, IP 7 ON                 ; to change to state 3
    GO TO 3
DI LI 1                         ; display line 1 expanded
STATE 3
    SET OP 3
    IF IP 5 ON                  ; This Transition equation is
                                  false
    GO TO 2
    IF IP 4 ON
** DECISION POINT **            ; input 4 coming on caused the
                                  program
    GO TO 2                     ; to change to state 2
DI LI 0                         ; display line 0 expanded
STATE 201
    IF IP 6 ON
** DECISION POINT **            ; input 6 coming on caused the
    GO TO 202                   ; transition
CODE GENERATED FROM THE ABOVE PROGRAM
THAT IS INTERPRETED BY THE MULTI-TASKING
CONTROL PROGRAM INTERPRETER UNDER
SUPERVISION OF THE MONITOR
The left hand column shows one memory address where the data on
the right is stored in the controller's memory. We shall refer to the
following code as P-CODE (Program Code).
(For added clarity, the program is repeated as comments near the
corresponding data)
X000   10 00 01                       ; STATE 1
X003   19 X0 1F    53414D504C ;;"SAMPLE PROGRAM TO
                              ILLUSTRATE"
                   4520505241
                   4D20544F20
                   494C4C5553
                   5452415445
X01F   19 X0 31    4445425547 ;;"DEBUGGING USING"
                   47494E4720
                   5553494E47
X031   19 X0 48    484953544F ;;"HISTORICAL
                              RECORDING"
                   524943414C
                   205245434F
                   5244494E47
X048   IF 02 X0    70         ; START LOOP 2 WITH 200
X04C   0D X0 4F               ; GOTO 2
```

```
X04F   10 00 02    ; STATE 2
X052   0A 00 04    ; SET OP 2
X055   07 20 08    ; IF IP 3 ON
X058   04 00 80    ; OR IP 7 ON
X05B   0D X0 5E    ; GOTO 3
X05E   10 00 03    ; STATE 3
X061   0A 00 08    ; SET OP 3
X064   07 20 20    ; IF IP 5 ON
X067   0D X0 4F    ; GOTO 2
X06A   07 20 10    ; IF IP 4 ON
X06D   0D X0 4F    ; GOTO 2
X070   10 00 C8    ; STATE 200
X073   0D X0 76    ; GOTO 201
X076   10 00 C9    ; STATE 201
X079   07 20 40    ; IF IP 6 ON
X07C   0D X0 7F    ; GOTO 202
X07F   16 00 CA    ; BREAK STATE 202
X082   16 00 00    ; PROGRAM END (BREAK
                     STATE 0)
```

The following section shows how we structure a program written in our language.

The program functional structure can be defined as follows a program consists of one or more program (logical) loops a loop consists of one or more states, only one of which can be active at one time. The set of states making up a loop is implied by the 'start', 'restart', etc., loop initializing statements in the program and the 'goto', 'gosub', state changing statements in those states a state consists of a state delimiting statement, followed by a statement list a statement list consists of zero, one or more compound statements a compound statement consists of an optional condition part and an action part. The absence of a condition part implies a true condition and the action part would then be unconditionally executed a condition part is a boolean expression consisting of an initializing part, one term (or more terms connected by 'or' operators), and terminates at the next action part an initializing part provides the functional equivalent to the connection to the power bus in a ladder diagram, and in our language is an 'if' statement.

a term consists of one condition statement (or more condition statements connected by 'and' operators)

an action part consists of one or more action statements

The following diagram shows the structure of a compound statement. The meaning of the statement in the diagram is 'if input 10 is on or input 11 is off and timer 3 has timed for greater or equal to 23 time units, output 14 is on, and op 17 is on'

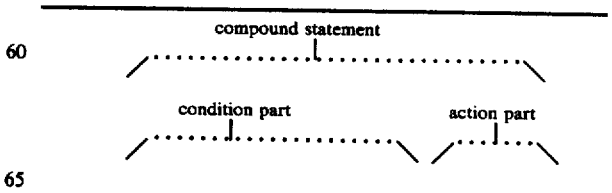

-continued

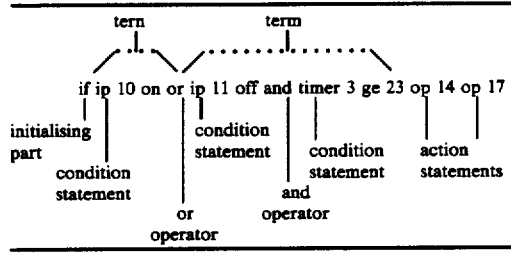

The method of evaluation of the condition part and execution of the action part is as follows
the statement is evaluated in the same order as it is read
'if' sets a boolean condition flag to 1 and this flag is used as a running record of the evaluation as it proceeds, and as a record of the result when it has been fully processed.
a condition statement is evaluated and if 0 the flag is set to 0
an 'and' operator just proceeds to the next evaluation of the next condition statement
an 'or' operator looks at the condition flag
    if the flag is 1, the whole condition part must be true and so the remainder of the evaluation is skipped
    if the flag is 0, the preceding terms must all be untrue, so the flag is set to 1 and the evaluation proceeds with the next term
an action statement executes and carries out its function if the condition flag is true when the action statement is read
The method does not allow the use of brackets in the condition part, and a condition part is equivalent to multiple rungs on a ladder diagram, each consisting of any number or series connected input variables, all connected in parallel at the point where the rungs connect to the actuator, but with no parallel connections at any other point. This allows any necesary condition to be evaluated, although the parallel connections would have allowed this with less evaluation of input variables. However the method provides a very simply implemented way of recording which inputs resulted in a true evaluation and thus caused the decision to execute the action list.

This is achieved by maintaining a pointer to the p code representing the program that is being processed, and this is necessary anyway. Any 'or' operator which detects a 1 condition flag saves the value of that pointer before modifying it to skip to the action part. As we only have complete 'rungs' with no alternative or ambiguous paths in the condition part, the saved pointer value must point to the end of the first rung found to evaluate true. This is termed the 'decision point', and is used in debugging. Should the evaluation proceed to the end of the last term, and thus past the last 'or' operator, this position becomes the decision point provided the last term yields a true condition, or the position of the action statement can serve equally well in this case.

Broadly a compound statement is equivalent to a rung on a ladder diagram which evaluates a condition, and if the condition is found true, carries out some action. The detail of this part of the structure as defined above is of significance mainly from the point of view of easy recording and print out of the decision point in a trace of any one particular state change. The Program-loop-state structure is the thing of major significance because it is this structure that yields the greatest benefits in terms of easy designing of error-free programs, and of understanding those programs.

It is also true from another viewpoint that a program consists of one active state diagram (logical loop), which automatically starts with state 1 active, together with one or more potentially active state diagrams which can be activated from the first, and subsequently any state diagram can activate or deactivate any other. Code describing all potentially active state diagrams exist within the body of the program at all times, but a state diagram is not executed and is therefore functionally inactive until the state diagram is activated by the assignment of one of its states to a loop variable which subsequently keeps track of which state is active in that state diagram at any one point in time. The systems software has code and variables which enable it to determine whether an assignment has been made, or whether the loop has been deactivated.

An example of a program using numeric (rather than symbolic) variable names is shown below. The program does not 'do' anything, and is for the purpose of illustrating structure only.

| | Listing 1. |
|---|---|
| Program | Commentary |
| state 1 | ;first state delimiting statement. |
| | ;the only compulsory state statement. |
| | ;automatic start of loop 1. |
| op 20 on | ;start of first statement list. |
| | ;output 20 is on while in state 1. |
| | ;unconditional action statement. |
| | ;can also be considered a compound |
| | ;statement with no condition part |
| | ;and 3 action statements in the |
| | ;action part. |
| start timer 3 | ;unconditional action statement. |
| | ;starts a timer to count up from 0. |
| start loop 2 with | |
| state 200 | ;defines state 200 as start (or restart) |
| | ;state of loop 2. |
| | ;unconditional action statement. |
| if iP 2 on | ;start of first compound statement. |
| | ;initialisation part ('if'), and first |
| | ;and only condition statement in first |
| | ;term. |
| | ;ip means input. |
| or ip 3 on | ;start of second term. |
| and ip 5 off | |
| and timer 3 ge 34 | ;last statement in second term |
| | ;and in condition part. |
| goto 2 | ;action statement conditional on |
| | ;result of evaluation of |
| | ;previous condition part. |
| | ;if actioned, causes loop one's active |
| | ;state to change from 1 to 2. |
| if ip 6 on | ;start of next evaluation. |
| goto 20 | ;if true change active state to |
| | ;state 20 else leave as state 1 |
| | ;end of first state and first |
| | ;statement list. |
| state 2 | ;second state delimiting statement. |
| | ;start of second state in program. |
| . | ;Processing order controlled by |
| . | ;scanning order and by |
| . | ;'goto's, gosub's, etc not order in listing' |
| | ;end of state 2. |
| state 3 | ;start of state 3. |
| . | |
| . | |
| state 4 | |
| . | |
| . | |
| state 20 | |
| print "Hold state | |
| entered at " | |

-continued

Listing 1.

| Program | Commentary |
|---|---|
| gosub 30 | ;to print the time. |
| . | |
| . | |
| . | ;more states |
| . | |
| . | |
| state 30 | ;start of a single state subroutine |
| | ;(but could be more than one state). |
| read clock | ;read the hours and mins etc shown on |
| | ;the clock into the variables called |
| | ;hour and min. |
| get hour | |
| print "@ Hrs. " | ;'@' is a special symbol for the implied |
| | ;variable discussed elsewhere. I.e. |
| | ;what the hour was 'got' into. |
| get min | |
| print "@ mins. " | ;  is a special symbol for 'new line'. |
| return | ;unconditional return to calling state |
| state 200 | ;the state at which loop 2 is |
| . | ;started. |
| . | |
| state 201 | |
| . | |
| . | |
| . | ;more states |
| . | |
| . | |
| (last statement) | ;end of program. |

In the program above, there is an interesting example of the time sequencing capabilities of the system stemming from the way all statements in a state are processed sequentially in one contiguous block. Part of a message is being printed in state 20, and the remainder is being printed in state 30. This is a suitable technique where there is no random printing by other loops than this one. However, if other loops have states that could possibly print between "Hold state entered at" and "@ Hrs.", this technique would cause a problem. The way around the problem is simple, just place all associated print statements together in a single state and the operating system interpreter will guarantee to process all together, avoiding hold-ups in the control functions by placing characters in a print buffer to be down loaded to the printer one at a time by an interupt routine as the printer becomes ready.

It should be noted at this point that the functional structure is different from the structure as apparent from a listing of a program. A listing does not directly show the presence of loops, and a program listing consists of one or more state listings only, including the finer detail of compound statements . . . action statements. The loop information is of course there, and can be found in the 'start' statements, and the goto, gosub statements, etc.

The third statement in the example program, 'start loop 2 with state 200', defines the state to become active in loop 2 on the next scan of that loop after the execution of the start statement. Other 'start' statements would normally be used to define initial states for all other loops used in the program.

It should be noted here that there are two different meanings of the word "loop" in our system, and the word "loop" could be qualified and shown as 'logical loop' and 'physical loop'. Broadly the difference is the same as, for instance, 'logical devices', and 'physical devices' in MSDOS (TM of MicroSoft), i.e., a program can talk of printing on a 'theoretical' line printer without reference to where that line printer is, but at some stage the overall software must make the link between the theoretical line printer and the fact that such a device actually exists at some particular address or location in the hardware of the system running the program. Similarly, our program is designed in terms of (logical) loops which are effectively state diagrams and are termed loops because in most practical systems the state that is first active in the diagram will become active again each time the machine or process cycles. The process activity therefore typically cycles through a series of states arriving back where it started and therefore traverses a 'loop'.

In order to enable the processor to run the program in the way desired, we must assign a logical loop to a physical loop. This consists of using a start statement, 'start loop n with state m' which associates state m with loop variable n, either directly storing m in loop variable n, or storing a pointer of other indirect reference. After executing one or more start statements we have one or more physical loop variables that are initialized with state references and the system software can read these in turn, process the states, changing the references in response to goto, gosub statements, etc., and performing the necessary activities to control the machine/process. As noted elsewhere, which state in the program forms part of which logical loop(s) is determined by the start, goto, gosub statements, etc. and not by any means such as associating state blocks with larger subprogram blocks.

It would, of course, by possible to define 'Loop Blocks' with initial states, and use a statement such as 'start loop block 3'. It is considered that the current method provides good flexibility and ease of use.

We should also note that it is often desirable to have different logical loops associated with the same physical loop (one at a time) when performing different alternative control tasks.

Normally the exact meaning of the work "loop" will be apparent from the context and so the word is not normally qualified with 'logical' or 'physical'.

The details of which states form parts of which loops, and the interconnections between the various states in a loop can be readily determined by following the network through via the state changing instructions in the states, i.e., the goto's or gosub/returns.

In our example we can see that loop 1 starting at state 1 also has states 2 and 20 in it because state 1 contains goto 2, and goto 20 statements. We can follow through states 2 and 20 via their goto statements etc., and find the complete network. Normally the programmer would define the structure of the network before the details of the states, and so this would be predefined. A utility program would normally be used to list any loop network structure should this be necessary, rather than manual inspection.

It can be seen from the above that the functional structure of the loops is built into the program but does not have any delimiting statements to define a contiguous block of code associated with any one loop. It would however be considered good programming practice to code loops using contiguous blocks of states, i.e., perhaps states from the numerical range 200-299 for loop 2, 300-399 for loop 3, 400-499 for loop 4, etc.

It should also be noted that this provides a mechanism whereby a loop may control different processes at different points in time, in the sense that a process is represented by a network of states. This might occur where a section of a machine can make one of a number of different parts depending on requirements. When a particular part is required, a particular loop is started at the start state for the state network which controls the making of that part. If a different part is required, the same loop is started at the start state for the different state network that controls the making of that different part. In this way a program can be structured so that different subclasses of activities are controlled by different state networks, thus modularizing the program and minimizing the extent of the program code that is relevant under any particular circumstances, and simplifying the comprehension of the operation of the machine.

This illustrates the principle that of all the combinations of input variables and states that exist in a system, only a very few simplified combinations are significant to the real operation of the machine, and at any one point in time, only a few of those few are significant.

It is also relevant to note that normal programming in this language, particularly of sequencing operations, often leads to all action statements (other than state changing statements, such as goto, gosub, etc.), being unconditional, and the decisions made in the system thus are mainly related to changes of state. The lack of conditions qualifying actions such as turning on outputs, etc., leads to a high degree of certainty as to what has or will happen when the system is in a particular state, and the system is therefore predictable. The user does not have to wonder what happened as he would if outputs were conditioned by inputs whose values were not known and are transient and not measureable later.

It should also be noted that any one state can be said to represent a ladder diagram because the content of the state is a list of compound statements, each of which consists of a condition part and an action part. From this, it follows that state changes actually represent the deactivation of a ladder diagram equivalent to the state being deactivated, and the activation of the ladder diagram equivalent to the state being activated. However it should also be noted that this is done in a high level way using abstract concepts such as states and conditional goto statements, and does not involve the manipulation of any extraneous elements such as enabling or master relay contacts or connections from such contacts to the various rungs of the dependent ladders, and in addition the activation of one state by a goto statement precludes, at the system level, the possibility of the state containing the goto statement still being active, because this action involves the overwriting of the value held in the loop variable for that loop.

It also follows from this that a program, only containing state 1 (and thus not having any state changing action statements) and where state 1 contains a list of compound statements, is in fact the functional equivalent of a ladder diagram program as used with a normal ladder diagram type PLC. Although this method of programming would not normally be used when the more powerful state-loop structure is available, it is relevent to note the equivalence because it indicates the relationship of ladder diagrams to state machines of the type that have their outputs conditioned by system inputs.

It follows that ladder diagram functionality is a subfunction of a state diagram, which is itself a subfunction of a program consisting of multiple state diagrams, and in our case where these state diagrams may be active or inactive, depending on whether they have been started by a 'start loop ... with state ...' type of statement. (In our system, they may also be overridden, paused, stopped, etc.). It is also worth noting that the loops could also be started by means other than statements in the program itself, by preallocation of loop starting state numbers, or a table driven system, from the system monitor, etc.

It also follows that physical loops are not directly equivalent to particular state diagrams. They are system variables, members of a list, that hold the value of an active state, and by virtue of the structure of the various state diagrams emulated by the program, define which state diagram is being controlled via that loop. Which particular state diagram is being controlled via a particular loop depends on the start statement that started it (or the subsequent gosub statements that swap in different 'sub-state diagrams' until a 'return' statement is encountered, etc.). Loop variables may be statically allocated in memory or dynamically allocated.

In the above sense 'loop 2' refers to physical loop 2 or the value of the active state stored in loop variable 2. 'Get loop 2' in our language means get the number of the active state in the state diagram currently being controlled by physical loop 2 using loop variable 2. The word loop has also been loosely used to mean state diagrams, i.e., logical loops, and we have just seen that any one physical loop can be used to control different state diagram emulations at different points in time. The precise meaning should be determined from the context. The reason the same term has been used for two different but related concepts is that this assists in the intuitive understanding of program functionality.

As we have seen, each active state is processed each scan. Statements such as 'start timer' do not need processing each scan. Depending on the approach to programming, it is necessary to process such statements either, in the first scan after activation of the state, or, in the first scan after each time that the condition part of the compound statement involved becomes true, including the first scan through the state that it is true.

Such processing is similar to the equivalent ladder processing together with the additional state qualification, and avoids timers started repetitively each scan, thus held at 0, and continual repetition of messages printed each scan, etc. Most action statements require this type of processing, except for statements such as 'op 22 on', which means 'output22 is on in this state'. This needs repetitive insertion into a pre-zeroed output array each scan so that the output will automatically deactivate when the state is deactivated.

Symbolic Variables

A program using symbolic variables but otherwise identical to that is Listing 1 is shown below in Listing 2.

Note that state 1 now has a list of define statements for loops, states, etc. These may be manually inserted or automatically inserted by the operating system when a new variable name of a particular type is encountered during program entry, automatically allocating the next free number for the particular type of variable. These define statements could be in state 1 or not (they could be in a separate block), hidden or explicit (as shown).

The main point of note is that the program now has a great deal of user friendliness, and to a large extent is self-explanatory and self-commenting providing only that the reader has an understanding of the machine or process itself.

The indenting of the text should also be noted as this conveys information indicating the positions of 'if', 'or', 'and' operators, compound statements, condition parts, action statements, etc., and breaks the program up into groups of statements that are functionally related, again easing the task of comprehension.

Listing 2.

| Program | | | Commentary |
|---|---|---|---|
| Initialise: | | | ;predefined state 1 |
| define loop | 2 | = Cutter_operation | |
| define state | 2 | = Infeed_active | |
| | 3 | = Infeed_counting | |
| | 4 | = Infeed_slowdown | |
| | . | | |
| | 20 | = Infeed_hold | |
| | . | | |
| | 200 | = Cutter_wait | |
| | 201 | = Cutter_down | |
| define ip | 2 | = Infeed_start_button | |
| | 3 | = Auto_switch | |
| | 5 | = Pause_switch | |
| | 6 | = Hold_button | |
| define op | 20 | = Initialise_indicator | |
| Initialise_indicator on | | | |
| start timer 3 | | | |
| start Cutter_operation with Cutter_wait | | | |
| if Infeed_start_button on | | | |
| or Auto_switch on | | | |
| and Pause_switch off | | | |
| and timer 3 ge 34 | | | |
| goto Infeed_active | | | |
| if Hold_button on | | | |
| goto Hold_infeed | | | |
| Infeed_active: | | | |
| . | | | |
| Infeed_counting: | | | |
| . | | | |
| Infeed_slowdown: | | | |
| . | | | |
| Hold_infeed: | | | |
| print "Hold state entered at " | | | |
| gosub Print_Time | | | |
| . | | | |
| Print_time: | | | |
| read clock | | | |
| get hour | | | |
| print "@ Hrs. " | | | |
| get min | | | |
| print "@ mins. " | | | |
| return | | | |
| . | | | |
| Cutter_wait: | | | |
| . | | | |
| Cutter_down: | | | |
| . | | | |
| (last statement) | | | |

Program Scanning

Our program is processed by the processor in a similar way to that of a standard PLC in the sense that it scans repetitively through the relevant statements, evaluating and actioning. In detail it differs. The scan only involves the statements contained in the active states. Which states these are is determined by reference to the loop variables. The processor reads the first loop variable in the list, determines from this where the beginning of the active state for that loop is in the program. It goes to that state and processes the statements in the state until it reaches the next state delimiting statement. This is the beginning of the next state in the program listing and marks the end of the current state being processed. The processor then goes to the next loop variable in turn and repeats the procedure, and ditto through the complete list of loop variables having active states. This activity together with various overhead activities common to PLC's makes up one scan. The scan repeats continually.

Goto, restart, return and gosub statements change the value of the loop variables immediately when processed and processing of the statements in that state ceases when this occurs and the processor transfers to process the next state in the list. I.e., statements past the goto statement in that state are not processed in that scan. On the next scan it, of course, processes the statements in the new state that has been swapped in, and the old state which was overwritten is not active or processed. Order of processing statements in any state is in the same order as the program listing, and loops are scanned from 1 upwards in numerical order.

Multi-tasking operating systems (MTOS) used as the basis for real time software are well known. They function in a similar way to our system in that they share processor time around the different tasks requiring attention, and wo do the same with the different active states in the different loops. MTOS however do not necessarily impose the rigid order of processing on their tasks that is imposed by our order of scanning loops, processing each active state completely before going on to the next. MTOS normally can swap the processor from one task to another on the basis of task timeout, ready task priority, interrupt, etc. This means that the actual order of processing of tasks and even statements is not necessarily known to the programmer who writes the applications program, although there are mechanisms provided to allow the programmer to control sensitive parts of the program or hardware system as deemed necessary.

In a machine control or process control environment, it can be very advantageous to know the exact order of processing, or to be able to predict or ensure that the response time of the processor to system inputs will be adequate. Machines particularly, require fast response, and with PLC's it is normal to specify the time for one full scan of the program, and this may be of the order of 1 to 20 milliseconds. Out system provides a means of ensuring that all necessary activities are always carried out sufficiently quickly.

The structure of our language thus establishes that one scan will take the time needed to process all the active states once (but not any of the inactive states), plus some additional system overhead that is predictable. This provides for predictable scan times and because inactive states are not processed, scan times are short, or looked at conversely, a particular scan time can be achieved using out system and a lower power and cost processor, than can be achieved with a system such as ladder logic in which all statements are scanned every scan.

It should be noted that there are ways for standard PLCs to avoid scanning all ladder diagram statements every scan, but these are not as convenient as those provided with our system.

The swapping in and out of active states together with the loop structure provides the programmer with facilities similar to an MTOS, but which are totally predictable. The programmer can control response time by ensuring that states are coded so that no state takes too long for processing, or by using the loop variables to examine the other loops to ensure no long-winded processing can occur in one loop while a sensitive state is active. The system provides the necessary facilities in a very simple form.

In addition, as the statement list in each active state is processed in the order of the statements in the list, and all statements are processed before going on to the next loop, the programmer has a very simple way of guaranteeing that all necessary operations have been carried out once a list of sensitive operations has been started, and that no operations associated with some other state will intervene. Examples of when this might be important could be when using global variables or writing blocks of text to a terminal or when hand-shaking operations are involved. While this can be achieved using other techniques such as an MTOS, our structure which is all built in to a high level language provides a particularly simple way of achieving this. As well as being simple from the point of view of the programmer, it also is simple from the point of view of the systems software and hardware, and this translates into more economical means for controlling machines or processes.

The applications program is stored as intermediate code or 'p code'. An interpreter program, which is part of the systems software, takes this p code and interprets it carrying out the necessary evaluations, actions and overhead activities. Details of such software techniques are well known and standard techniques are used throughout.

Facilities are provided so that the applications program can have access to the loop variables and so determine and use the information as to which state is active in any loop. Statements such as 'get loop' as shown above are typical.

Discussing the various types of statements, the p code for all statements consists of two general categories of code firstly, one or more bytes constituting an operator which defines the statement type and is used by the interpreter to select the service routine to be used.

secondly, optional data as required.

The types of statements (shown with examples) that are of interest are loop initializing statements 'start loop 3 with state 200'

The p code for start loop, consists of the operator, the loop reference, and the state reference. The loop reference may conveniently be the address of the start of the loop data in the task table. The state reference may conveniently be the address of the state in the program p code.

The service routine involves oncetest (see ONCETEST routine in previous application) and skip remainder if necessary transfer state address into the loop variable in the correct loop location in the task table set oncetest flags etc as required save decision point data exit to process next operator 'restart 3000' similar to above but start loop 1 at state 3000 zero flags, registers etc., as appropriate.

save decision point data exit to start of scan state changing statements

'goto 201' transfer new state address into loop variable in task table for loop currently being processed clear once flag save decision point data exit to process next loop 'gosub 5000' oncetest then as goto, except save address of next operator and of address of state to be returned to in save area in task table for use by return statement.

save oncetest flag and mask save decision point data exit to next loop

'return' get saved addresses from save table so can process remainder of calling state restore oncetest flag and mask save decision point data set condition flag exit to process rest of calling state two of the statements above are once only statements, namely start loop and gosub. All the other 3 function once only also by the nature of what they do, i.e., they change the active state in the loop in which they appear. Because they do this, they are not executed on the next scan through the loop. They thus have no need to refer to a Oncetest routine and should not be classed as once only statements. The reason gosub has this need, is that although it alters its own loop, after the return from the subroutine the calling state will become active again possibly for many scans, and it would be inappropriate to call the subroutine every scan, but calling it on a 'once per state activation' basis, with a return from a subroutine not counted as a state activation, or on an edge activation basis is logical.

once only statements. Most statements are once only statements. The following are some other examples which can be implemented either as edge activated or once per state activation types as required.

'start timer 5'

'increment register 17'

It will be readily apparent why it is desirable to start a timer or increment a register only once per state activation or when a condition comes true; e.g., to start the timer every scan would just hold it reset but not running while in that state, instead of resetting to 0 and then allowing it to count the time that passes.

The execution of these statements involves little more than writing a 0 into the appropriate timer which is then counted up once per time interval by an interupt routine until it eventually sticks at timer overflow (255 for 8 bits), or adding one to the number stored in the appropriate register.

Once only operation.

The ONCETEST routine in the source code disclosure. shows how to implement routines that execute their function every time the function (their state is active and their condition part is true) becomes true. There is a simplified way of providing once only operation. This involves having a single boolean flag per loop. This flag is set by any routine which alters the state that is active in that loop. It is reset at the end of the first scan through that loop just before moving on to process the next loop, and optionally for ease at the end of every scan through the loop. It is therefore true only during the first scan through a newly active state. It is used by the service routines for any once only statements, and these execute their function only if the flag is true. The net value of this technique depends on the trade-off between a simplified interpreter and more flexibility in the language.

Under some circumstances it can be advantageous to be able to have a once only routine repeat the execution of its function every scan. For instance to hold a timer reset until the state becomes deactivated and then automatically release it. For this purpose, a 'repeat' statement can be provided which when executed by the interpreter causes the next, or subsequent statements up to an 'end repeat' statement, to execute every scan which can be done by the interpreter selecting alternative entry points to the service routines for those repeating statements, which entry points ignore ONCETEST and the first scan flag.

every scan statements. The prime example of this is the output statement.

'op 45 on'

This statement says effectively 'output 45 is on while the state the statement appears in is active and subject to any condition applying to it'. The output automatically turns off when the state is deactivated. It does not say 'turn output 45 on', and need another statement to turn it off later. This is achieved by having all the bits in the output map set to 0 at the beginning of each scan, and providing a service routine for the statement that sets the appropriate bit in the map each scan the state is active and the condition part is true.

miscellaneous statements define

A class of define statements is provided for variables or constants. These may be manually inserted into the program or altered, or automatically inserted when a new name is recognized. They are of the form 'define state 5=thisstate' and basically associate the name with the numerical value of the variable/constant, and amount to a symbol table stored as part of the program. They do nothing during program execution and are just skipped, and so do not slow the interpreter significantly but they are used during program listing by the print routines.

Statements can be provided to test whether a particular state is active in some defined loop. This involves going to the loop variable for the loop in question, extracting the loop reference, which may be the address of the p code for the state that is active, and if so going to the state p code and extracting the state number which may be stored as the second and third bytes of p code. A comparison is then carried out. The statements must be compatible in terms of variable types, and may be of the form Get loop 3
If equal to 315
Goto 350 or

If state 315 in loop 3
Goto 350

By way of additional disclosure for the sake of clarity, the following charts show the routines already described but in greater detail, and also some of the other supporting routines necessary to make such a controller a practical tool.

Also by way of additional disclosure for the same purpose, source code is disclosed for implementing the key routines on a particular microprocessor.

These following charts follow the source code disclosed closely if not exactly and use entry and exit points named similarly to the labels in the source code to assist with understanding of the code and cross referencing.

Simplified Charts

The following charts show the broad flow of control for our implementation of the novel scanning methods disclosed.

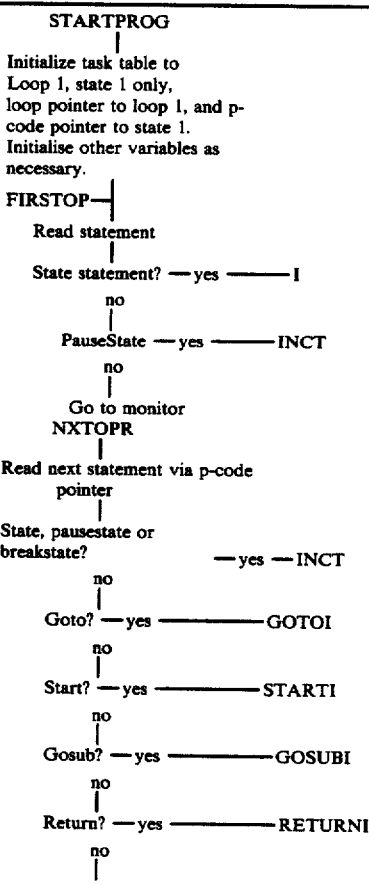

-continued

Must be normal control
statement, therefore carry out
the appropriate function of
evaluating a condition or
carrying out some action
|
I — Advance p-code pointer to next
statement operator
NXTOPR INCT
|
Advance the loop pointer and
read address of next state
block for processing from the
loop variable indicated.
(Advancement is from the first
active loop through all active
loops in numerical order of
loop number to the last, and
then back to the first, and so
on repetitively.
|
FIRSTOP GOTOI
|
Condition flag true? —no ———I
yes
|
save decision point address and
loop number in trace table.
|
write address of new state block
into loop variable for the loop
being processed
|
INCT

STARTI
|

Condition flag true
going transition detected? —no —I
yes
|
save decision point address and
loop number in trace table.
|
write address of new state block
into loop variable for the loop
number specified in the start
statement. (If the specified loop
is already active just overwrite
the existing value of state block
address. If the loop is not
active, slot a new loop variable
into the array in numerical order
and write both the loop number and
the address of the new state block
into the variable).
|
I -continued GOSUBI
|
Condition flag true going
transition detected? —no —I
yes
|
save decision point address and
loop number in trace table.
|
save value of p-code pointer,
value of current state block
address, and condition flag
transition information for use by
RETURNI processing later.
|
write address of new state block
into loop variable for the loop
being processed, and into p-code
pointer
|
FIRSTOP
RETURNI
|
Condition flag true? —no —I
yes
|
save decision point address and
loop number in trace table.
|
restore value of p-code pointer,
and value of calling state block
address in loop variable, and
transition information, as saved
by GOSUBI processing
|
I

Data Structure

The above flow charts depend on the following data structure and assumptions.

1. A program preferably stored in p-code, but possibly stored in some other form, consisting of at least a list of one or more state blocks.

2. Each state block consisting of a state statement delimiting the start of the block, or similar delimiting means, none, one or more statements defining control action to be carried out including control of active states and loops, and ending at the start of the next state block or at some other convenient delimiter.

3. At least some of the statements available being able to define the static conditions that shall prevail while the state is active, as opposed to a list of procedural tasks to be carried out, e.g., 'op 10 on' means 'output 10 is on', and not 'turn output 10 on', (for later turning off by some other statement). Note output 10 will go off automatically when the state becomes inactive. Note that the repetitive scanning and other special operating system support combines with the language to provide this feature.

4. At least some of the statements being able to act once only when the state is activated, and to automatically skip execution on subsequent scans through that state while it stays active.

5. A list of loop variables that may be active or inactive, and if active, that associate a loop number with an active state, and where the numerical order of said loop numbers control the order of scanning of said active states.

6. Goto statements that can work from the necessary evaluation to change the active state in the loop in which the statement appears without there being any need to evaluate which state is active in that loop, and a program structure that allows this to occur.

7. Start statements to make a loop variable active and load a pointer to the active state block into the loop variable.

8. Gosub/return statements that act AT THE STATE LEVEL as described.

All Drummond's basic claims of

1. Only one state active in a set at once.

2. One becoming active makes remainder in set inactive etc., apply.

Note exception: we can make loops active and inactive, and in the latter case make active states inactive without making any other active state in the same set active in turn.

Detail Flow Charts describing Interpreter routines. Labels and variable names are shown in CAPITALS.

Program starts at STARTINTER

The flowcharts detail essential elements in the algorithms. They do not necessarily describe house-keeping activities included in the program listing, such as maintaining registers, because these activities are specific to particular implementations.

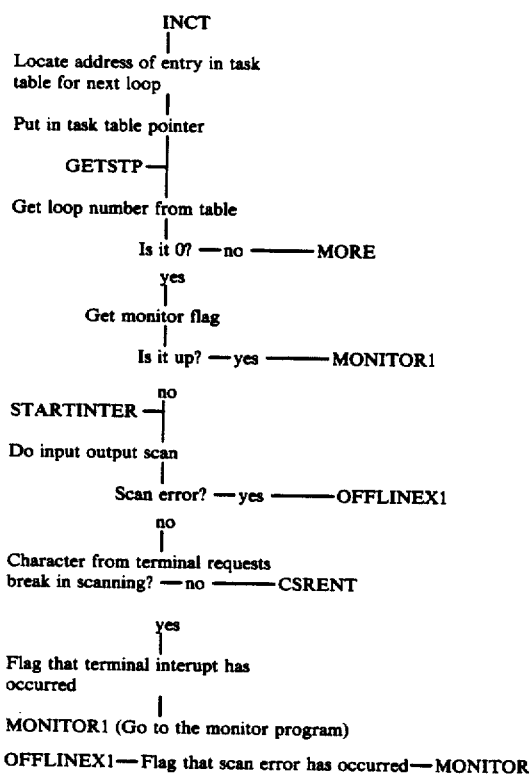

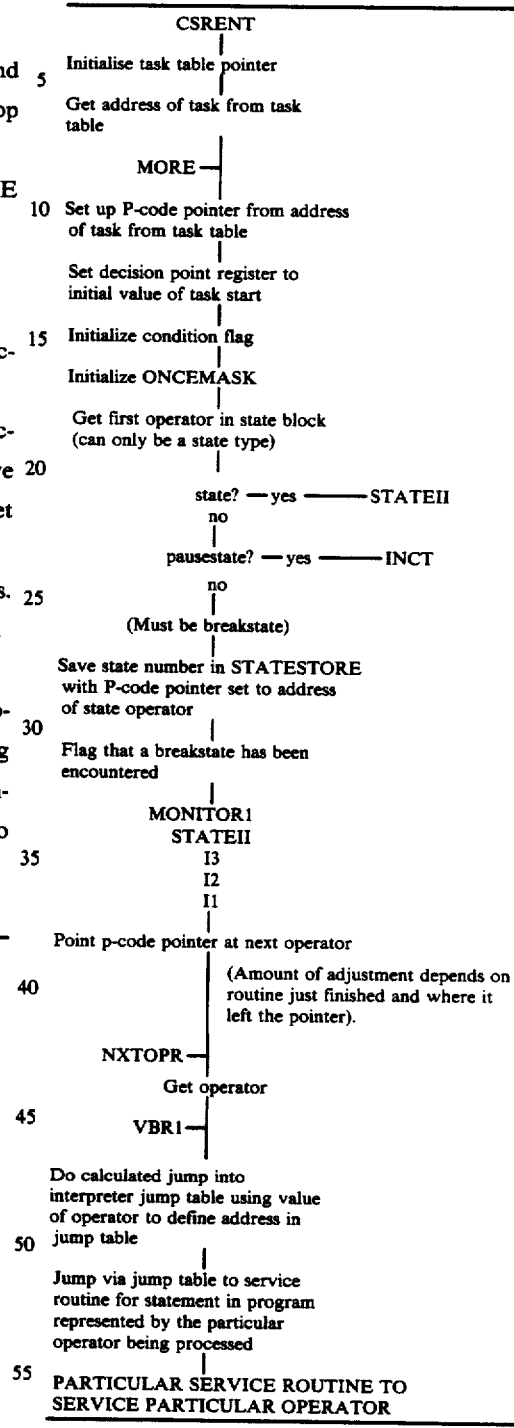

Skip function

Once a decision has been made that the condition required to carry out an action is true, then it is no longer necessary to continue evaluating the remaining terms in the condition statement because they can have no effect on the net result of the statement overall. This situation arises when an 'or' type statement is encountered and the condition flag is true when the statement is read. As an example, in the statement 'if ip 5 on, and ip 6 on, or ip 7 on, set op 66 on'
if both inputs 5 & 6 are on, the statement 'set op 66 on' will be carried out independent of the state of input 7, and therefore the evaluation of input 7 (and any other condition evaluating statements following) may be skipped. A special algorithm is provided for this and is as follows.

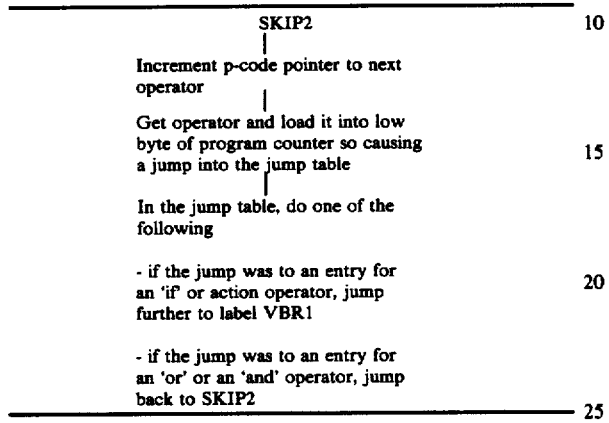

```
                    SKIP2
                      |
            Increment p-code pointer to next
            operator
                      |
            Get operator and load it into low
            byte of program counter so causing
            a jump into the jump table
                      |
            In the jump table, do one of the
            following

- if the jump was to an entry for
              an 'if' or action operator, jump
              further to label VBR1

- if the jump was to an entry for
              an 'or' or an 'and' operator, jump
              back to SKIP2
```

This algorithm relies on having the operators coded so that their binary values are the same as the low byte of the address in the jump table at which their respective entries reside, or the value could be equal to an offset for calculating the jump address into the table.

Example Service routines

Routine to execute statements 'Set op' (set output) or 'Set flag'

Statements are stored in memory as p-code and these statements may conveniently be stored as 3 consecutive bytes
byte 1—operator indicating kind of statement, in this case meaning 'set op' or 'set flag'
byte 2—address in internal output or flag map in memory which holds the byte containing this output/flag
byte 3—mask to select actual output/flag
Note the same routine may be used for both flags and outputs and byte 1 is identical, only the address determines whether the variable is an output or flag.

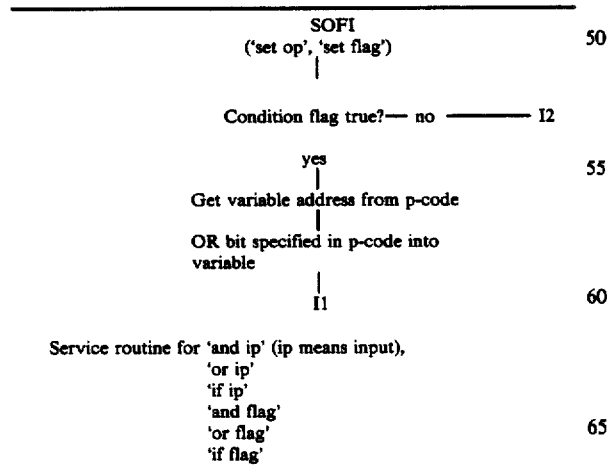

```
                    SOFI
             ('set op', 'set flag')
                      |
            Condition flag true?— no ———— I2
                      |
                     yes
                      |
            Get variable address from p-code
                      |
            OR bit specified in p-code into
            variable
                      |
                      I1
```

Service routine for 'and ip' (ip means input),
'or ip'
'if ip'
'and flag'
'or flag'
'if flag'

P-code is as above - operator, address, mask.

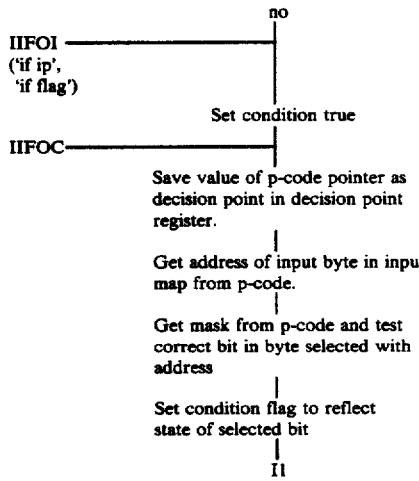

```
                    AIFOI
             ('and ip', 'and flag')
                      |
            Condition true?— no ———— I2
                      |
                     yes
                      |
                    IIFOC OIFOI
             ('or ip' and 'or flag')
                      |
            Condition true?— yes ———— SKIP2
                      |
                      no
    IIFOI ————————————|
    ('if ip',
     'if flag')       |
                      |
                Set condition true
    IIFOC————————————|
                      |
            Save value of p-code pointer as
            decision point in decision point
            register.
                      |
            Get address of input byte in input
            map from p-code.
                      |
            Get mask from p-code and test
            correct bit in byte selected with
            address
                      |
            Set condition flag to reflect
            state of selected bit
                      |
                      I1
```

'Halt'

'Halt' is a conditional operation which if activated causes transfer of processing to the next loop.

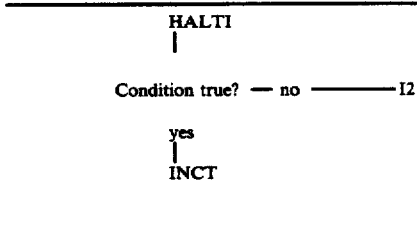

```
                    HALTI
                      |
            Condition true? — no ———— I2
                      |
                     yes
                      |
                    INCT
```

'State', 'pausestate', 'breakstate'.

Note that during the processing of any one state, two state type operators are read and processed. One at the beginning of the state block and one at the end. How they are processed is different. The state type operators found at the beginning of a state block are processed as shown in the charts above. (See approx 15 lines before and after TRPST. The operators found at the end of blocks are processed as below. They simply indicate the end of processing for this state, and transfer processing to the state that is active in the next loop. The operator at the end of a block is in fact the first operator in the next state block in line in the program listing.

State type operators include state, pausestate, and breakstate.

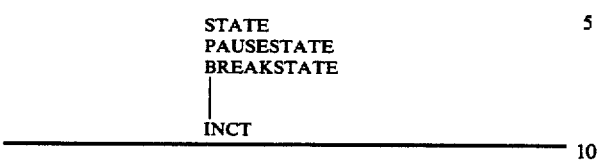

'Goto'

The p-code for 'goto' is—operator, new state address (i.e. address of state operator at beginning of new state block in p-code in memory).

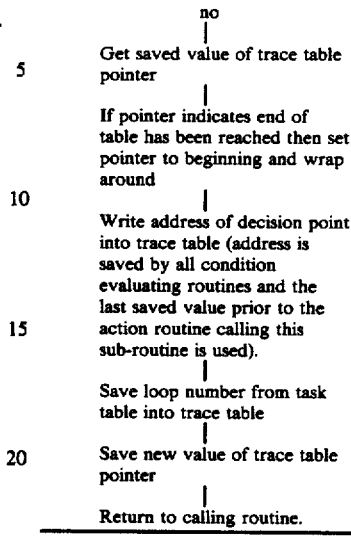

Subroutine 'StoreHistory'.

Uses the trace table which is a linear table in memory as a wrap around 'endless tape' storage buffer. A pointer to the last used/next to be used location is saved as a separate pointer variable. Once the table has been filled, older data is overwritten by new data.

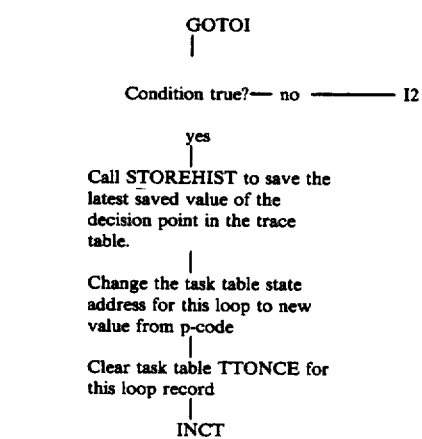

```
                    no
                     |
         Get saved value of trace table
         pointer
                     |
         If pointer indicates end of
         table has been reached then set
         pointer to beginning and wrap
         around
                     |
         Write address of decision point
         into trace table (address is
         saved by all condition
         evaluating routines and the
         last saved value prior to the
         action routine calling this
         sub-routine is used).
                     |
         Save loop number from task
         table into trace table
                     |
         Save new value of trace table
         pointer
                     |
         Return to calling routine.
```

Note: in our implementation, a trace enable flag is stored encoded into the loop number highest bit. This can be done because we implement no more than 7FH loops encoded into 8 bits. A separate variable could be used. This variable is used for the 'tracing of this loop disabled?' decision.

'Remark'

The p-code for 'remark' is—operator, address of next operator in program, remark character string, (next operator).

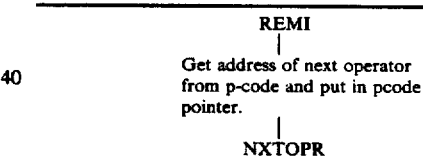

'Start instruction'

This instruction is understood more easily by understanding the following

The task table is an array of records, some of which hold data and represent active loops that have been started, and some are empty and represent loops that have not been started. The array is dynamic in the sense that all non-empty records are packed to the start of the table and are ordered in numerical order of the value of the loop variables in the records. Inserting a new loop record into the array involves inserting it in numerical order into the packed array and if necessary moving higher order loops down the array to allow this to be done.

Each record is a loop record and has fields that hold the following simple variables TTLOOP—The number of the loop the record represents, and that also decides the order in which active states are scanned. Loop numbers are mutually exclusive. In our representation valid loop numbers are all less than 127. We store the loop number as 7 bits of an 8 bit variable, and use the 8th bit as a 'loop tracing disable flag', see STOREHIST. Both the loop number and the flag are stored in TTLOOP.

TTSTATE—the address of the active state for the loop, i.e. the address in memory of the program p-code for the state operator which defines the start of the program state block for the active state.

TTONCE—This is the onceflag variable used by the ONCETEST

TTACCUM—The an intermediate result and data transfer register for this looop. It is used by statements that manipulate numerical data.

TTEXTEN—An extension for TTACCUM

TTSTATESTR, TTONCESTR, TTRTNAD—Three variables for preserving information from TTSTATE, TTONCE, and the p-code pointer respectively for use by 'gosub' and 'return' statements.

The p-code for 'start' is operator, loop number, new state address.

```
         STARTI
           |
Call subroutine ONCETEST
           |

Do routine this time? — no ———— I3
           |
          yes
           |
Call subroutine STOREHIST
           |
Point at task table record   for
loop currently being processed
           |
Get current   loop number from
task table
           |

Current  loop number  <  loop
number in start    statement? — no ————I1
           |
          yes
           |
Call subroutine SEARCHTT
           |
           I1

SEARCHTT
           |
Initialize    'number of loops
counter ' Initialize   task record pointer
LPFD————|
  Decrement counter
           |

Loop counter value  shows
searched    all    loops?        —yes—— NOVAD
           |
          no                    (I.e. table is full)
           |

Loop in record pointed at = 0
i.e.  empty                       —yes— LEQZ
           |
          no
           |

Loop in record pointed at =
number of loop in start
statement p-code              —yes——— LEQZ
           |
          no
           |
```

```
Loop in record pointed at >
number of  loop in start
statement    p-code            — yes—— SHLP
           |
          no
           |
Increment pointer to next
record in task table
           |
         LPFD SHLP
           |
Move whole block of records,
from that indicated by record
pointer to last record but one
inclusive, down one record in
task table towards table end to
make space for insertion of new
loop. Last loop is overwritten
but must be empty because
program range checking on loop
numbers precludes starting of
too many loops.

LEQZ————|
Get loop number from p-code and
put in task table record
indicated by pointer
           |
Get state address from p-code
and put in task table record
indicated by pointer
           |
Initialise remainder of record,
i.e. ACCUM, EXTEN etc.
           |
Return to caller.
```

Once test

```
         ONCETEST
           |
Get ONCEMASK
           |
AND mask with TTONCE, the
onceflag   for this loop record
The result is saved value of
condition flag as it was when
this instruction was processed
last scan
           |
Condition flag was true? — yes ——— ONCE1
           |
          no
           |
Condition flag is now true — no ——— ONCE2
           |
          yes
           |
Set Onceflag bit indicated by
mask to true, leaving rest of
Onceflag as it was on entry to
sub-routine.
           |
Set value returned to caller to
'do it'.
           |
         ONCE3
         ONCE1
           |
Condition flag is true? — yes ——— ONCE2
```

-continued

```
                    no
                     |
       Set Onceflag bit indicated by
       mask to false, leaving rest of
       Onceflag as it was on entry to
       sub-routine.
ONCE2 ─────────────┤
       Set value returned to caller to
       'do not do it'.
ONCE3 ─────────────┤
       Shift Oncemask one bit
                     |
       Return to caller.
```

Monitor routine to display history

```
                    DISPHIST
                       |
       Print '<CR,LF> Li State    1   5   10   15   20'
       Print '<CR,LF>'
                       |
       Copy trace table to buffer by
       calling SETSNAP. (The trace
       table is changing all the time
       a program is running and
       causing changes of state. The
       monitor may also be running and
       printing past history. So that
       stable data is available to
       this routine the actual table
       is copied into a buffer and the
       printing uses the buffer as
       data. The buffer also has a
       copy of the trace table
       pointer.)
                       |
       Get value of copied trace table
       pointer adjusted to be relevant
       to the copy buffer.
                       |
       Set line number counter to 0
DISPHIST1 ─┤
                       |
       Terminal request to abort
       routine?                        — yes — DISPHISTR
                       |
                      no
                       |
       Printed maximum lines buffer
       can hold?                       — yes — DISPHISTX
                      no
                       |
       Print line number and tab
       across
                       |
       If pointer indicates end of
       buffer has been reached then
       set pointer to beginning and
       wrap arround
                       |
                     AAA
                     AAA
                       |
       Loop number invalid & thus ──── yes── DISPHISTX
       this buffer entry empty?
```

```
                    no
                     |
       Get loop number from buffer and
       temporarily save
                     |
       Call subroutine STPADR to get
       state number equivalent to
       pointer value saved in buffer.
       (The pointer points to the
       decision point which is some
       way through a state block. The
       state number required is the
       number of that block)
                     |
       Print state number
                     |
       Use saved value of loop number
       to tab across page to column
       equivalent to loop
                     |
       Print saved value of loop
       number
                     |
       Increment line count
                     |
                 DISPHIST1

DISPHISTX
                     |
       Print 'END<CR,LF>' message
DISPHISTR─┤
       Return to caller
```

Subroutine STPADR

```
                 STPADR
                     |
       Initialize pointer for STEPON
       routine to first p-code location in
       program
                     |
STPADR3 ──┤
                     |
       Call subroutine STEPON
                     |
       If operator A is state, pausestate, or
       breakstate then save address of state
       operator. (See description of
       STEPON for explanation of
       operator/instruction A)
                     |
       Passed target address in p-code?    ─no─── STPADR3
                    yes
                     |
       Extract address of state number for
       passing to caller.
                     |
       Return to caller
```

Monitor routine to display an expanded 'line' of the history table

```
                 DISPLINE
                     |
       Set Outstanding-line-count to the
       number of the line to be displayed
       obtained as a parameter from the
       monitor command initiating this
       routine
                     |
       Number in valid range? —          no──── DISPLINER
```

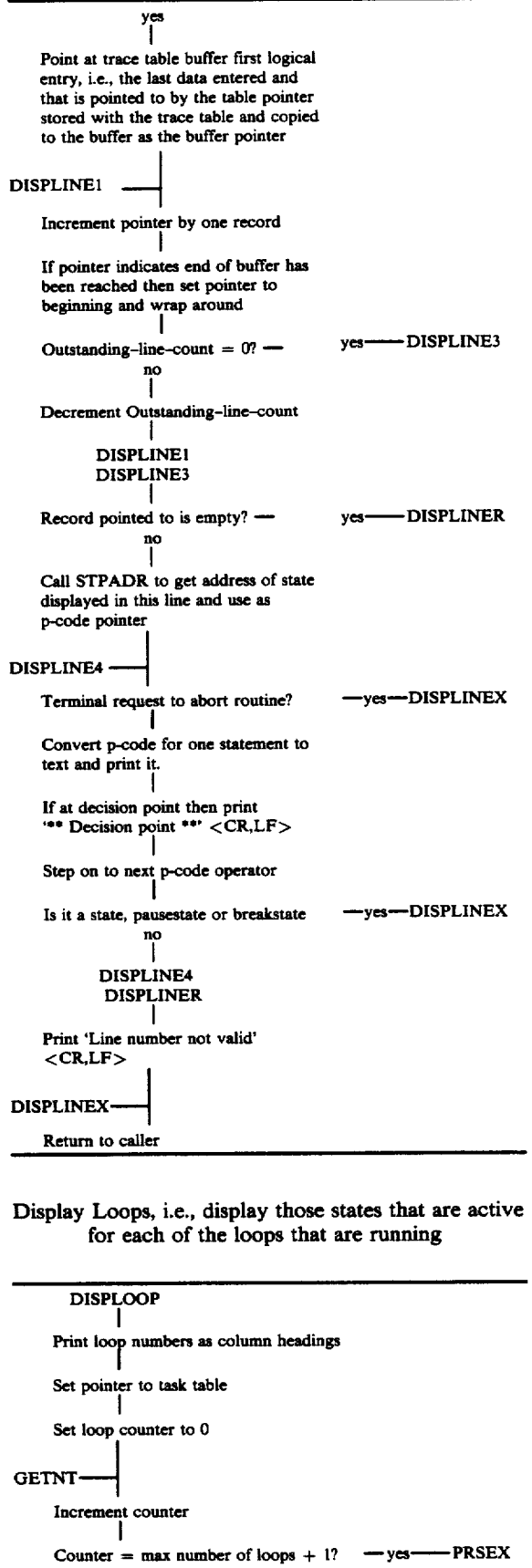

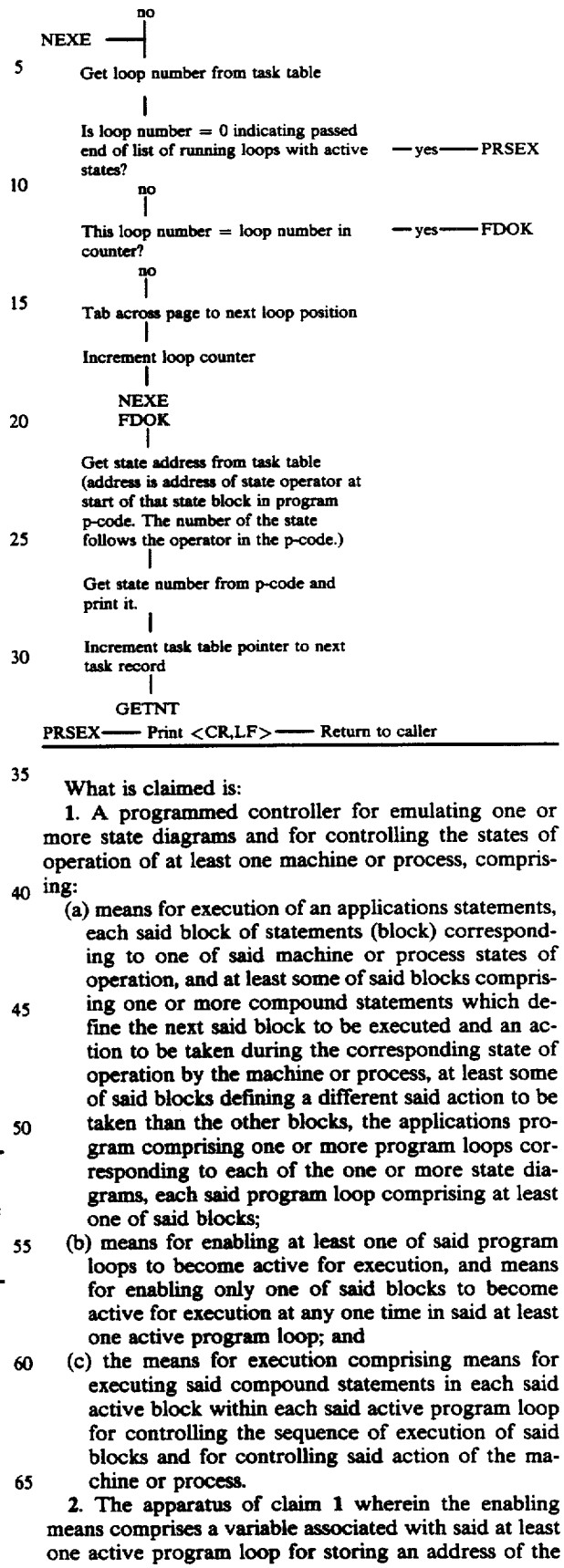

What is claimed is:

1. A programmed controller for emulating one or more state diagrams and for controlling the states of operation of at least one machine or process, comprising:

(a) means for execution of an applications statements, each said block of statements (block) corresponding to one of said machine or process states of operation, and at least some of said blocks comprising one or more compound statements which define the next said block to be executed and an action to be taken during the corresponding state of operation by the machine or process, at least some of said blocks defining a different said action to be taken than the other blocks, the applications program comprising one or more program loops corresponding to each of the one or more state diagrams, each said program loop comprising at least one of said blocks;

(b) means for enabling at least one of said program loops to become active for execution, and means for enabling only one of said blocks to become active for execution at any one time in said at least one active program loop; and (c) the means for execution comprising means for executing said compound statements in each said active block within each said active program loop for controlling the sequence of execution of said blocks and for controlling said action of the machine or process.

2. The apparatus of claim 1 wherein the enabling means comprises a variable associated with said at least one active program loop for storing an address of the start of the active block and said variable having an identifier to indicate the active program loop which comprises the active block.

3. The apparatus of claim 1 wherein the enabling means comprises a variable associated with said at least one active program loop for storing an identifier of the active block and said variable having an identifier to indicate the active program loop which comprises the active block.

4. The apparatus of claim 2 or 3 further comprising means for storing each said variable associated with said at least one active program loop for facilitating multi-tasking of a plurality of said at least one active program loop and for controlling the sequence of execution of said at least one active program loop.

5. The apparatus of claim 1 further comprising means for recording information indicative of the sequence of execution of said active blocks of statements and said at least one program loop.

6. The apparatus of claim 5 wherein the controller comprises means for indicating a condition responsible for the selection of the next block to be executed and wherein said means of recording information includes means for storing one or more of said conditions and said action to be taken during the corresponding state of operation.

7. The apparatus of claim 5 or 6 further comprising means for displaying the recorded information on said active blocks and said at least one active program loop.

8. A method of using a programmed controller emulating one or more state diagrams and for controlling the states of operation of at least one machine or process, which method comprises the steps of:
   (a) executing an applications program comprising a plurality of blocks of statements, each said block of statements (blocks) corresponding to one of said machine or process states of operation and at least some of said blocks comprising one or more compound statements which define the next said block to be executed and an action to be taken during the corresponding state of operation by the machine or process, at least some of said blocks defining a different said action to be taken than the other blocks, the applications program representing each of said one or more state diagrams by a program loop comprising at least one of said blocks
   (b) enabling at least one of said program loops to become active to execution and enabling only one block of said blocks to become active for execution at any one time in said at least one active program loop; and
   (c) the step of execution, executing each said active block within each said active program loop for controlling the sequence of execution of said blocks and thereby control said action of the machine or process.

9. The method of claim 8 wherein the step for enabling comprises the step of storing an identifier of said active block into a variable associated with said at least one active program loop and storing an identifier of said at least one active program loop which comprises the active block.

10. The method of claim 8 wherein the step for enabling comprises the step of storing an address of the start of said active block into a variable associated with said at least one active program loop and storing an identifier of said at least one active program loop which comprises the active block.

11. The method of claim 9 or 10 further comprising the step of storing each said variable associated with said at least one active program loop for facilitating multi-tasking of a plurality of said at least one active program loop and for controlling the sequence of execution of said at least one active program loop.

12. The method of claim 8 further comprising the step of recording information indicative of the sequence of execution of said active blocks and said at least one active program loop.

13. The method of claim 12 wherein the method comprises the step of indicating a condition responsible for the selection of the next block to be executed and wherein said step for recording information includes the step of recording one or more of said conditions and said action to be taken during the corresponding state of operation.

14. The method of claim 12 or 13 further comprising the step of displaying the recorded information on said blocks and said at least one active program loop.

15. A programmed controller for emulating one or more state diagrams and for controlling the states of operation of at least one machine or process, comprising:
   (a) an applications program comprising a plurality of blocks of statements, each said block of statements (block) corresponding to one of said machine or process states of operation, and at least some of said blocks of statements comprising one or more compound statements which define the next said block to be executed and an action to be taken during the corresponding state of operation by the machine or process, at least some blocks defining a different said action to be taken than the other blocks, the applications program comprising one or more program loops corresponding to each of the one or more state diagrams, each said program loop comprising at least one of said block of statements;
   (b) means for enabling at least one of said program loops to become active for execution, and means for enabling only one of said blocks of statements to become active for execution at any one time in said active program loop; and
   (c) the means for enabling comprising means for indicating to said at least one active program loop, said means for indicating comprising means for storing an identifier of the active block and means for storing an identifier to indicate the program loop which comprises the active block; and
   (d) means for storing each said means for indicating for facilitating multi-tasking of a plurality of said at least one program loop and for controlling the sequence of execution of said at least one active program loop;
   (e) the means for execution comprising means for executing said compound statements in each said active block with each said active program loop for controlling the sequence of execution of said blocks and for controlling said action by the states of operation of the machine or process.

16. The apparatus of claim 15, wherein said means for indicating associated with said at least one active program loop comprises means for storing an address of the start of the active block and means for storing an identifier to indicate the at least one active program loop which comprises the active program state.

17. The apparatus of claim 15 further comprising means for recording information indicative of the sequence of execution of said active blocks and said at least one active program loop.

18. The apparatus of claim 17, wherein the controller comprises means for indicating a condition responsive for the selection of the next block to be executed and wherein said means of recording information includes means for storing one or more of said conditions and said action to be taken during the corresponding state of operation.

19. The apparatus of claim 5 or 6 further comprising means for displaying the recorded information on said active blocks and said at least one active program loop.

20. The apparatus of claim 16 further comprising means for recording information indicative of the sequence of execution of said active blocks of statements and said at least one program loop.

21. The apparatus of claim 20 wherein the controller comprises means for indicating a condition responsive for the selection of the next block to be executed and wherein said means of recording information includes means for storing one or more of said conditions and said action to be taken during the corresponding state of operation.

22. The apparatus of claim 20 or 21 further comprising means for displaying the recorded information on said active blocks and said at least one active program loop.

23. A method of using a programmed controller emulating one or more state diagrams and for controlling the states of operation of at least one machine or process, which method comprises the steps of:
   (a) executing an applications program comprising a plurality of blocks of statements, each said block of statements (blocks) corresponding to one of said machine or process states of operation and at least some of said blocks comprising one or more compound statements which define the next said block to be executed and an action to be taken during the corresponding state of operation by the machine or process, at least some of said blocks defining a different said action to be taken than the other blocks, the applications program representing each of said one or more state diagrams by a program loop comprising at least one of said blocks; and
   (b) enabling at least one of said program loops to become active for execution and enabling only one block of said blocks to become active for execution at any one time in said at least one active program loop;
   (c) the step for enabling comprising the step of storing an identifier of the active block into a variable and the step of storing an identifier into said variable to indicate the at least one active program loop which comprises the active block;
   (d) storing each said variable associated with said at least one active program loop for facilitating multitasking of a plurality of said at least one active program loops and for controlling the sequence of execution of said at least one active program loop; and
   (e) executing said compund statement in each said active block with each said active program loop for controlling the sequence of execution of said blocks and for controlling said action of the machine or process.

24. The method of claim 23, wherein the step for storing information into a variable comprises storing an address of the start of the active block and storing an identifier to indicate the at least one active program loop which comprises the active block.

25. The method of claim 23 further comprising the step of recording information indicative of the sequence of execution of said active blocks of statements and said at least one active program loop.

26. The method of claim 25, wherein the method comprises the step of indicating a condition responsible for the selection of the next block to be executed and wherein said step for recording information includes the step of recording one or more of said conditions and said action to be taken during the corresponding state of operation.

27. The method of claim 25 or 26 further comprising the step of displaying the recorded information on said blocks and said at least one active program loop.

28. The method of claim 24 further comprising the step of recording information indicative of the sequence of execution of said active blocks of statements and said at least one active program loop.

29. The method of claim 28 wherein the method comprises the step of indicating a condition responsible for the selection of the next block to be executed and wherein said step for recording information includes the step of recording one or more of said conditions and said action to be taken during the corresponding state of operation.

30. The method of claim 28 or 29 further comprising the step of displaying the recorded information on said blocks and said at least one active program loop.

31. A programmed controller to emulate one or more state diagrams for controlling the states of operation of at least one machine or process, comprising means for executing an applications program comprising a plurality of blocks of statements (blocks), and each said block corresponding to one of said states of operation, and at least some of said blocks comprising one or more compound statements which define the next block to be executed and an action to be taken during the corresponding state of operation by the machine or process, the applications program comprising one or more program loops corresponding to each of the one or more state diagrams, each said program loop comprising at least one of said blocks, and the programmed controller comprising operating system software, the software comprising:
   (a) means for enabling at least one program loop of said program loops to become active for execution, and means for enabling only one of said blocks of statements to become active for execution at any one time in said active program loop; and
   (b) the means for enabling comprising means for pointing to said at least one active program loop, said means for pointing comprising means for storing an identifier of the active block and means for storing an identifier to indicate the program loop which comprises the active block; and
   (c) means for storing each said means for pointing for facilitating multi-tasking of a plurality of said at least one program loop and for controlling the sequence of execution of said at least one active program loop;
   (d) means for executing said compound statements in each said active block with each said active program loop for controlling the sequence of execution of said blocks and for controlling said action by the states of operation of the machine or process.

32. The apparatus of claim 31, wherein said means for pointing associated with said at least one active program loop comprising means for storing an address of the start of the active block and means for storing an identifier to indicate the at least one active program loop which comprises the active block.

33. The apparatus of claim 31 or 32 further comprising means for recording information indicative of the sequence of execution of said active blocks and said at least one active program loop.

34. The apparatus of claim 33 further comprising means for displaying the recorded information on said active blocks and said at least one active program loop.

35. Operating system software, for use in a programmed controller to emulate one or more state diagrams for controlling the states of operation of at least one machine or process, comprising means for executing an application program comprising a plurality of blocks of statements (blocks), each said block corresponding to one of said states of operation and at least some of said blocks comprising one or more compound statements which define the next block to be executed and an action to be taken during the corresponding state of operation by the machine or process the applications program comprising one or more program loops corresponding to each of the one or more state diagrams, each said program loop comprising at least one of said blocks, and the operating system comprising:
 (a) means for enabling at least one program loop of said program loops to become active for execution, and means for enabling only one of said blocks of statements to become active for execution at any one time in said active program loop; and
 (b) the means for enabling comprising means for pointing to said at least one active program loop the means for pointing comprising means for storing an identifier of the active block and means for storing an identifier to indicate the program loop which comprises the active block; and
 (c) means for storing each said means for pointing to said at least one program loop for facilitating multitasking of a plurality of said at least one program loop and for controlling the sequence of execution of said at least one active program loop;
 (d) means for executing said compound statements in each said active block with each said active program loop for controlling the sequence of execution of said blocks and for controlling said action by the states of operation of the machine or process.

36. The apparatus of claim 35, wherein said means for pointing associated with said at least one active program loop comprises means for storing an address of the start of the active block and means for storing an identifier to indicate the at least one active program loop which comprises the active program state.

37. The apparatus of claim 35 or 36 further comprising means for recording information indicative of the sequence of execution of said active blocks and said at least one active program loop.

38. The apparatus of claim 37 further comprising means for displaying the recorded information on said blocks and said at least one active program loop.

39. A method of structure an operating system for emulating one or more state diagrams and for controlling the states of operation of at leaast one machine or process, comprising the step of executing an applications program comprising a plurality of blocks of statements, each said block corresponding to one of said states of operation, and at least of some of said blocks comprising one or more compound statements which define the next said block to be executed and an action to be taken during the corresponding state of operation, the applications program comprising one more program loops corresponding to each of the one or more state diagrams, each said program loop comprising at least one of said blocks, and which method comprises the steps of:
 (a) enabling at least one of said program loops to become active for execution and enabling only one block of said blocks to become active for execution at any one time in said at least one active program loop;
 (b) the step for enabling comprising the step of storing an identifier of the active block into a variable and the step of storing an identifier to indicate the at least one active program loop which comprises the active block;
 (c) executing said compound statement in each said active block with each said active program loop for controlling the sequence of execution of said blocks and for controlling said action of the machine or process; and
 (d) storing each said variable associated with said at least one active program loop into a storage means for facilitating multitasking of a plurality of said at least one active program loops and for controlling the sequence of execution of said at least one active program loop.

40. The method of claim 39, wherein the step for storing information into a pointer comprises storing an address of the start of the active block and storing an identifier to indicate the at least one active program loop which comprises the active block.

41. The method of claim 39 or 40 further comprising the step of recording information indicative of the sequence of execution of said active blocks of statements and said at least one active program loop.

42. The method of claim 40 or 41 further comprising the step of displaying the recorded information on said blocks and said at least one active program loop.

43. A programmed controller for emulating one or more state diagrams for controlling the states of operation of at least one machine or process, comprising:
 (a) means for execution of an applications program which comprises a plurality of blocks of statements, each said block of statements (blocks) when executed being a program state, and each said program state corresponding to one of said machine or process states of operation and at least some of the blocks comprising one or more compound statements which define the next said block to be executed and an action to be taken during the corresponding state of operation by the machine, at least some of said program state defining a different action to be taken;
 (b) means for enabling at least one of said program loops to become active and only one of said blocks to become active in said active program loop at any one time;
 (c) the means for enabling comprising means for pointing to said at least one active program loop, said means for pointing comprising means for storing an identifier for the active block and each said pointer having an identifier to indicate the program loop which comprises the active block; and (d) means for executing said compound statements in each said active block with each said active program loop for controlling the sequence of execution of said blocks and for controlling said action by the states of operation of the machine or process.

44. The apparatus of claim 43, wherein said means for pointing to said at least one active program loop comprises means for storing an address of the start of the active block and means for storing an identifier to indicate the active program loop which comprises the active block.

45. The apparatus of claim 43 or 44 further comprising means for storing each said means for pointing to said at least one active program loop into a storage means for facilitating multi-tasking of a plurality of said at least one active program loop and for controlling the sequence of execution of said at least one active program loop.

46. The apparatus of claim 44 or 45 further comprising means for recording information indicative of the sequence of execution of on said active program states and said at least one active program loop.

47. The apparatus of claim 46, wherein the controller comprises means for indicating a condition responsible for the selection of the next program state to be executed and wherein said means of recording information includes means for storing one or more of said conditions and said action to be taken during the corresponding state of operation.

48. The apparatus of claim 46 or 47 further comprising means for displaying the recorded information on said active program states and said at least one active program loop.

49. A method of using a programmed controller emulating one or more state diagrams and for controlling the states of operation of at least one machine or process, which method comprises the steps of:
(a) executing an applications program comprising a plurality of blocks of statements, each said block when executed being a program state, and each said program state corresponding to one of said machine or process states of operation and at least some of the blocks comprising one or more compound statements which define the next said block to be executed and an action to be taken during the corresponding state of operation by the machine, at least some of said block defining a different action to be taken than the other blocks, the applications program comprising one or more program loops corresponding to each of the one or more state diagrams, each said program loop comprising at least some of said blocks;
(b) enabling at least one of said program loops to become active and allowing only one of said blocks to become active in said at least one active program loop at any one time;
(c) the step of enabling comprising the step of storing an address of the start of said active block into a pointer and storing an identifier of said at least one program loop with said pointer; and
(d) storing each said pointer associated with said at least one active program loop for facilitating multitasking of a plurality of said at least one active program loop and for controlling the sequence of execution of said at least one active program loop.

50. The method of claim 49, wherein the step for storing information into a pointer comprises storing an address of the start of the active block and storing an identifier to indicate the active program loop which comprises the active block.

51. The method of claim 49 or 50 further comprising the step of storing the pointer associated with said at least one active program loop into a storage means for facilitating multi-tasking of a plurality of said at least one active program loops and for controlling the sequence of execution of said at least one active program loop.

52. The method of claim 49 or 50 further comprising the steps of recording information indicative of the sequence of execution of said active blocks and said at least one active program loop.

53. The method of claim 52, wherein the controller comprises means for indicating a condition responsible for the selection of the next block to be executed, wherein said step of recording information includes the step of recording one or more of said conditions and said action to be taken during the corresponding state of operation.

54. The method of clalim 52 or 53 further comprising the step of displaying the recorded information on said active blocks, and said at least one active program loop.

55. A programmed controller for emulating one or more state diagrams for controlling the states of operation of at least one machine or process comprising means for executing an application program which comprises a plurality of blocks of statements (blocks), each said block when executed being a program state, and each said program state corresponding to one of said states of operation, and at least some of the blocks comprising one or more compound statements which define the next said block to be executed and an action to be taken during the corresponding state of operation by the machine, at least some of said blocks defining a different action to be taken than the other blocks, the applications program comprising one or more program loops corresponding to each of the one or more state diagrams, each said program loop comprising at least one of said blocks:
(a) at least one of said program loops being active and only one of said program states being active in said active program loop at any one time;
(b) a pointer associated with said at least one active program loop for storing an address of the start of the active program state and each said pointer having an identifier to indicate at least one said active program loop which comprises the active program state; and
(c) means for executing said compound statements in each said active block with each said active program loop for controlling the sequence of execution of said blocks and for controlling said action of the machine or process.

56. The apparatus of claim 54 or 55 further comprising means for storing each said pointer associated with said at least one active program loop into a storage means for facilitating multi-tasking of a plurality of said at least one active program loop and for controlling the sequence of execution of said at least one active program loop.

57. The apparatus of claim 55 further comprising means for recording information indicative of the sequence of execution of said active program state and said at least one active program loop.

58. The apparatus of claim 57, wherein the controller comprises means for indicating a condition responsible for the selection of the next program state to be executed and wherein said means of recording information includes means for storing one or more of said conditions and said action to be taken during the corresponding state of operation.

59. The apparatus of claim 58 further comprising means for displaying the recorded information on said program states and said at least one active program loop.

60. A method of using an operating system for emulating one or more state diagrams and for controlling the states of operation of at least one machine or process comprising the step of executing an applications program comprising a plurality of blocks of statements (blocks), each said block when executed being a program state, and each said program state corresponding to one of said states of operation and at least some of the blocks comprising one or more compound statements which define the next said block to be executed and an action to be taken during the corresponding state of operation by the machine at least some of said program states defining a different action to be taken than the other program states, the applications program comprising one or more program loops corresponding to each of the one or more state diagrams, each said program loop comprising at least one of said blocks, which method comprises the steps of:
  (a) enabling at least one of said program loops to become active and enabling only one of said blocks to become active in said active program loop at any one time;
  (b) the step of enabling comprising the step of storing an identifier of said active block into a variable and the step of storing an identifier of said at least one program loop with said variable; and
  (c) storing each said variable associated with said at least one active program loop into storage means for facilitating multitasking of a plurality of said at least one active program loops and for controlling the sequence of execution of said at least one active program loop.

61. The method of claim 60, wherein the step for storing information into said variable comprises storing an address of the start of the active program state and storing an identifier to indicate the active program loop which comprises the active program state.

62. The method of claim 60 or 61 further comprising the step of storing the variable associated with said at least one active program loop into a storage means for facilitating multi-tasking of a plurality of said at least one active program loops and for controlling the sequence of execution of said at least one active program loop.

63. The method of claim 60 or 61 further comprising the step of recording information indicative of the sequence of execution of said program state and said program loop activity.

64. The method of claim 63, wherein the controller comprises means for indicating a condition responsible for the selection of the next program state to be executed, wherein said step of recording information includes the step of recording one or more of said conditions and said action to be taken during the corresponding state of operation.

65. A method of facilitating debugging a finite state applications programs on a programmed controller, said finite state applications program comprising one or more blocks of statements, each when executed by the computer being a program state, and each said program state occurring only when one or more conditions cause said program state to occur, the method comprising the steps of:
  (a) recording each said occurrence of each said program state;
  (b) recording said one or more conditions causing the occurrence of said program state; and
  (c) displaying the order of occurrence of said one or more program states and/or said one or more conditions responsible for each said program state occurrence, whereby debugging of the finite state applications program is facilitated.

66. A programmed computer for facilitating debugging of a finite state applications program, said finite state applications program comprising one or more blocks of statements, each when executed by the computer being a program state, and each said program state occurring only when one or more conditions cause said program state to occur, the apparatus comprising:
  (a) means for recording each said occurrence of each said program state;
  (b) means for recording said one or more conditions causing the occurrence of said program state; and
  (c) means for displaying the order of occurrence of said one or more program states and/or said one or more conditions responsible for each said program state occurrence, whereby debugging of the finite state applications program is facilitated.

67. A programmable controller to control the operation of at least one machine or process comprising:
  (a) provision for an applications program using state variable concepts;
  (b) operation systems software able to refer to state variables including programming language and monitor facilities providing necessary support for said functions, with said debugging support means provided as a system service; and
  (c) means to record for later use information comprising previous transitions that occurred with regard to which states were active in the system and the order in which the transitions occurred or the activities of previous states.

68. A programmable controller as claimed in claim 67 further comprising means for retrieval and presenting the information to a user.

69. A programmable controller as claimed in claim 67 or 68 wherein said system software means has means to record information indicating which logical evaluation or evaluations in the processing of the program caused the corresponding said transition or transitions of state to occur.

70. A programmable controller as claimed in any one of the claims 67 to 69 having:
  one or more program loops each corresponding to a state diagram; and
  at least one of said program loops active, and said system software means has means to record information indicating which program loop contained the statement which was executed and so caused the corresponding state transition to occur.

71. A programmable controller as claimed in claim 70 wherein:
  each program loop has program states corresponding to the state diagram states; and
  only one of said program states is active in each of said active program loops at one time.

72. A programmable controller as claimed in claim 71 wherein each program loop has an identifier and wherein the program loop identifier for the loop in which the logical evaluation occurred is recorded in said information.

73. A programmable controller as claimed in any one of the preceding claims 67 to 72 wherein the program further comprises compound statements which consist of a conditional part and an action part, the conditional part consisting of one or more simple condition evaluating statements each evaluating whether some system condition is true or false and wherein the conditional part determines whether the actions contained in the action part shall be carried out and wherein the information recorded includes the location of the simple condition evaluating statement in the program at which a decision was taken that the conditional part of the compound statement was true.

74. A programmable controller as claimed in claim 73 wherein syntax rules are provided in said program for statements such that when the information recorded includes the location in the program at which a decision was taken that a conditional part of the state activity altering compound statement is true then such information defines the necessary information to uniquely determine which term in which conditional part of which statement in which state caused which state activity transition when read in the context of the program.

75. A programmable controller as claimed in any one of the claims 67 to 74 wherein the information recorded includes the time at which the transition in state activity occurred.

76. A programmable controller to control the operation of at least one machine or process comprising:
(a) provision for an applications program using state variable concepts;
(b) operating systems software able to refer to state variables including programming language and monitor facilities providing necessary support for said functions, with said debugging support means provided as a system service;
(c) means provided within the programming language for including debugging functions within an applications program;
(d) Means for running the program automatically on power up.

77. A programmable controller as claimed in any one of claims 67 to 76 wherein said controller has provision to turn a state into a breakstate, which, when it becomes active, causes a predetermined debug function to occur which causes the applications program to halt so that control can be returned to the monitor program part of the operating system for debugging and investigation purposes.

78. A programmable controller as claimed in any one of the preceding claims wherein said controller has provision to turn a state into a pausestate, which, when it becomes active, causes a predetermined debug function to occur which causes a halt in processing of the program loop in which the state occurs, but does not affect the processing of the other program loops.

79. A programmable controller as claimed in any of of the claims 67 to 77 wherein said controller has provision to turn a state into a haltstate, which, when it becomes active, causes a predetermined debug function to occur which causes a halt part way through processing of the program state at a point indicated by a halt statement, which may be optionally conditional, but does not affect the processing of the other program loops.

80. A programmable controller as claimed in any one of the claims 67 to 78 wherein each state is a program state represented in the program by a state identifier associated with a block of statements and defining the required procedures to emulate a state or a state diagram.

81. A programmable controller as claimed in claim 80 wherein only one state can be active in one state diagram at one time, and the active state is indicated by the storage of a value in a variable indicative of the active state block, that variable being assigned to indicate state activity.

82. A programmable controller as claimed in claim 81 wherein the active state is indicated by the storage of a pointer to the state block or the identifier for that state block.

83. A programmable controller as claimed in claim 81 or claim 82 wherein other properties selected from 'break', or 'pause', or other debug functions are associated with a state by being encoded into a statement that also serves as a state delimiting statement.

84. A programmable controller to control the operation of at least one machine or process by emulating one or more state diagrams, said controller comprising:
(a) provision for an applications program defining the one or more state diagrams;
(b) said applications program comprising at least a plurality of blocks of statements, each said block being a program state corresponding to a state in the state diagrams, and at least some of the blocks containing one or more statements which define at least one control action to be taken during the scanning of the block;
(c) said program having one or more program loops corresponding to the state diagrams, each said program loop comprising at least one of said blocks;
(d) at least one of said program loops being active and only one of said program states being active in each of said active program loops at any one time;
(e) means to enable the controller to process the program statements in each active program state in each active program loop whereby the operation and sequence of the states of the machine or process is controlled.

85. A programmable controller as claimed in claim 84 having program structure means for eliminating the need to evaluate whether any particular state is active for the purpose of taking state dependent decisions or carrying out state dependent activities which depend on the activity of a state in the program loop in which that state dependent statement appears.

86. A programmable controller as claimed in 85 wherein said program structure means comprises:
(a) rules whereby all the statements which involve state dependent evaluations or actions dependent upon a particular state are gathered within the state block for that particular state; and
(b) executing means to execute only those statements that appear in the state blocks of those states that are active in the system, whereby the need to evaluate whether a particular state is active as eliminated because active qualification by the active state is implied when that statement is executed because that state is active and inactive qualification, and therefore inactivation of the actions is implied whenever that state is inactive.

87. A programmable controller as claimed in any one of claims 84 to 86 having a variable associated with each active program loop for storing a value indicative of the start of the program state active in that loop.

88. A programmable controller as claimed in claim 87 wherein said variable comprises a pointer holding an address of the start of a state block.

89. A programmable controller as claimed in claim 87 or 88 wherein operating system software means are provided to progress the program by taking from a first initialized one of said variables the value in that variable indicative of the start of the first program state block to be processed, processing the first state block, modifying the value stored in that or another variable if modification is directed by the processing of said first state block, maintaining any required record of current state block activity, and wherein processing the program consists of repetitively processing each of the active state blocks in like manner in desired order.

90. A programmable controller as claimed in claim 88 or 89 wherein each said pointer has an identifier enabling the initialization of a particular pointer to a particular state block in order to make a particular program loop active for subsequent processing in known order in relation to other program loops and for use in debugging.

91. A programmable controller as claimed in any one of claims 84 to 90 having delimiting means for delimiting the state blocks, said delimiting means consisting of state statements associating a state identifier with the state block.

92. A programmable controller as claimed in claim 91 having organizing means for organizing said pointers into a task table for facilitating control of said processing the said known order.

93. A programmable controller as claimed in any one of the claims 68 to 92 wherein the applications program is stored in p-code which is executed by a p-code interpreter program.

94. A programmable controller when constructed, arranged and operable substantially as herein described with reference to, and as illustrated by, the accompanying drawings.

95. A method of controlling a system of at least one machine or process controlled by a programmable controller by emulating one or more state diagrams for controlling the states of operation of at least one machine or process, said controller using operating systems software and an applications program which, in turn, uses state variable concepts, which method comprises the steps of:
  (a) providing debugging support for debugging said controller by arranging for particular transitions in state variable activity or the activation of particular states to cause the controller to initiate one or more predetermined debug functions without user intervention and not requiring the user to write code using general purpose statements; and
  (b) using said operating systems software including programming language and monitor facilities (capable of referring to state variables) providing necessary support for said functions, with said debugging support provided as a system service.

96. A method as claimed in claim 95 further comprising the steps of recording in said system software for later use information comprising transitions that occur with regard to which states are active in the system and the order in which the transitions occur.

97. A method as claimed in claim 96 further comprising the step of later retrieving and presenting the information to a user.

98. A method as claimed in claim 96 or 97 further comprising recording information in said system software to indicte which logical evaluation or evaluations in the processing of the program caused the corresponding said transition or transitions of state to occur.

99. A method as claimed in any one of claims 96 to 98 further comprising the steps of providing one or more program loops, each corresponding to a state diagram, at least one of said program loops being active, and recording in said system software information indicating which program loop contained the statement which was executed and so caused the corresponding transition state to occur.

100. A method as claimed in claim 99 further comprising the steps of providing in each program loop program states corresponding to the state diagram states and providing that only one of said program states is active in each of said active program loops at one time.

101. A method as claimed in claim 100 further comprising the steps of providing in each program loop an identifier and recording in said information the program loop identifier for the loop in which the logical evaluation occurred.

102. A method as claimed in claim 101 further comprising the steps of recording in said information the location in the program at which a decision was taken that a conditional part of the state activity altering compound statement is true.

103. A method as claimed in claim 102 further comprising the steps of providing syntax rules in said program for statements such that when the information recorded includes the location in the program at which a decision was taken that a conditional part of the state activity altering compound statement is true, then such information defines the necessary information to uniquely determine which term in which conditional part of which statement in which state caused which state activity transition when read in the context of the program.

104. A method as claimed in any one of claims 96 to 103 further comprising the steps of recording in said information the time at which the transition in state activity occurred.

105. A method as claimed in a programmable controller as claimed in any one of claims 99 to 104 further comprising the steps of arranging said controller to turn a state into a breakstate, which, when it becomes active, causes a predetermined debug function to occur which causes the applications program to halt so that control can be returned to the monitor program part of the operating system for debugging and investigation purposes.

106. A method as claimed in any one of claims 95 to 105 further comprising the steps of arranging said controller to turn a state into a pausestate, which, when it becomes active, causes a predetermined debug function to occur which causes a halt in processing of the program loop in which the state occurs, but does not affect the processing of the other program loops.

107. A method as claimed in any one of claims 95 to 106 further comprising the steps of arranging said controller to turn a state into a haltstate, which, when it becomes active, causes a predetermined debug function to occur which causes a halt part way through processing of the program state at a point indicated by a halt statement, which may be optionally conditional, but does not affect the processing of the other program loops.

108. A method as claimed in any one of claims 95 to 107 providing each state as a program state represented in the program by a state identifier associated with a block of statements and defining the required procedures to emulate a state on a state diagram.

109. A method as claimed in claim 108 further comprising the steps of providing a variable associated with each active program loop for storing a value indicative of each active state block, that variable being assigned to indicate state activity.

110. A method as claimed in claim 108 or claim 109 further comprising the step of storing a value indicative of the active state, said value comprising a pointer to the state block or the identifier for that state block.

111. A method as claimed in claim 109 or claim 110 further comprising the steps of providing that other properties of 'break', or 'pause', or other debug functions are associated with a state by being encoded into a statement that also serves as a state delimiting statement.

112. A method of controlling the operation of at least one machine or process controlled by a programmable controller by emulating one or more state diagrams, said controller using an applications program defining the one or more state diagrams, said method comprising the steps of:
(a) providing said applications program as at least a plurality of blocks of statements, each said block being a program state corresponding to a state in the state diagrams, and at least some of the blocks containing one or more statements which define at least one control action to be taken during the scanning of the block;
(b) providing in said program one or more program loops corresponding to the state diagrams, each said program loop comprising at least one of said blocks;
(c) at least one of said program loops being active and only one of said program states being active in each of said active program loops at any one time; and
(d) processing the program statements in each active program state in each active program loop, whereby the operation and sequence of the states of the machine or process is controlled.

113. A method as claimed in claim 112 further comprising the steps of arranging said program to eliminate the need to evaluate whether any particular state is active for the purpose of taking state dependent decisions or carrying out state dependent activities which depend on the activity of a state in the program loop in which that state dependent statement appears.

114. A method as claimed in claim 113 further comprising the steps of gathering all the statements which involve state dependent evaluations or actions dependent upon a particular state within the state block for that particular state and executing only those statements that appear in the state blocks of those states that are active in the system, whereby the need to evaluate state variables is eliminated because active qualification by the active state is implied, when that statement is executed because that state is active and inactive qualification, and therefore inactivation of the actions is implied whenever that state is inactive.

115. A programmable controller as claimed in any one of claims 112 to 114 further comprising the steps of having a variable associated with each active program loop for storiong a value indicative of the start of the program state active in that loop.

116. A programmable controller as claimed in claim 114 wherein said variable comprises a pointer holding an address of the start of a state block.

117. A method as claimed in claim 116 using operating system software means, said method further comprising the steps using said operating system software to progress the the program by taking from a first initialized one of said variables, the value in that variable indicative of the start of the first program stae block to be processed, processing the first state block, modifying the value stored in that or another variable if modification is directed by the processing of said first state block, maintaining any required record of current state block activity, and processing the program repetitively processing each of the active state blocks in like manner in desired order.

118. A method as claimed in claim 116 or claim 117 further comprising the steps of providing each said pointer with an identifier enabling the initialization of a particular pointer to a particular state block in order to make a particular program loop active for subsequent processing in known order in relation to other program loops and for use in debugging.

119. A method as claimed in any one of claims 112 to 118 further comprising the steps of delimiting the state blocks by use of state statements associating a state identifier with the state block.

120. A method as claimed in claim 119 further comprising the steps of organizing said pointers into a task table for facilitating control of said processing in said known order.

121. A method as claimed in an any one of claims 84 to 120 which includes the step of storing the applications program in p-code which is executed by a p-code interpreter program.

122. A method of controlling a machine or process when effected substantially as herein described with reference to and as illustrated by the accompanying drawings.

* * * * *